March 28, 1944. D. L. MOODY ET AL Re. 22,462

TELEPHONE SYSTEM

Original Filed April 30, 1937 31 Sheets-Sheet 1

INVENTORS: D.L. MOODY
N.D. NEWBY
F.F. SHIPLEY

BY William R. Bennett
ATTORNEY

TELEPHONE SYSTEM

Original Filed April 30, 1937 31 Sheets-Sheet 2

INVENTORS: D.L.MOODY
N.D.NEWBY
F.F.SHIPLEY

BY William R. Ballard
ATTORNEY

March 28, 1944. D. L. MOODY ET AL Re. 22,462

TELEPHONE SYSTEM

Original Filed April 30, 1937 31 Sheets-Sheet 3

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 4

INVENTORS: D.L.MOODY
N.D.NEWBY
F.F.SHIPLEY

BY William R. Ballard

ATTORNEY.

March 28, 1944. D. L. MOODY ET AL Re. 22,462

TELEPHONE SYSTEM

Original Filed April 30, 1937 31 Sheets-Sheet 5

INVENTORS: D.L.MOODY
N.D.NEWBY
F.F.SHIPLEY

BY William R. Ballard
ATTORNEY

March 28, 1944. D. L. MOODY ET AL Re. 22,462

TELEPHONE SYSTEM

Original Filed April 30, 1937 31 Sheets-Sheet 6

INVENTORS: D.L.MOODY
N.D.NEWBY
F.F.SHIPLEY

BY William P. Rhiland
ATTORNEY

March 28, 1944. D. L. MOODY ET AL Re. 22,462

TELEPHONE SYSTEM

Original Filed April 30, 1937 31 Sheets-Sheet 7

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 8

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 9

INVENTORS: D. L. MOODY
N. D. NEWBY
F. F. SHIPLEY

BY William R. Ballard
ATTORNEY

March 28, 1944. D. L. MOODY ET AL Re. 22,462

TELEPHONE SYSTEM

Original Filed April 30, 1937 31 Sheets-Sheet 10

INVENTORS: D. L. MOODY
N. D. NEWBY
F. F. SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 11

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 12

INVENTORS: D.L.MOODY
N.D.NEWBY
F.F.SHIPLEY

BY William R. Brand
ATTORNEY

March 28, 1944. D. L. MOODY ET AL Re. 22,462

TELEPHONE SYSTEM

Original Filed April 30, 1937 31 Sheets-Sheet 13

INVENTORS: D. L. MOODY
N. D. NEWBY
F. F. SHIPLEY

BY William R. Ballard
ATTORNEY

March 28, 1944. D. L. MOODY ET AL Re. 22,462

TELEPHONE SYSTEM

Original Filed April 30, 1937 31 Sheets-Sheet 14

INVENTORS: D.L.MOODY
N.D.NEWBY
F.F.SHIPLEY

BY William R. Ballard
ATTORNEY

March 28, 1944. D. L. MOODY ET AL Re. 22,462

TELEPHONE SYSTEM

Original Filed April 30, 1937 31 Sheets-Sheet 15

INVENTORS: D. L. MOODY
N. D. NEWBY
F. F. SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 16

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 17

D. L. MOODY
INVENTORS: N. D. NEWBY
F. F. SHIPLEY

BY William R. Ballard
ATTORNEY

TELEPHONE SYSTEM

Original Filed April 30, 1937 31 Sheets-Sheet 18

INVENTORS: D. L. MOODY
N. D. NEWBY
F. F. SHIPLEY

BY William R. Barnard

ATTORNEY

March 28, 1944. D. L. MOODY ET AL Re. 22,462

TELEPHONE SYSTEM

Original Filed April 30, 1937 31 Sheets-Sheet 19

INVENTORS: D.L.MOODY
N.D.NEWBY
F.F.SHIPLEY

BY William R. Bassard

ATTORNEY

TELEPHONE SYSTEM

Original Filed April 30, 1937 31 Sheets-Sheet 20

INVENTORS: D.L.MOODY
N.D.NEWBY
F.F.SHIPLEY
BY William P. Ballard
ATTORNEY

TELEPHONE SYSTEM

Original Filed April 30, 1937 31 Sheets-Sheet 21

INVENTORS: D.L. MOODY
N.D. NEWBY
F.F. SHIPLEY
BY William R. Ballard
ATTORNEY

March 28, 1944. D. L. MOODY ET AL Re. 22,462

TELEPHONE SYSTEM

Original Filed April 30, 1937 31 Sheets-Sheet 22

INVENTORS: D. L. MOODY
N. D. NEWBY
F. F. SHIPLEY

BY William R. Ballard
ATTORNEY

TELEPHONE SYSTEM

Original Filed April 30, 1937 31 Sheets-Sheet 23

INVENTORS: D. L. MOODY
N. D. NEWBY
F. F. SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 24

INVENTORS: D.L.MOODY
N.D.NEWBY
F.F.SHIPLEY

BY William R. Ballard

ATTORNEY

TELEPHONE SYSTEM

Original Filed April 30, 1937 31 Sheets-Sheet 25

INVENTORS: D.L.MOODY
N.D.NEWBY
F.F.SHIPLEY
BY William R. Ballard
ATTORNEY

March 28, 1944. D. L. MOODY ET AL Re. 22,462

TELEPHONE SYSTEM

Original Filed April 30, 1937 31 Sheets-Sheet 26

INVENTORS: D.L.MOODY
N.D.NEWBY
F.F.SHIPLEY

BY William R. Bullard

ATTORNEY

TELEPHONE SYSTEM

Original Filed April 30, 1937 31 Sheets-Sheet 27

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 28

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 29

INVENTORS: D.L.MOODY
N.D.NEWBY
F.F.SHIPLEY

BY William R. Ballard

ATTORNEY

March 28, 1944. D. L. MOODY ET AL Re. 22,462

TELEPHONE SYSTEM

Original Filed April 30, 1937 31 Sheets-Sheet 30

INVENTORS: D. L. MOODY
N. D. NEWBY
F. F. SHIPLEY

BY William R. Ballard

ATTORNEY

INVENTORS: D.L. MOODY
N.D. NEWBY
F.F. SHIPLEY

BY William R. Bullard
ATTORNEY

Reissued Mar. 28, 1944 Re. 22,462

UNITED STATES PATENT OFFICE 22,462

TELEPHONE SYSTEM

Dwight L. Moody, Morristown, Neal D. Newby, Leonia, and Frank F. Shipley, Tenafly, N. J., assignors to American Telephone and Telegraph Company, a corporation of New York Original No. 2,161,376, dated June 6, 1939, Serial No. 140,022, April 30, 1937. Application for reissue July 1, 1942, Serial No. 449,278

35 Claims. (Cl. 179—27)

This invention relates to telephone systems and particularly to systems in which toll or long distance connections are established in part by means of automatic switching apparatus.

The objects of the invention are to simplify the operations required for establishing, supervising, and releasing the various kinds of connections involved in toll service and incidental thereto; to obtain economies both in the operation of the system and in the equipment employed; to enable a reduction in the time required by the operators in handling the connections; to make possible the application of automatic switching to existing toll equipment; and in general to increase the efficiency and otherwise to improve systems of this character.

Numerous systems have been proposed heretofore for the extension and completion of toll connections by means of automatic switches. In most cases an originating toll operator at the outward end of a toll line is equipped with means for sending selective signals or pulses over the line to operate switches at the inward end either to complete the connection through a local office to the called line or to extend the connection over one or more successive toll lines in series to still further distant points and there to complete the call over the switches in the local called office. While this method reduces the manual switching at the inward and intermediate points, some additional effort is necessary on the part of the originating operator. Also special provision must be made for the transmission of the switch operating signals over the toll lines, for the supervisory signals, and for release of the connections at the completion of conversation.

According to the present invention the advantages of these prior systems are retained by providing each toll office with automatic switches for establishing the necessary connections for outward, inward terminating, and inward through calls. And the disadvantages incident to the operation and release of the automatic switches by means of control signals transmitted over the toll lines are obviated by providing each toll operator's position with a keyboard, common to the toll lines served by her position, for setting up in a common switch-controlling register or marker the wanted designations communicated to her in the usual way over the toll line by the distant toll operator. These circuits are so arranged that the usual signals sent over the toll line, such as the original calling signal, the re-ring, ring-back, flash, and disconnect signals, associate the operator's position and telephone set automatically with the toll line over which the signal has come in order that she may give it attention. When the operator has received the called-line designation, and has recorded it in the marker or sender, her position is released and made ready for further calls. Also her position is equipped with a release key for releasing the position after having performed any one of her supervisory functions and with a signaling key for sending calling signals to the distant toll operators. The toll operators' positions are thus placed on a cordless basis, the operators are relieved of the task of manually establishing and disestablishing the connection with cord circuits, and their positions are equipped with keys and signal lamps whereby they are able to perform easily and with a minimum of time expended all the functions involved in connection with a toll call. A particular advantage of this system is that it is possible to utilize the toll line circuits now in common use, such as the well-known ring-down lines, without material alteration in the circuits themselves and with substantially no changes in the operating practice.

A feature of this invention is a system in which a toll line incoming to a toll office terminates in two separate switches, one of which serves to extend the incoming line over a toll-switching circuit to a local office in case the call is a terminating one, and the other of which serves to extend the incoming toll line to an outgoing toll line to a distant toll office in case the call is a through one. The particular one of the switches taken into use is automatically determined by the circuits at the position of the toll operator who attends to the incoming call and records the wanted-line designation on her keyboard. The selective switch that serves for terminating calls is controlled by one marker, and the switch for through calls is controlled by a second marker. As soon as the wanted-line designation is set up on the operator's keyboard, the proper one of the two markers is chosen automatically, according to the designation on the keyboard, and the designation is transferred to that marker.

Another and related feature is a system in which the office code designation is transferred as above mentioned from the operator's position to the marker for selectively operating the switches to extend the incoming toll line to an outgoing circuit, which may be a toll switching trunk leading to a local dial office, and in which the called line designation that the operator also set upon on the keys is transferred over the connection thus made through said switches to a recording register associated with the outgoing end of the seized toll switching trunk. This register then controls the switches in the local dial office to complete the call.

Another feature related to those above mentioned is a provision whereby the marker is able to determine from the designation code it receives from the keyboard position whether it will be necessary for the position to send out over the connection to be extended under control of the marker any further designations that may be recorded on the keyboard, such as the numerical designations of the called line. If no further designations are to be forwarded, the marker prepares the operator's position for immediate release from the toll line and then disconnects itself from the position. If a further designation is to be sent out from the position, the marker releases itself from the position without preparing the position for release from the line. In this case the position is released under its own control after it has completed the transfer of the numerical designation to the register in the toll trunk.

Another feature is the provision for releasing a terminating connection automatically without assistance on the part of the terminating toll operator. When the called subscriber hangs up his receiver, the connection in his local office is released in any well-known manner. This sends a signal to the toll line at the terminating toll office, causing the automatic release of the switches therein that extended the inward toll line to said local office.

Another feature is a system in which the marker when seized to extend a call to a toll line group is apprised at once if all lines in the group are busy and, without testing the group, sends a busy signal to the operator's position, omits to prepare the position for release from the incoming toll line, and automatically causes said incoming toll line to be connected through the switches to an idle overflow circuit. The operator then notifies the originating toll operator of the busy condition and releases her position from the line. The guard lamp on the operator's position, individual to the toll line, flashes as long as the group remains busy. When a line in the desired group becomes idle, the operator causes her position to be associated with the waiting incoming toll line and sets up the number again on her keyboard in a second attempt.

A related feature is a provision for notifying the marker when all toll lines in the wanted group are busy and all overflow circuits are busy. In this event, the marker extends the inward toll line to a master busy circuit.

Another feature of the invention is a provision for placing toll-line groups on a circuit-request basis. This is accomplished by closing a key, at the circuit request position, individual to the group. When a marker is seized for a call to this group, it immediately recognizes that this group is on request, omits to test the lines of the group regardless of whether they are all busy or not, notifies the inward toll operator who set up the number on her keys, and automatically extends the incoming toll line to the circuit-request operator over an order circuit. The inward operator's position is now released, and the request operator communicates with the originating toll operator and explains that there will be a delay. The connection is then released. When the call thus assumed is the next to be served, the request operator connects her position to an auxiliary connecting circuit which has access through the switches to the toll lines. She then sets up on her keys the code for the toll lines leading back to the toll office that originated the call, obtains the operator who has the original ticket and notifies her that the call will be extended as soon as a line becomes idle. When a line in the desired group does become idle, the request operator sets up the code on the keys, and this code is transferred to one of the markers to extend the other end of her auxiliary circuit to the idle toll line in the desired group. This time the marker recognizes that the call is being made by the request operator and proceeds to test the lines and find an idle one and then complete the connection through to such idle line.

Another feature is an improved and simplified circuit for controlling the transmission impedance of the toll lines.

These and other features will be discussed more fully in the following detailed description.

To illustrate the features of the invention, reference may be had to the accompanying drawings, in which:

Figures 1 to 4, arranged as indicated in Fig. 31, show diagrammatically the circuit arrangement of a toll system, and in which Figs. 5 to 30, inclusive, when arranged as shown in Fig. 32, disclose the detailed circuits of said system. Considering Figs. 5 to 30 more particularly.

Figure 6:
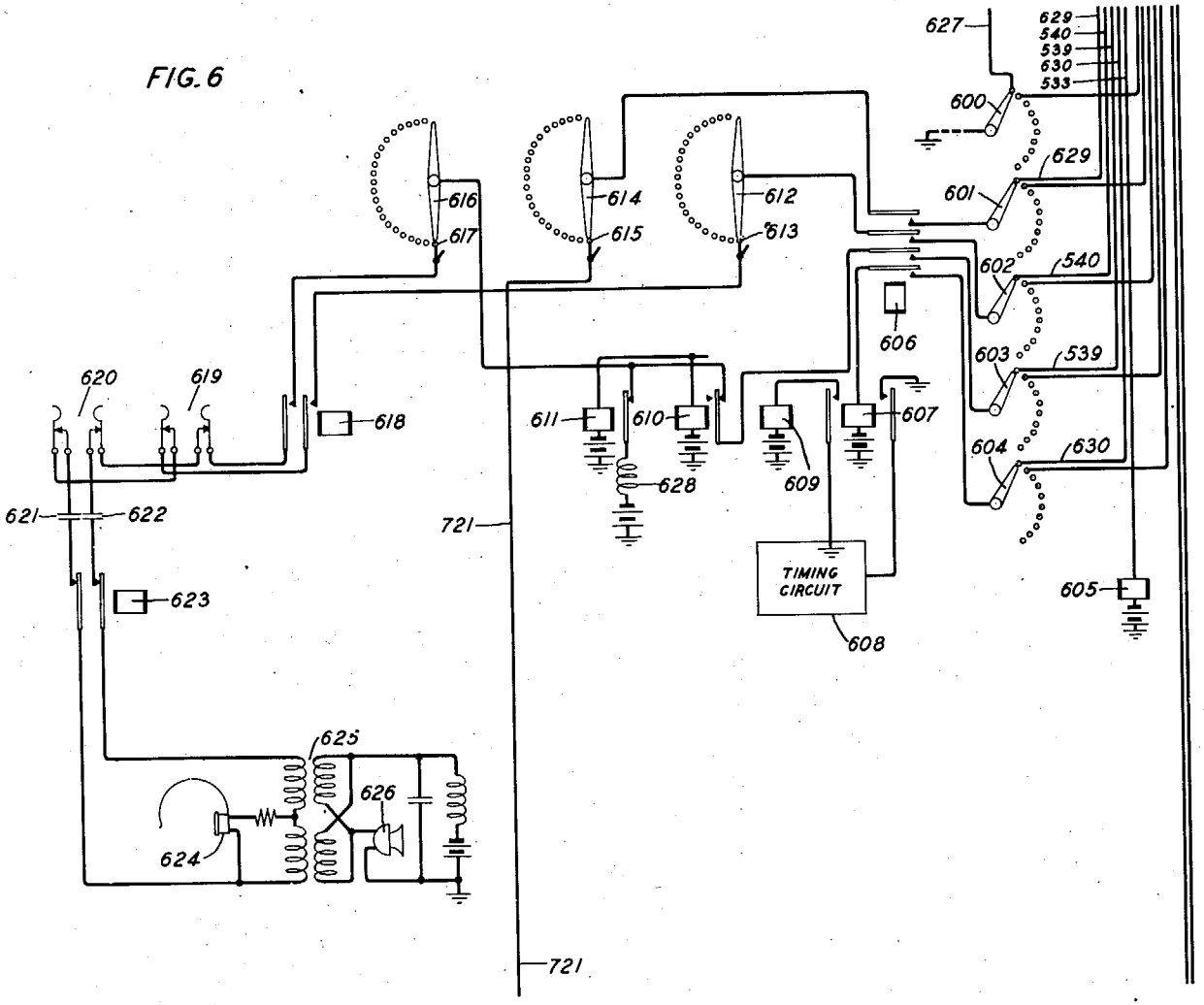
Fig. 6 shows in schematic form the elements of a toll board, cordless link, and operator's telephone circuit.
Figure 8:
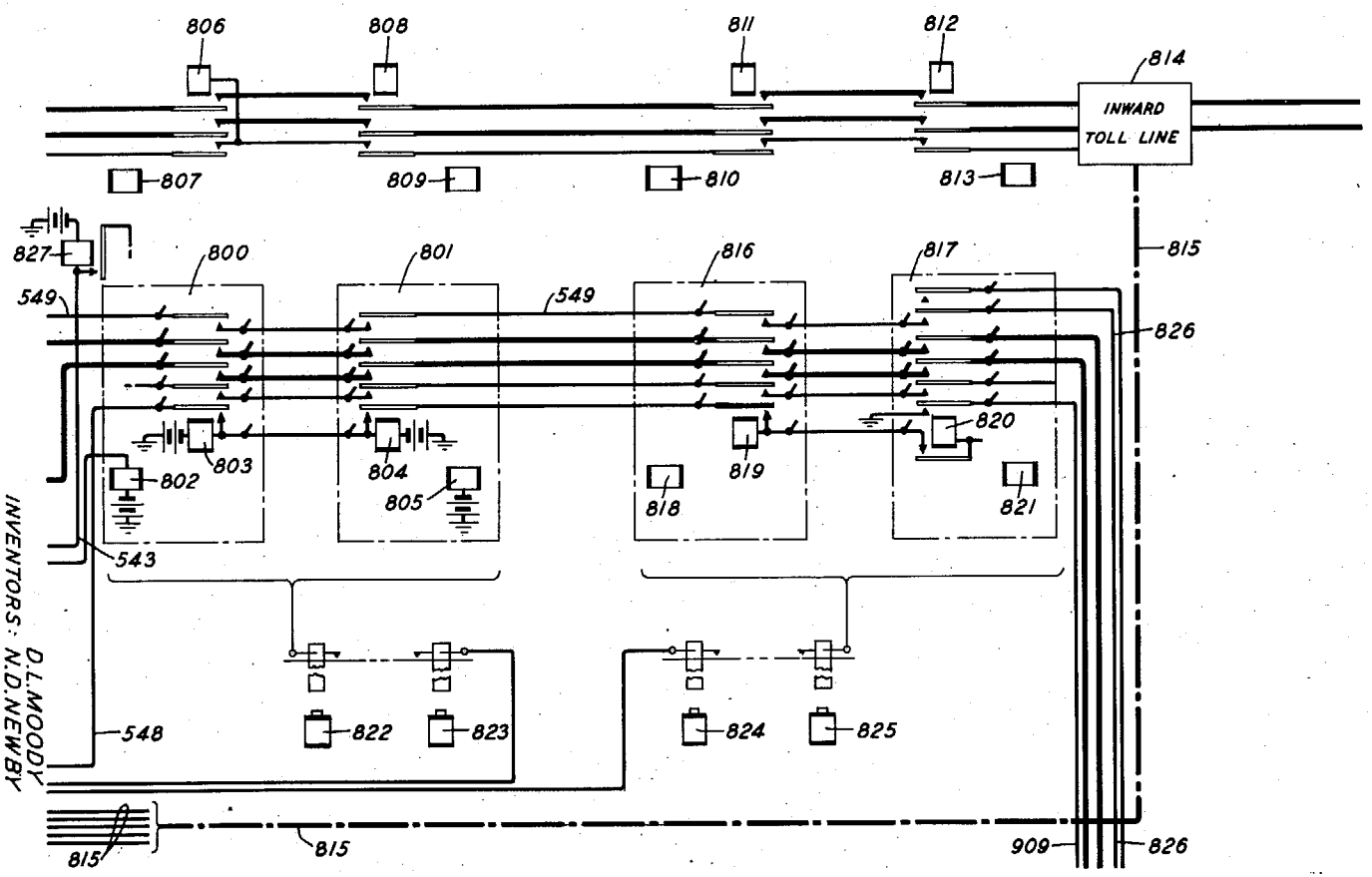
Figure 9:
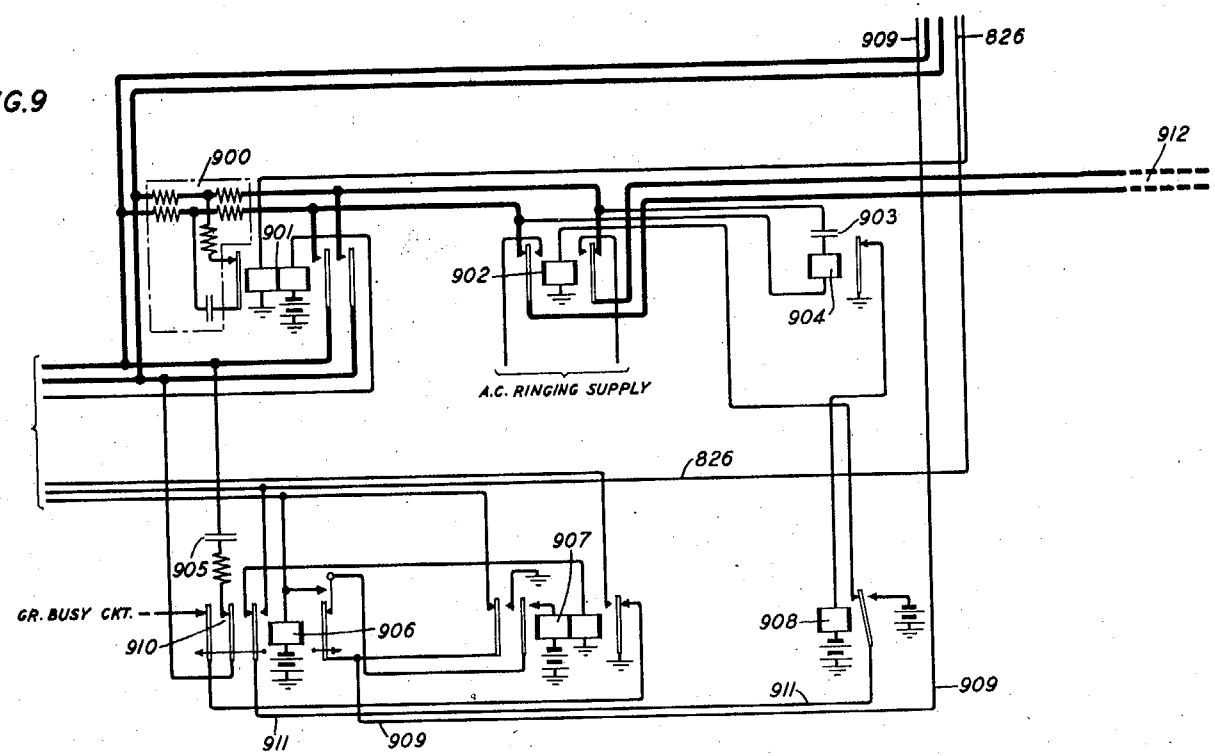
Figure 10:
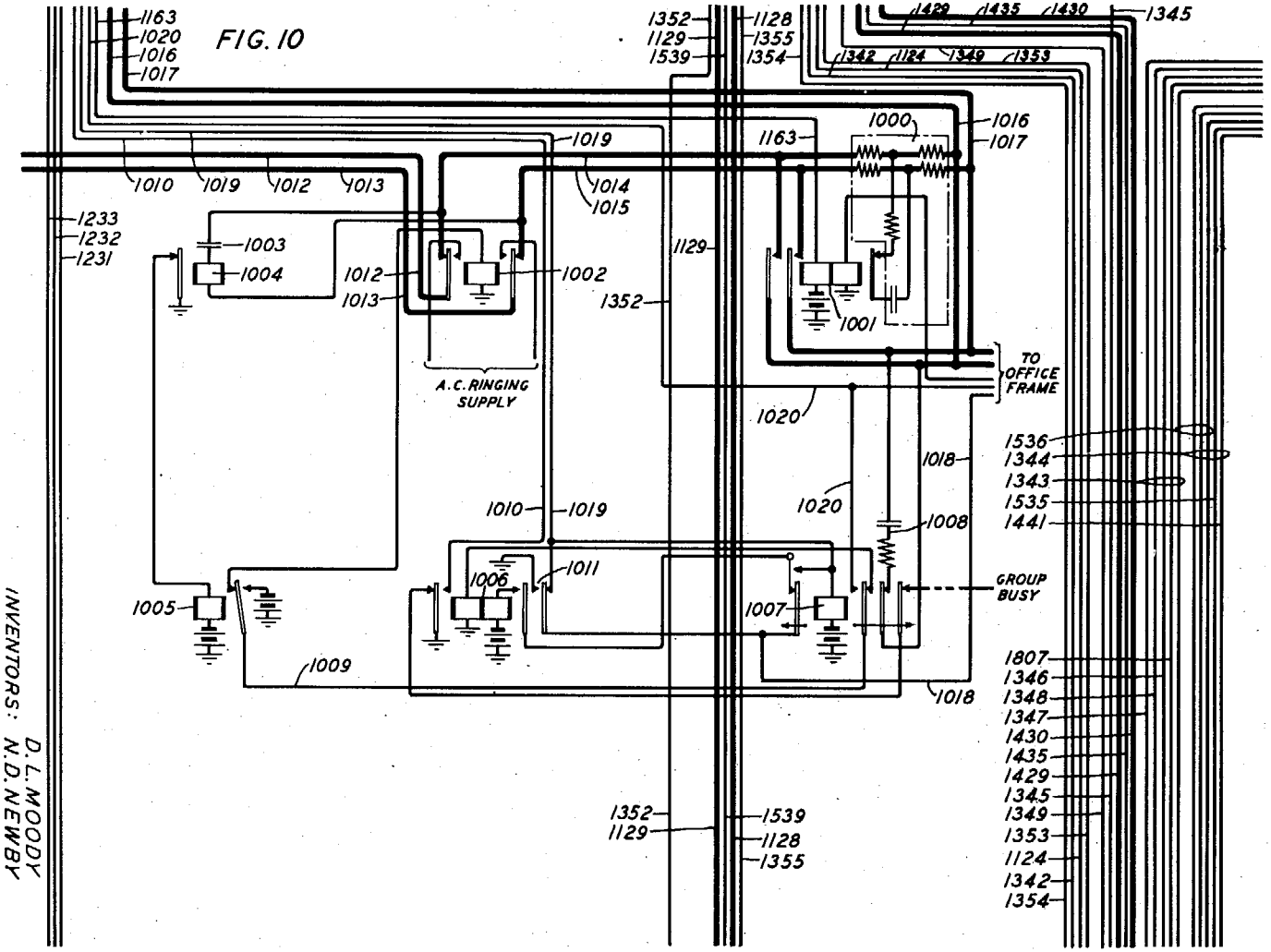
Figure 11:
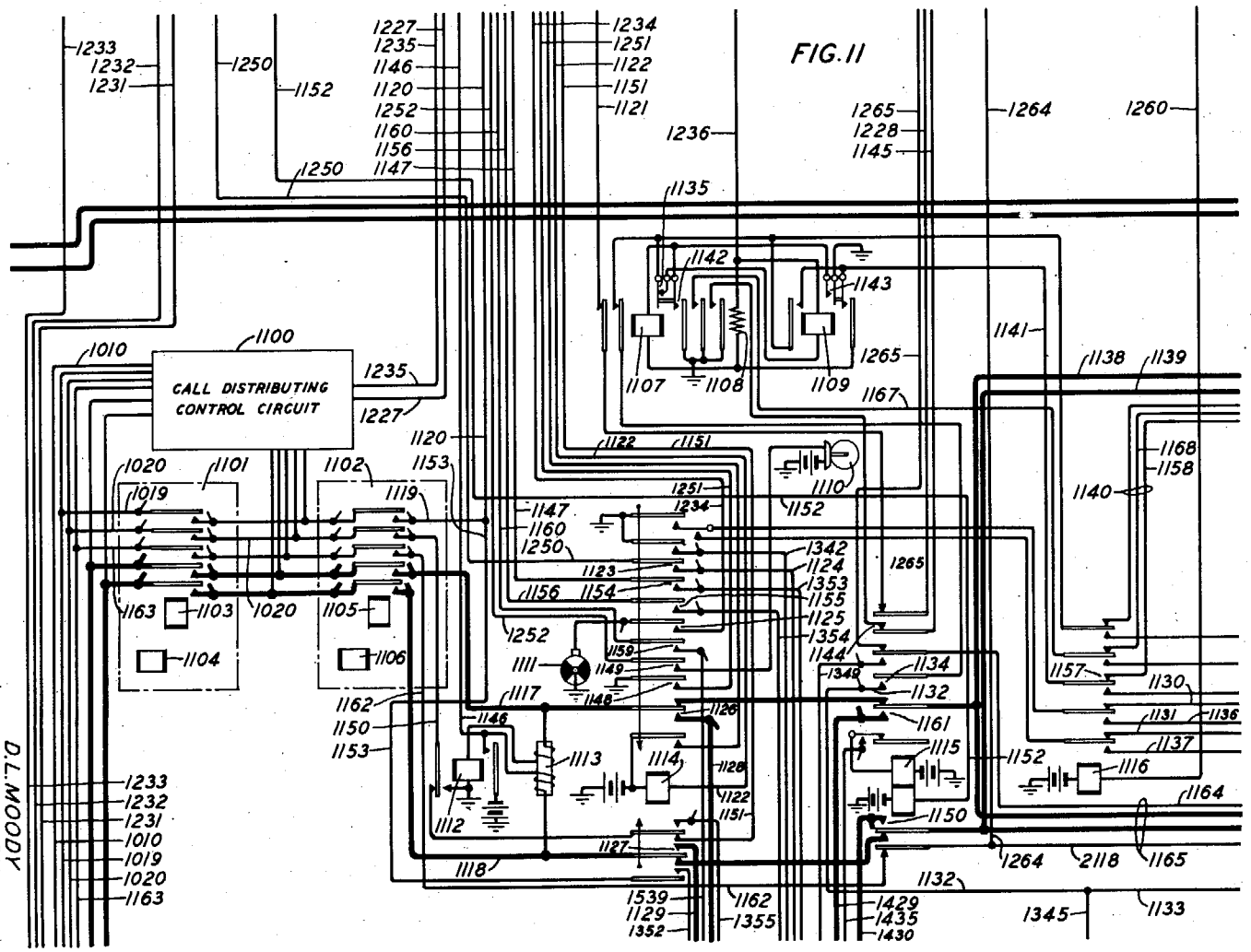
Figure 12:
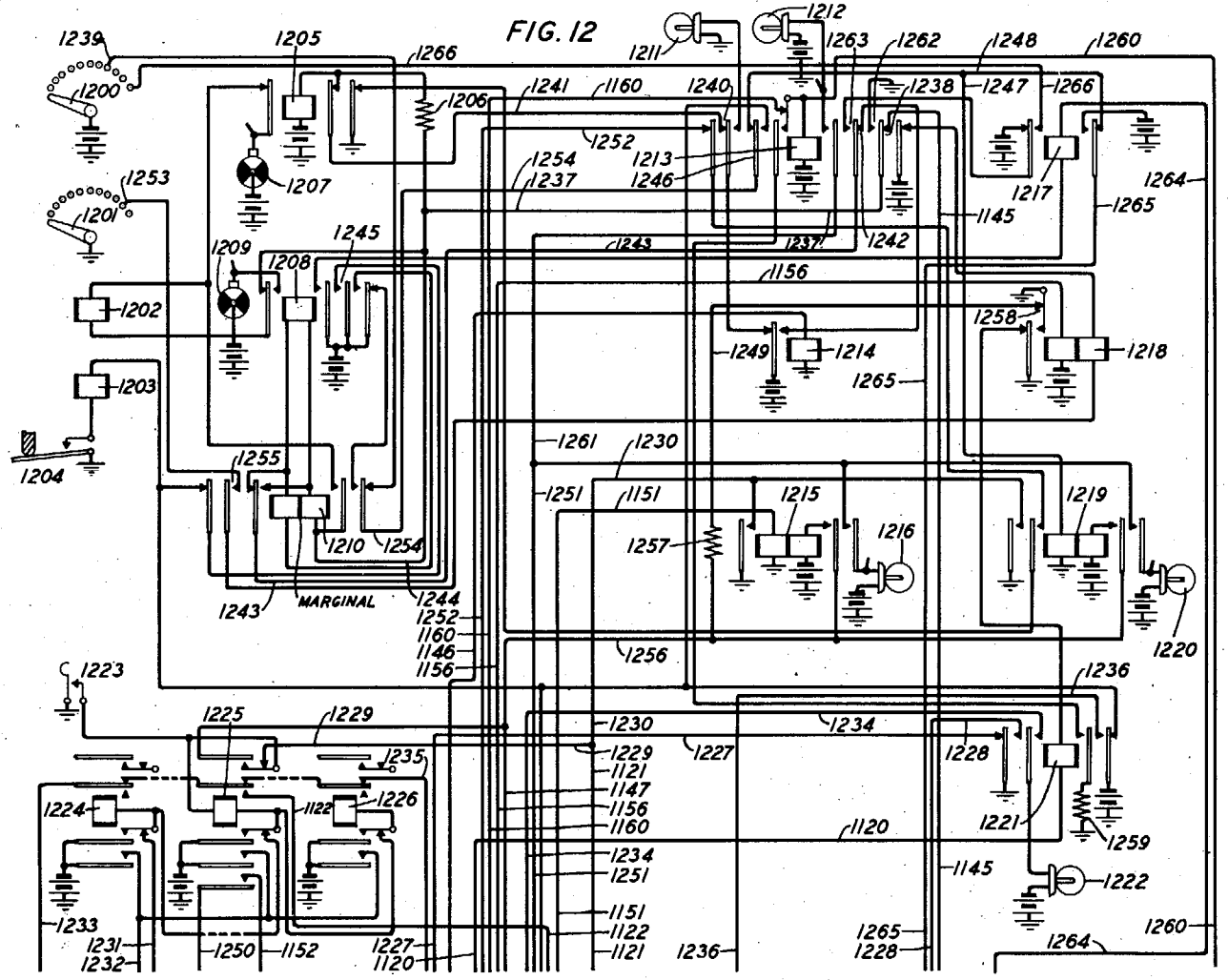
Figure 13:
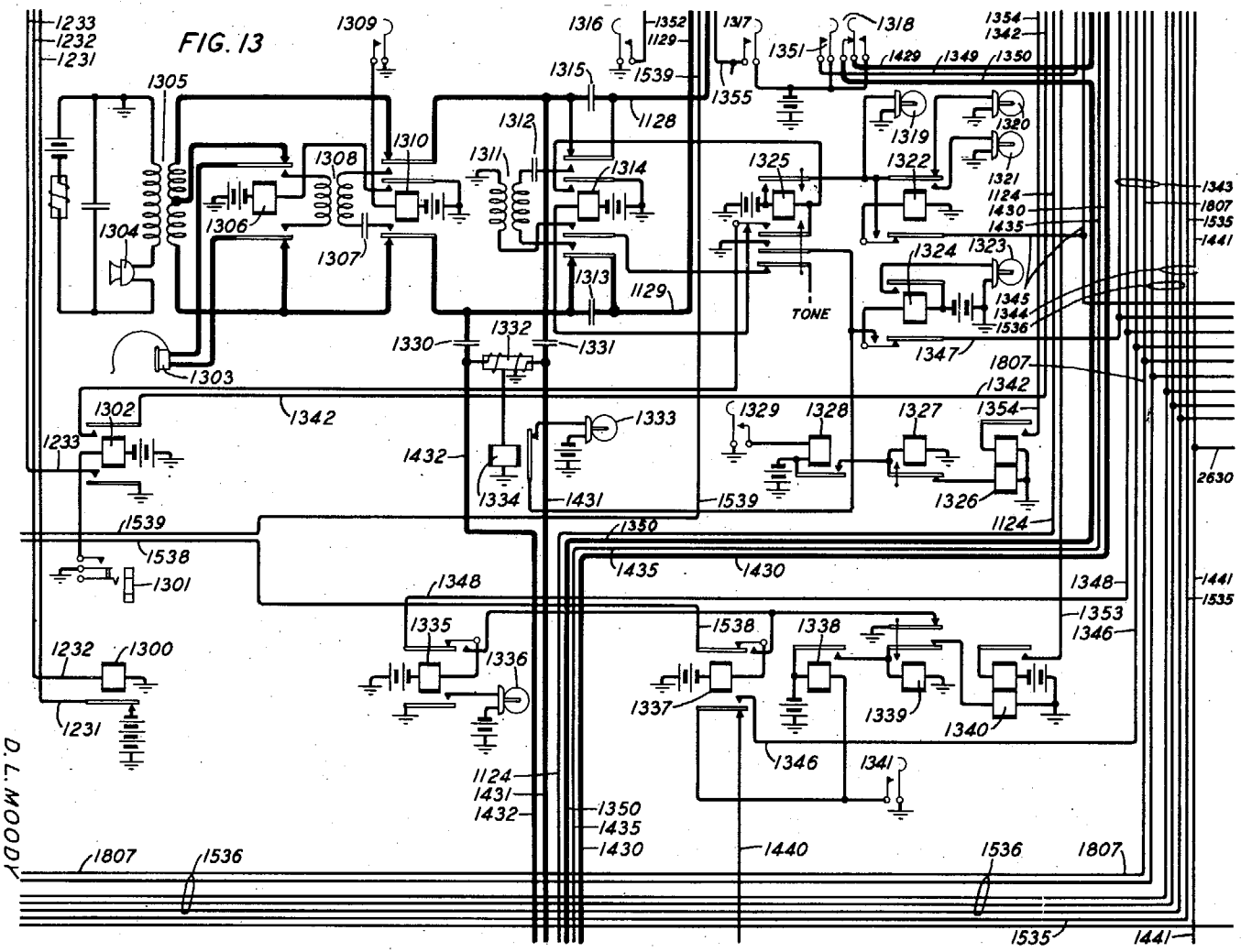
Figure 14:
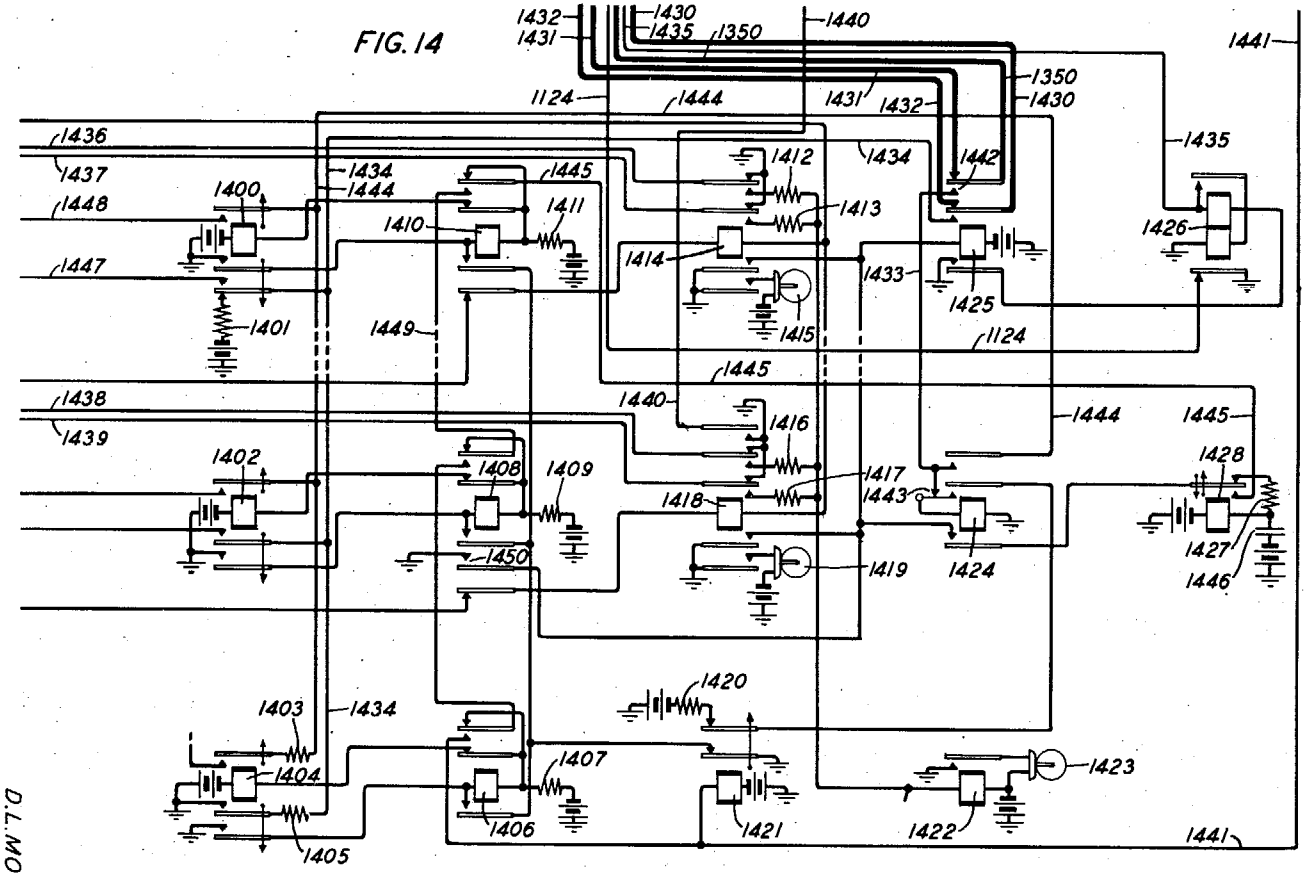
Figure 15:
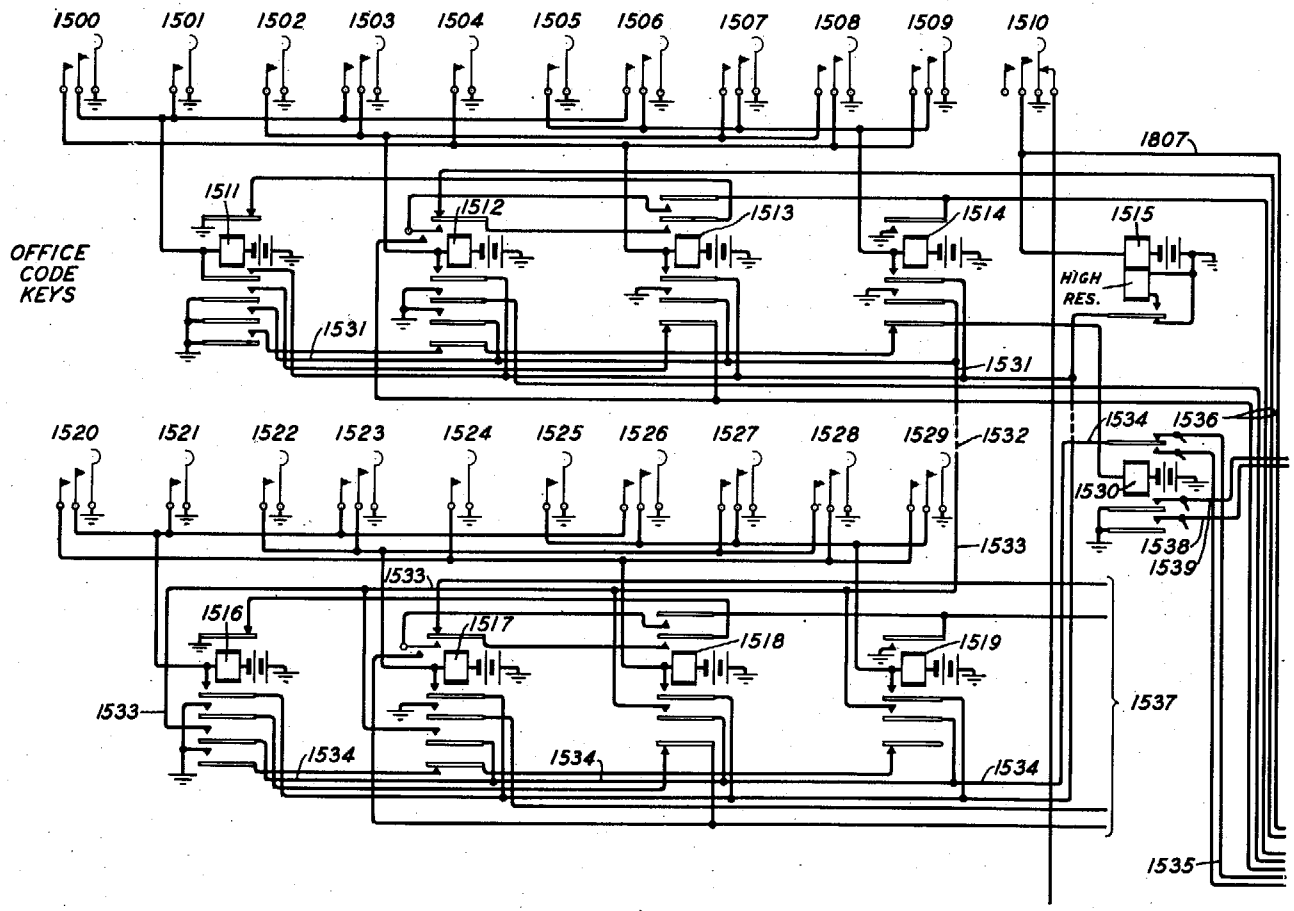
Figure 16:
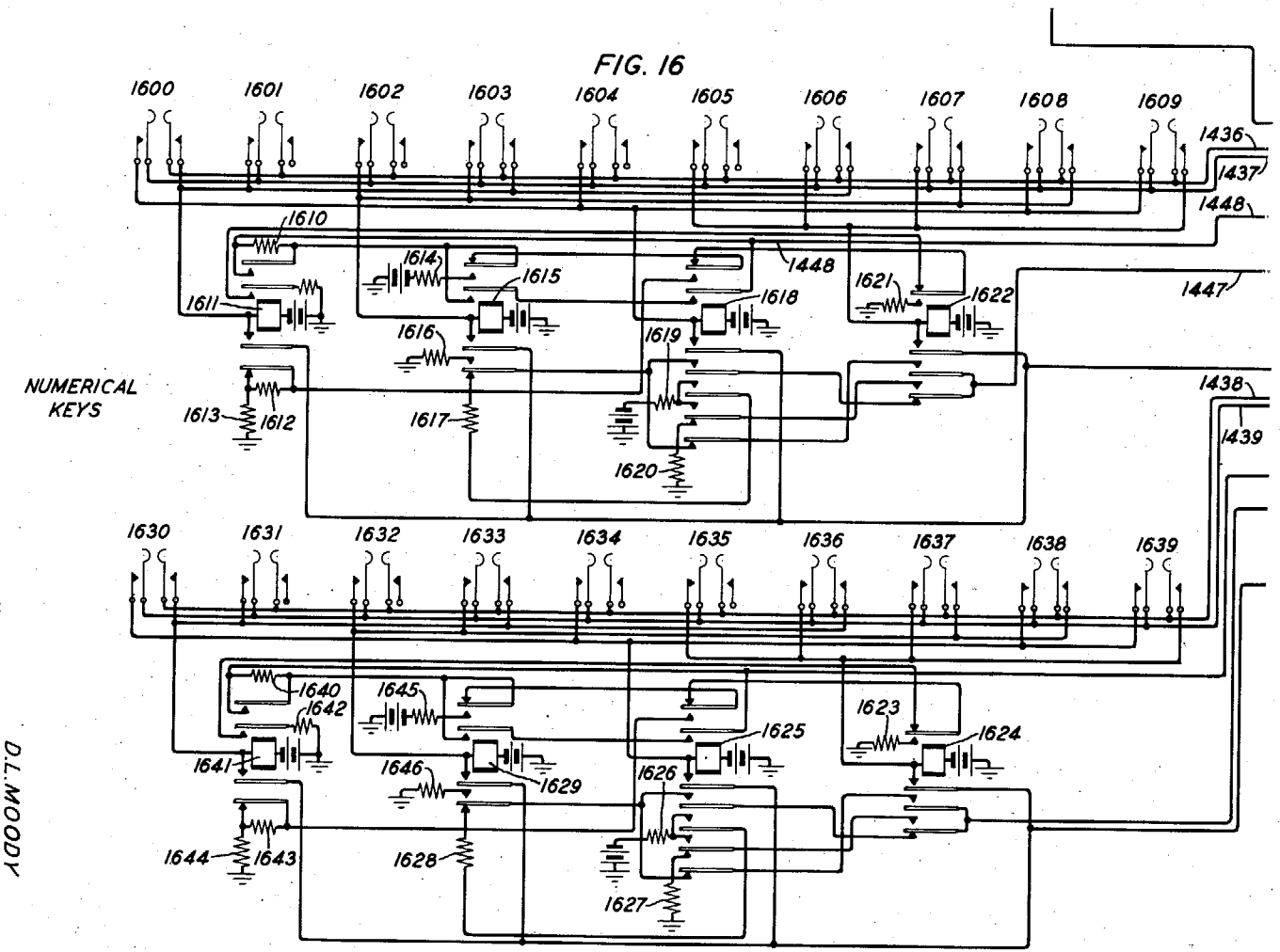
Figure 17:
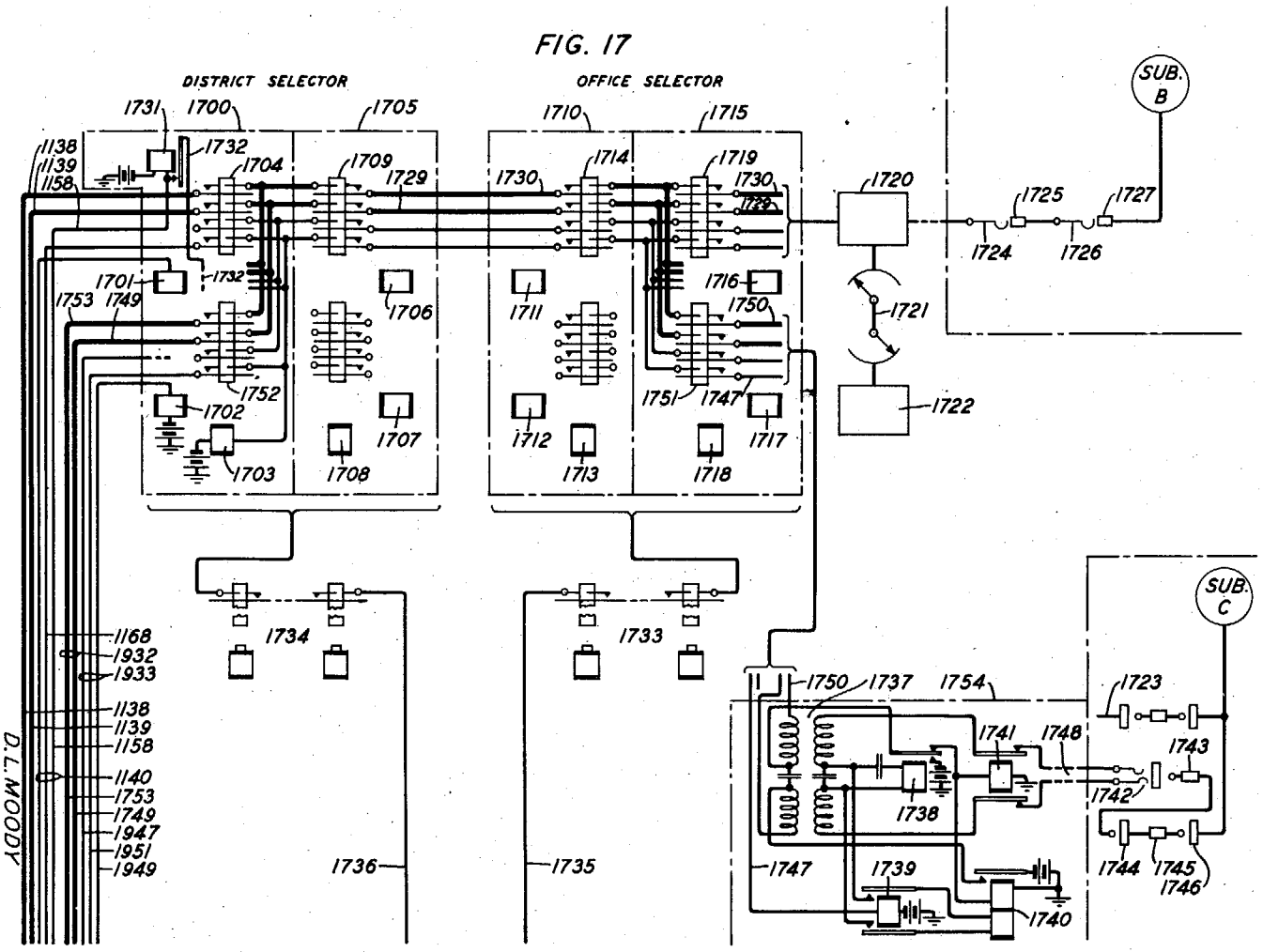
Figure 18:
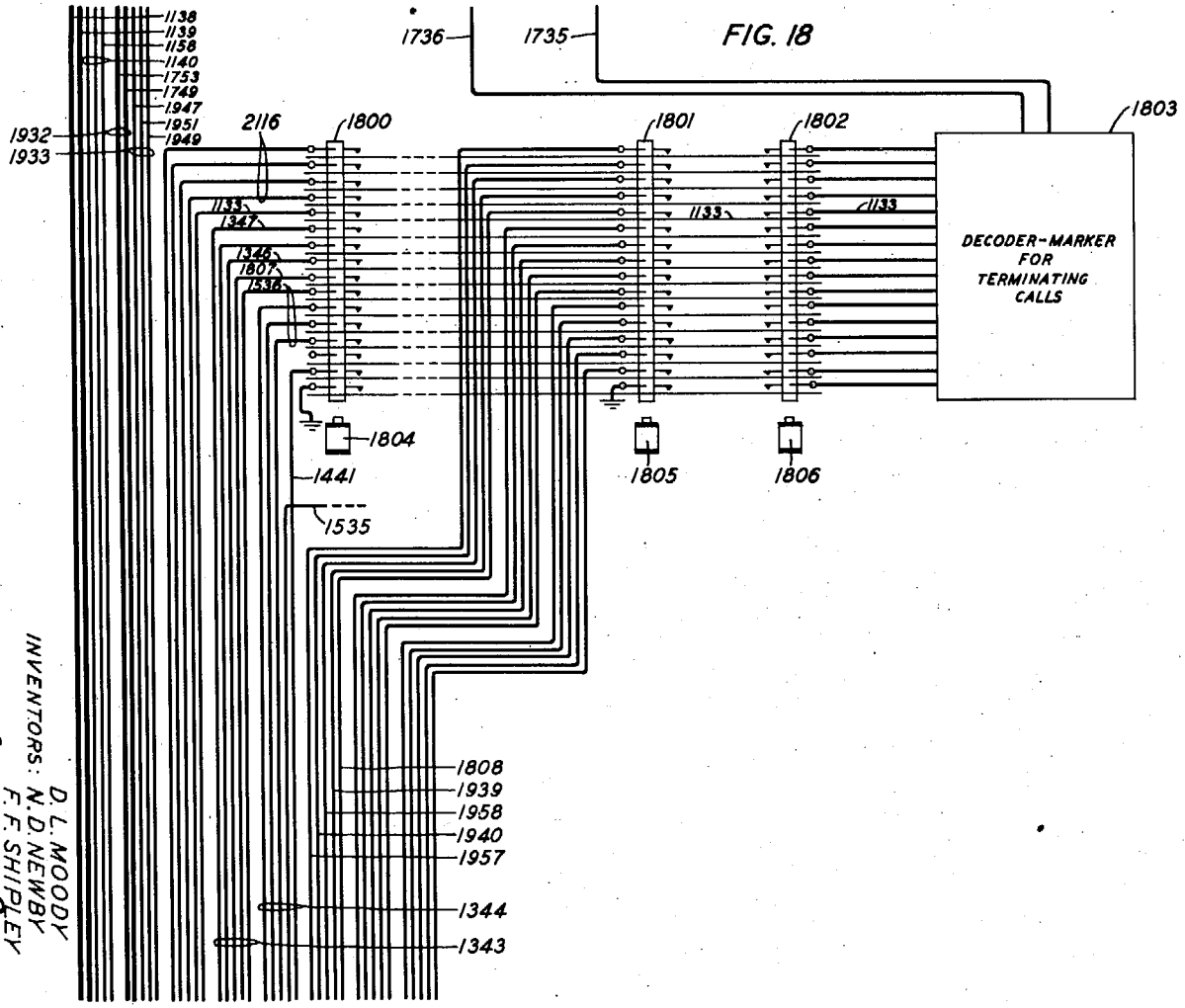
Figure 19:
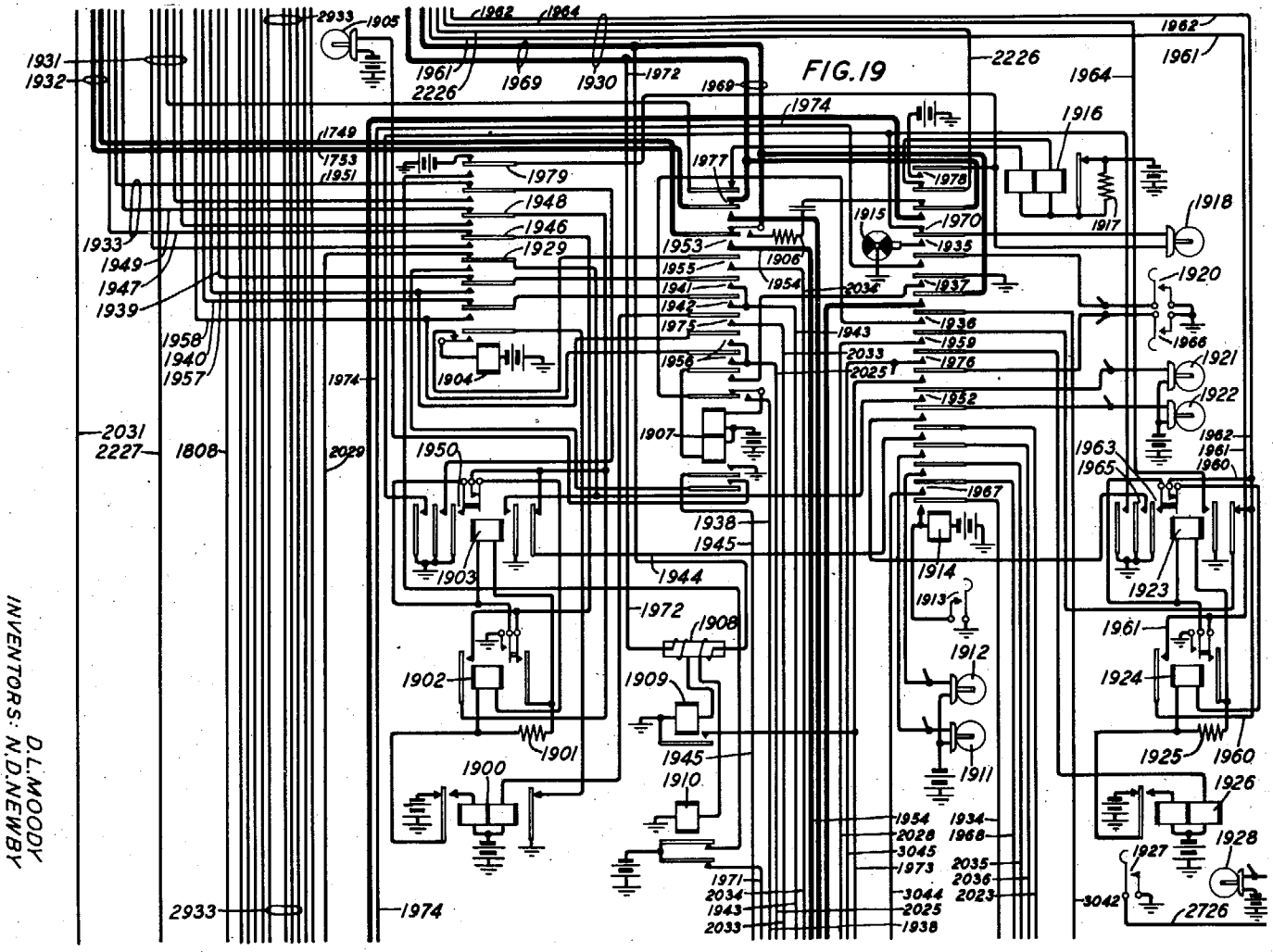
Figure 20:
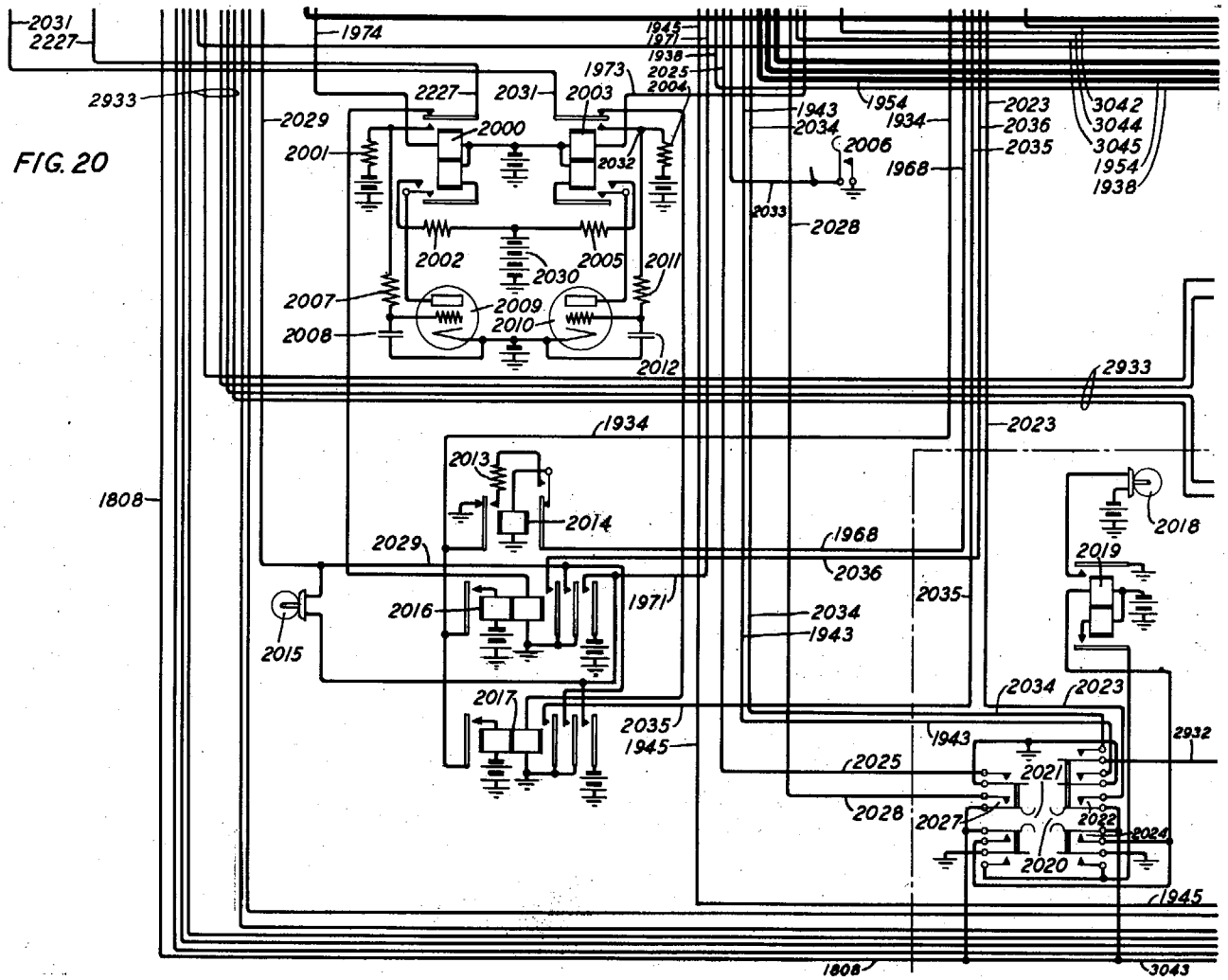
Figure 21:
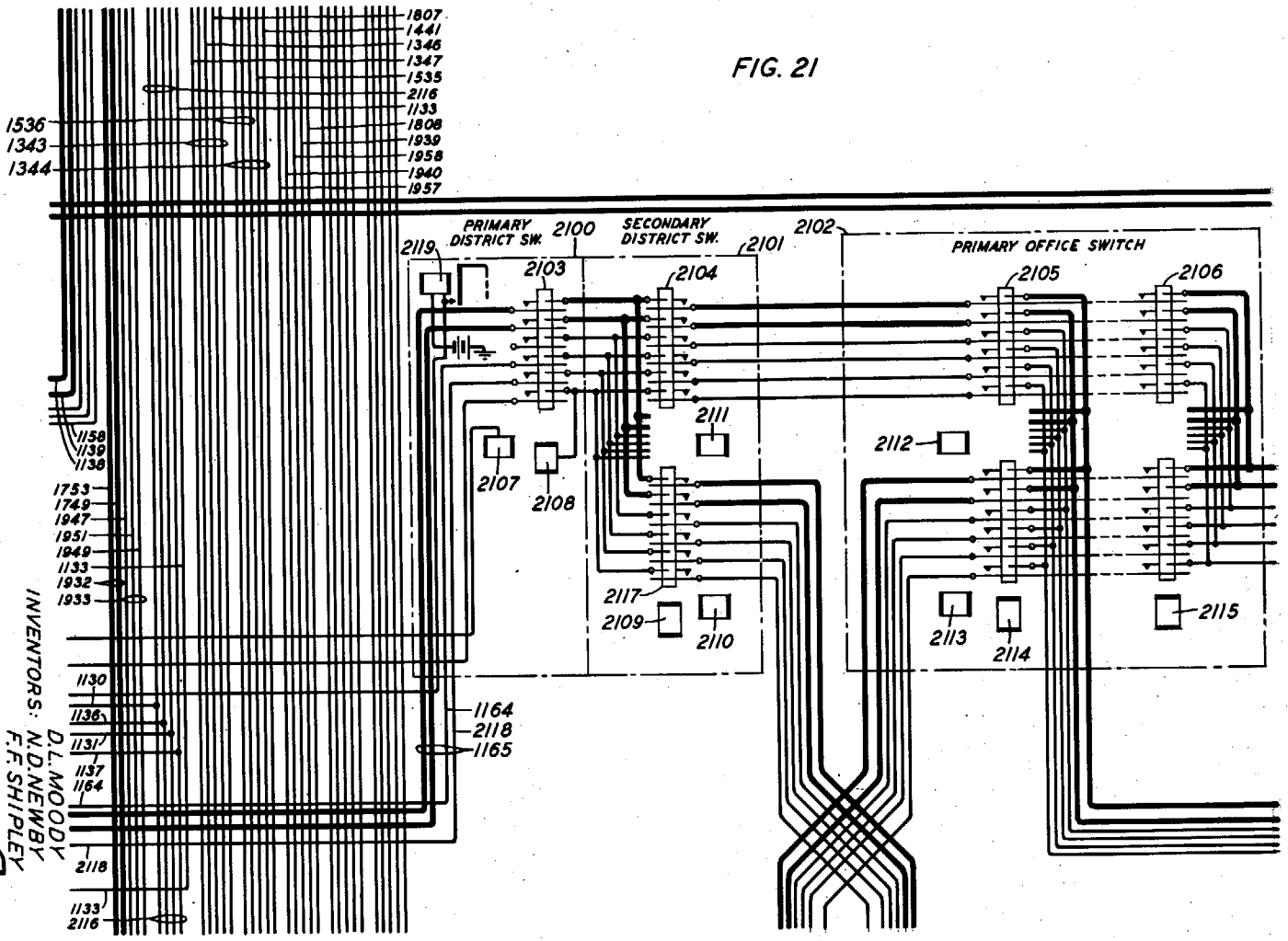
Figure 22:
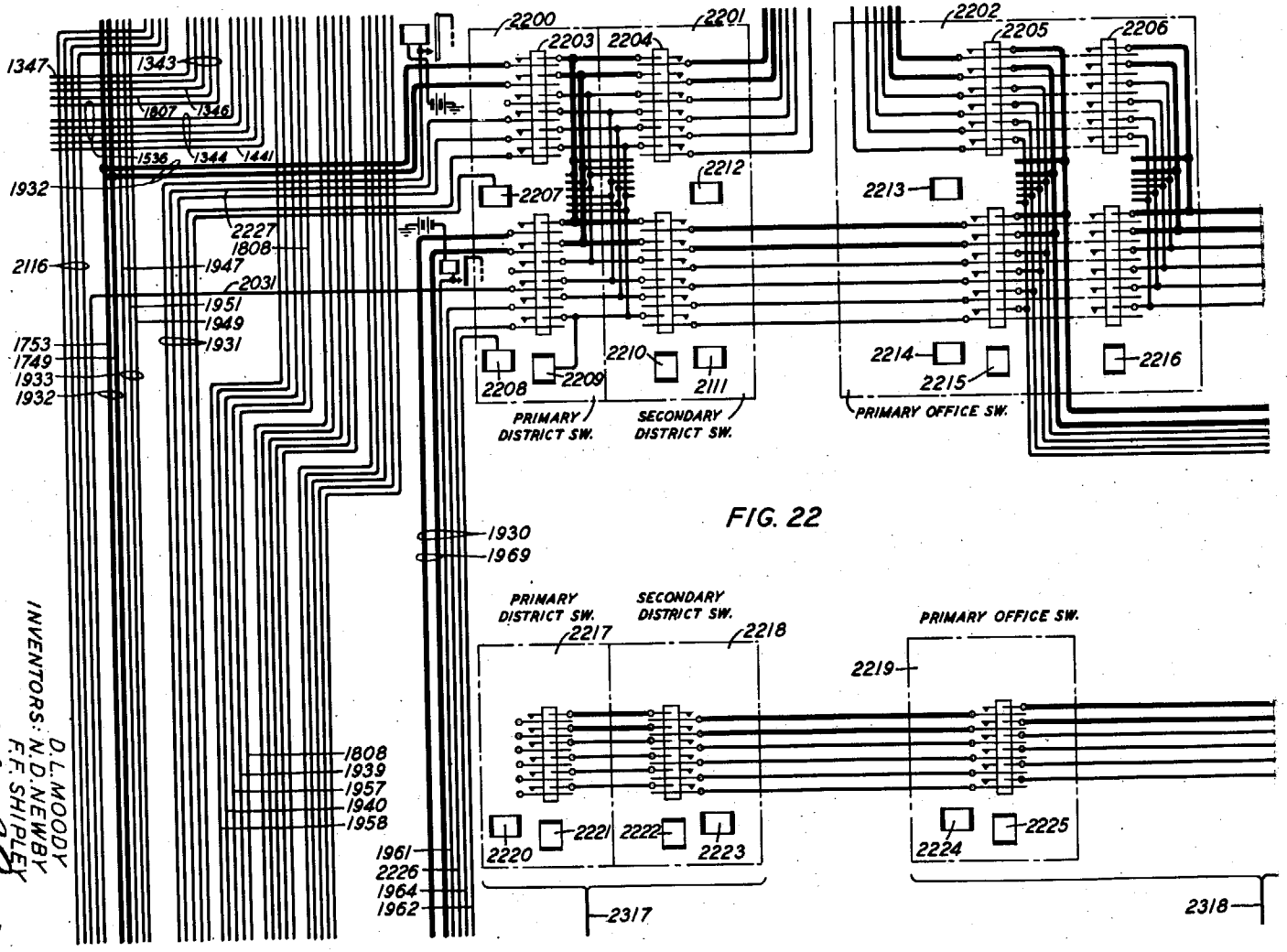
Figure 23:
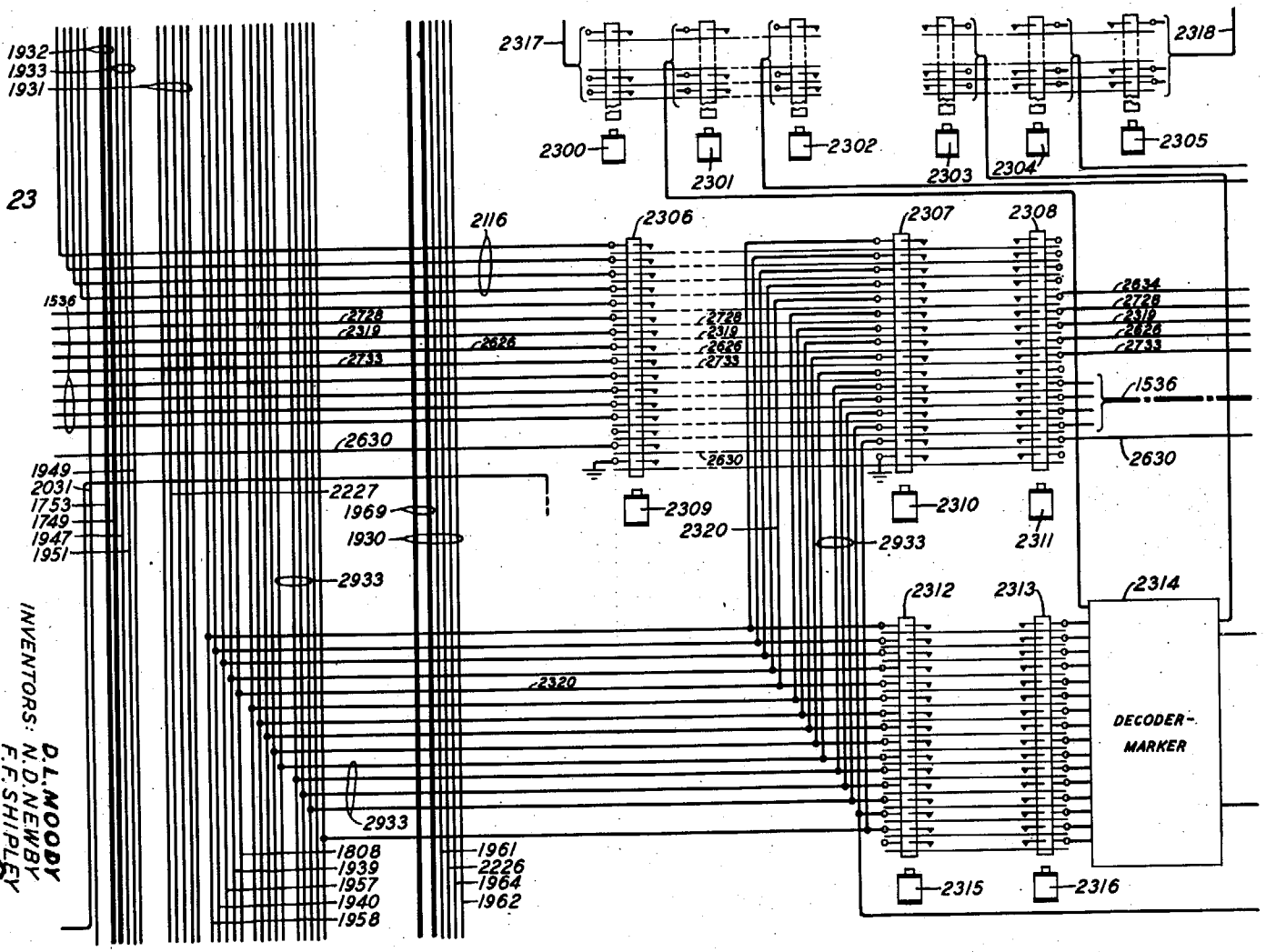
Figure 24:
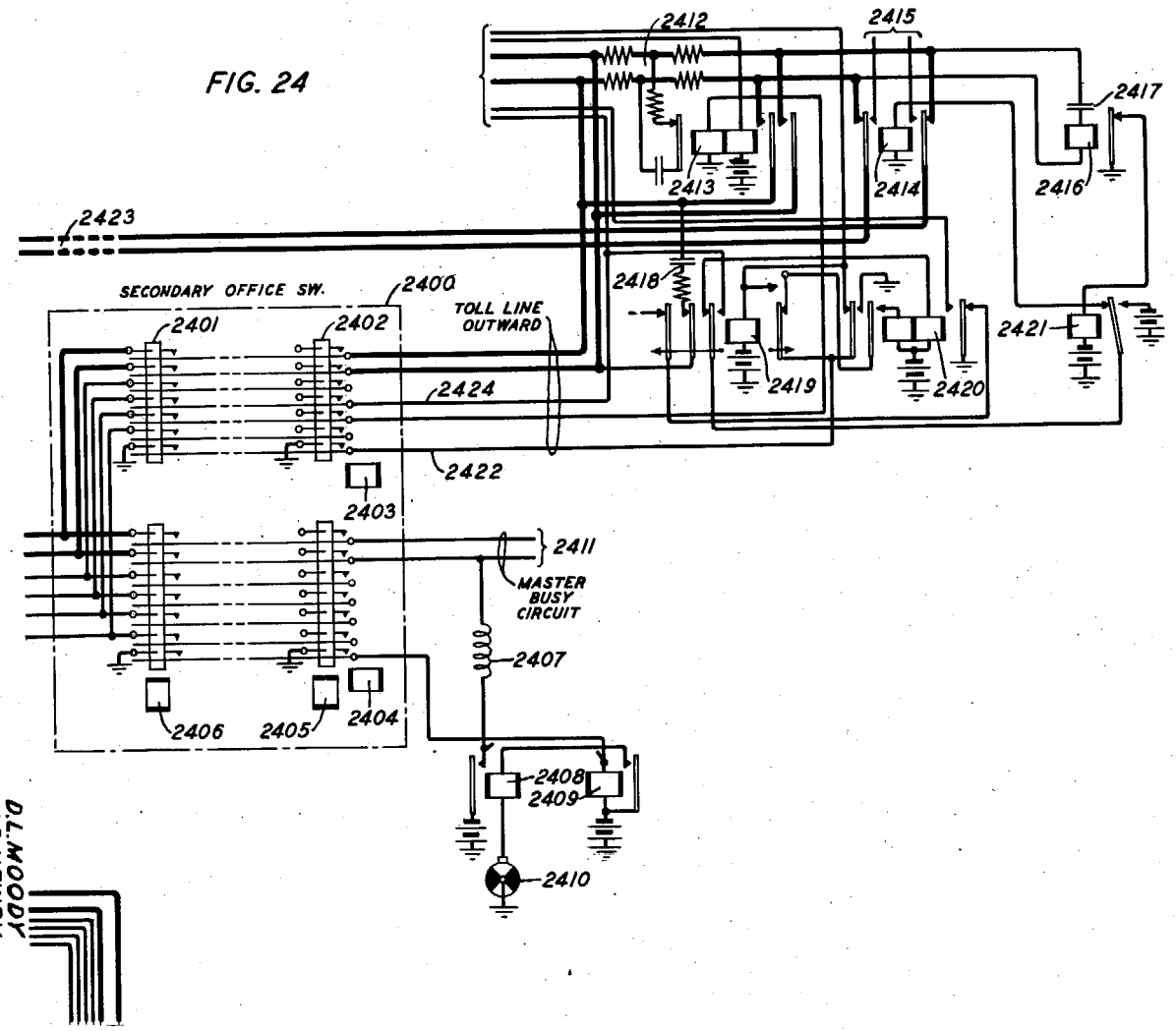
Figure 25:
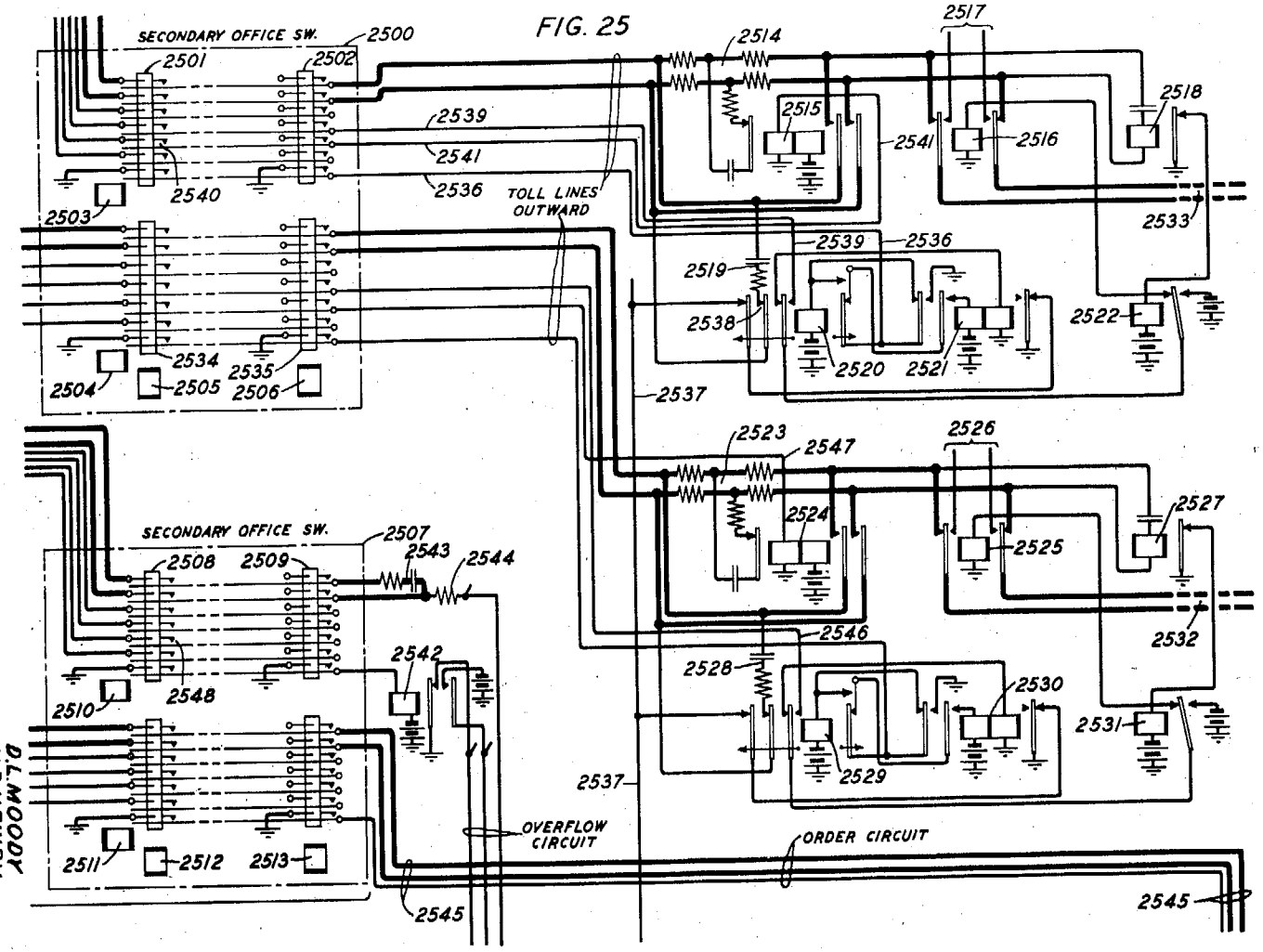

Fig. 8 indicates the toll district and office cross-bar switches subject to the control of the cordless toll operator of Fig. 6; and Fig. 9 one end of a two-way ring-down toll line circuit;

Fig. 10 represents the other end of the two-way ring-down toll line circuit in a second toll office;

Fig. 11 along the left-hand margin shows schematically means for automatically distributing to switchboard paths the calls that come in over two-way ring-down toll lines in the second toll office. The remaining portion of Fig. 11 and all of Fig. 12 represent one of said switchboard paths, controllable by the toll operator either on through or terminating connections;

Fig. 13 represents the position and telephone circuit of the regular toll operator in the second toll office;

Fig. 14 represents a 4-digit storing, transfer, and register circuit;

Fig. 15 shows a portion of the second toll operator's numerical key set;

Fig. 16 shows a portion of the second toll operator's subscriber number storing circuit;

Fig. 17 represents district and office crossbar switches used in completing terminating calls via toll switching trunks to adjacent dial office subscribers such as shown at B in upper right corner of drawing. There also is shown in lower right portion a TX trunk circuit outgoing to manual office subscribers such as shown at C;

Fig. 18 indicates a marker for controlling said district and office switches of Fig. 17;

Figs. 19 and 20 show the switchboard path of a circuit request operator in the second toll office used in completing delayed calls;

Figs. 21 and 22 represent district and office crossbar switches assigned to handle only through calls to a third toll office;

Fig. 23 indicates, schematically, connecting relays that attach decoder-markers for providing the toll or request operator with means for setting up toll connections;

Fig. 24 shows an office crossbar switch, a master busy circuit, and outgoing toll line circuit for handling overflow calls, and delayed calls to another toll office;

Fig. 25 represents office crossbar switches together with associated through toll line circuits, individual overflow circuit, and order wire to request operator.

Figure 26:
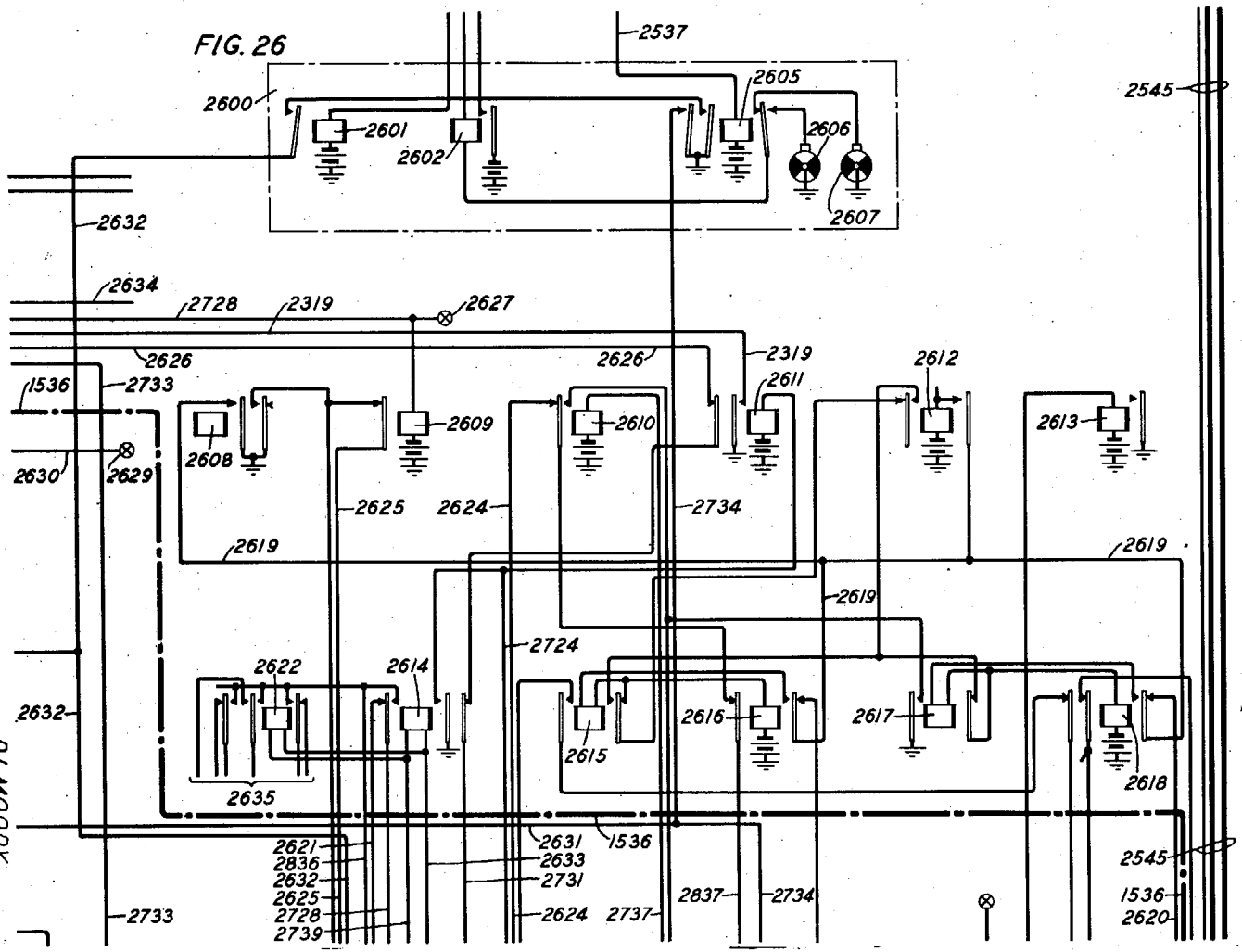
Figure 27:
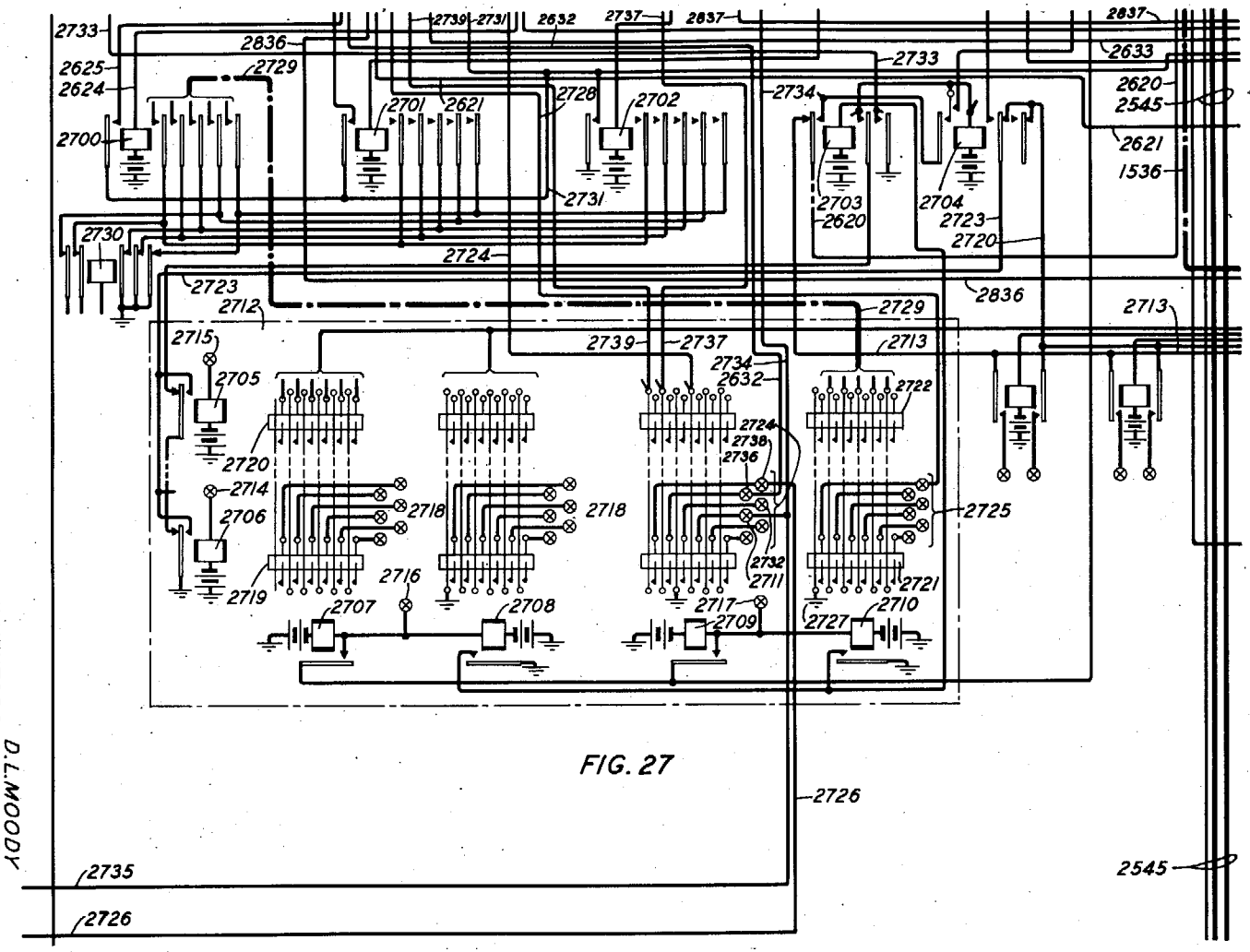
Figure 28:
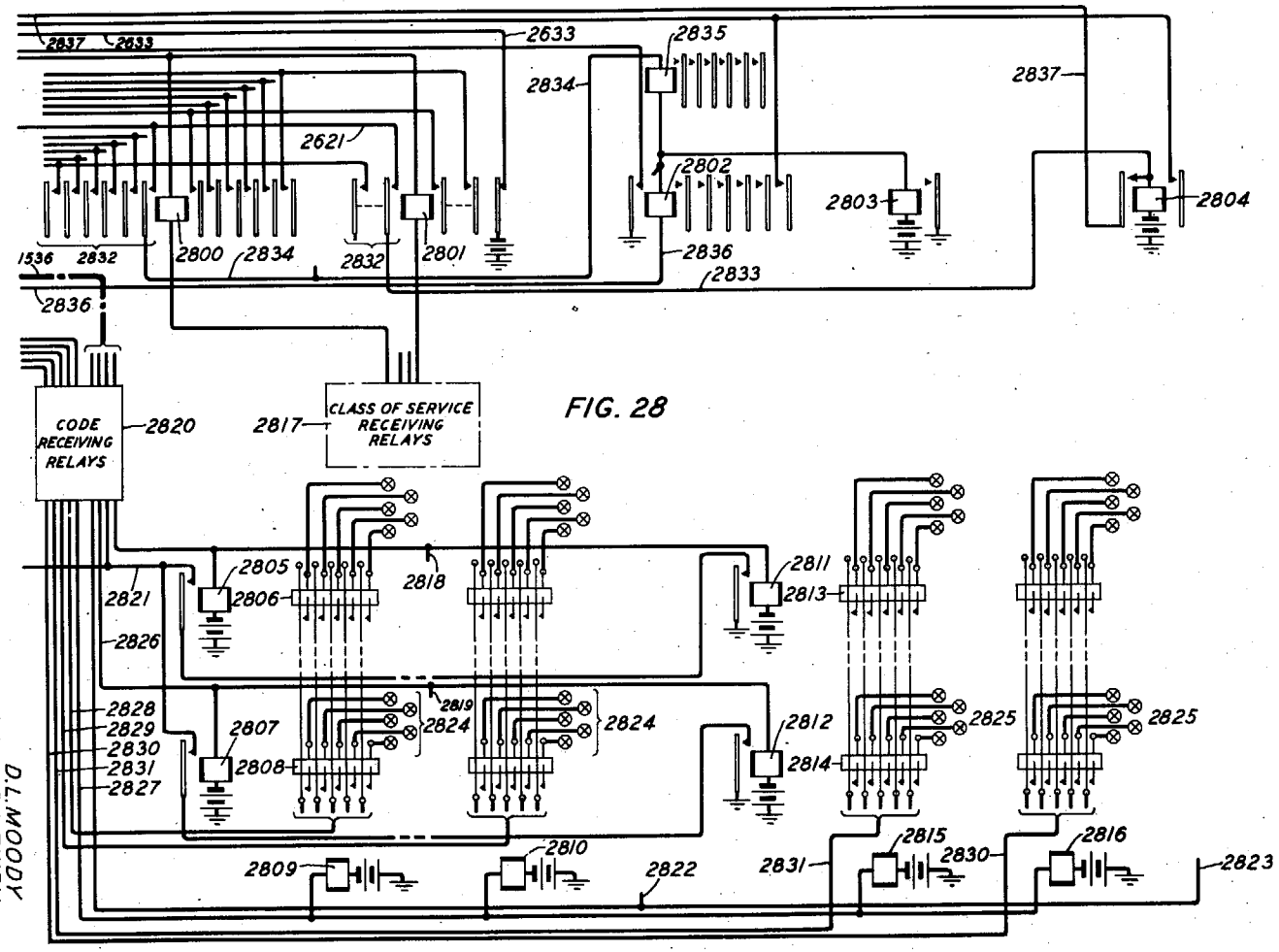

Figs. 26, 27 and 28, together, represent a decoder-marker available to the regular toll operator or circuit-request operator of the second toll office for use on through calls to a third toll office.

Figure 29:
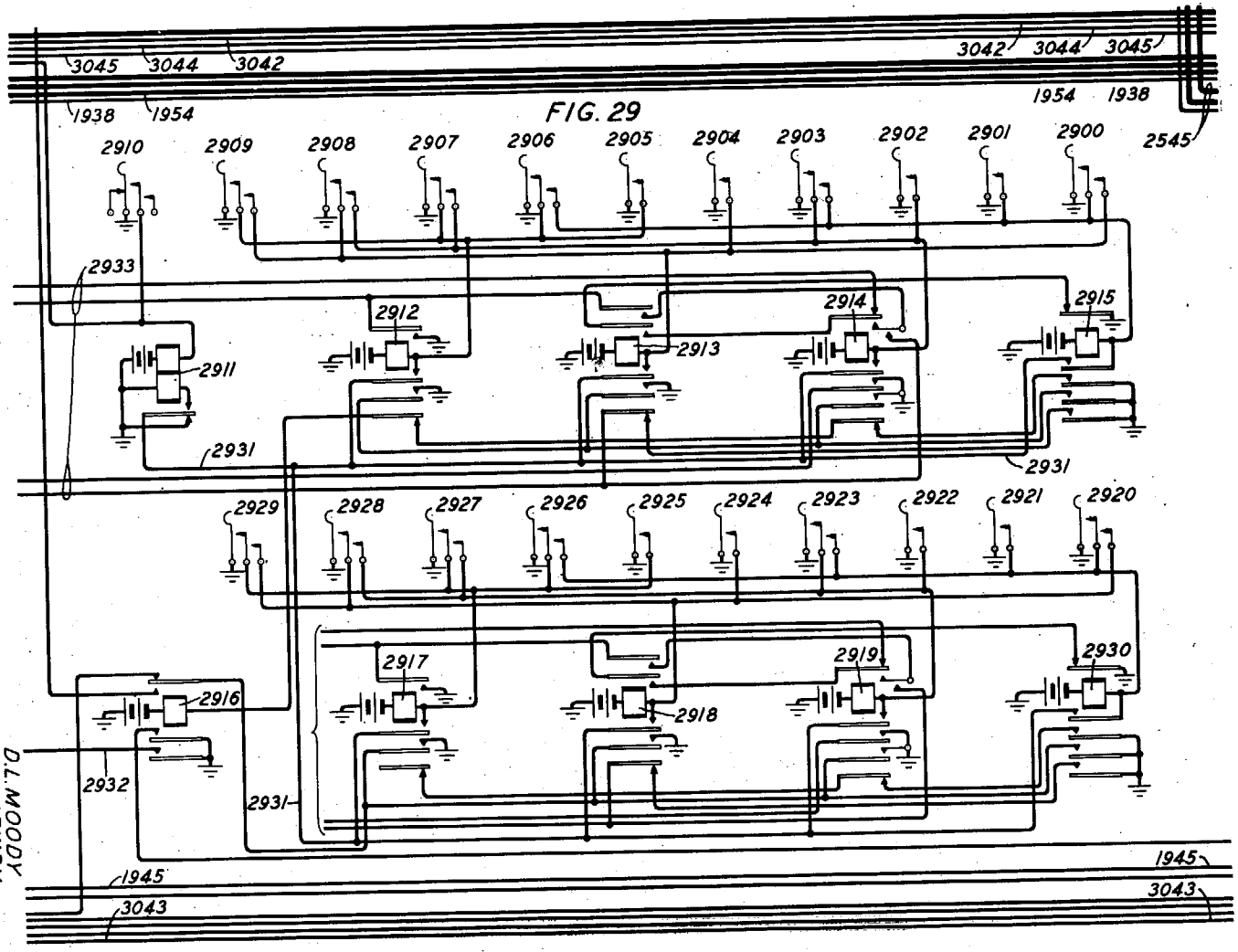

Fig. 29 shows a portion of the request operator's numerical key set.

Figure 30:
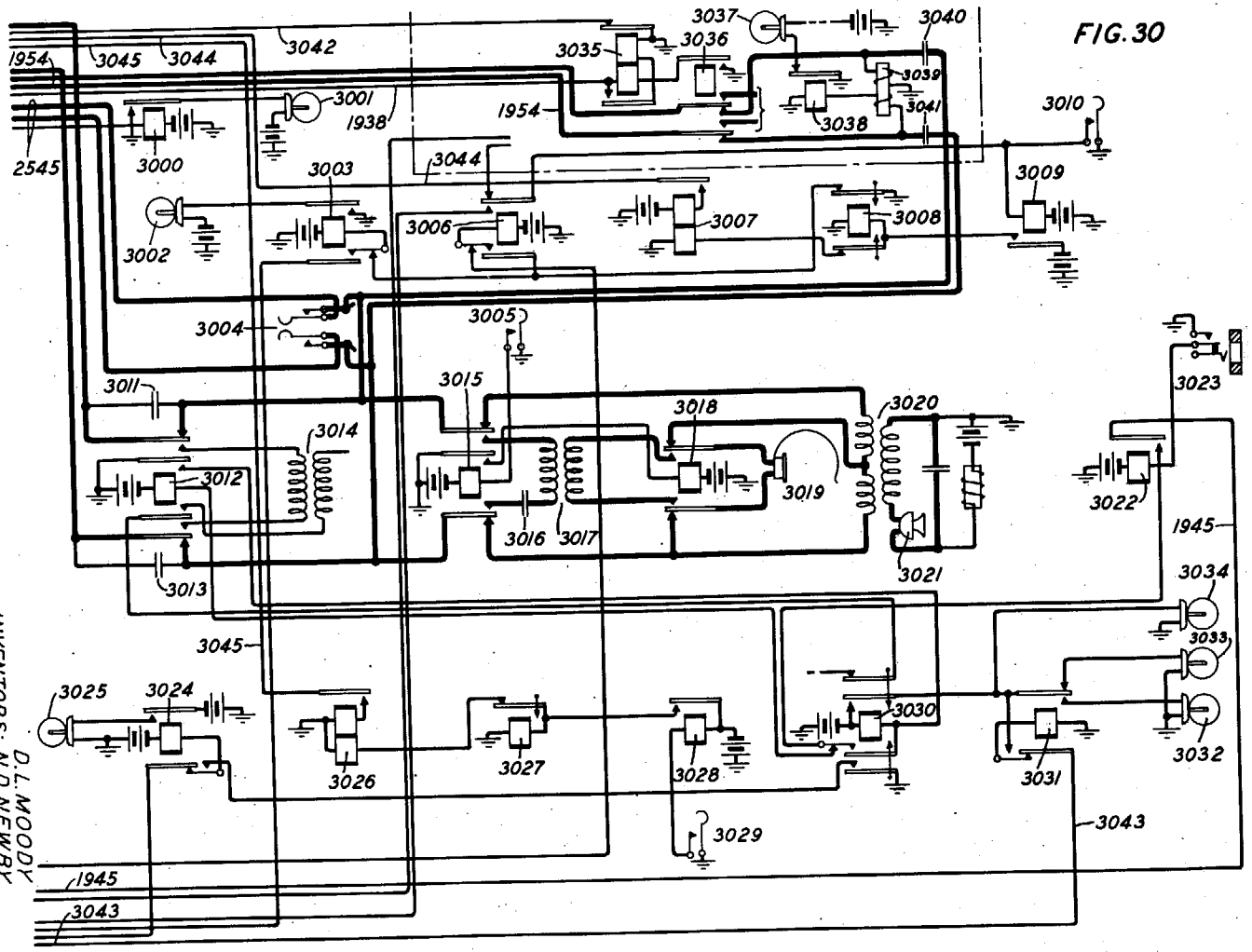
Figure 32:
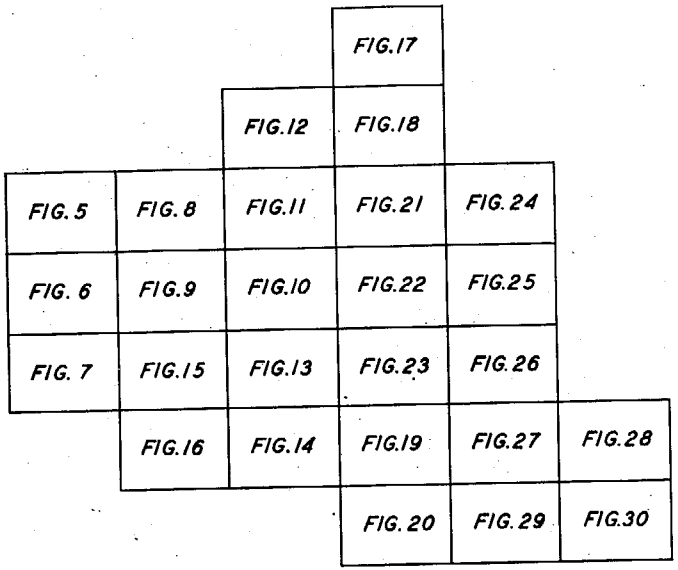
Figure 31:
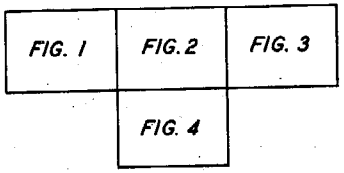

Fig. 30 shows a portion of the request operator's digit storing and transfer circuit together with said operator's telephone circuit.

General Description

Referring to Figs. 1 to 4 inclusive, there is shown a schematic diagram of the assembly of all the various pieces of apparatus and circuits that together form the toll system used to illustrate this invention. In said system the building up of toll connections, instead of being under control of a long distance operator in the nearest toll office, is decentralized and vested in a special dial or keyset operator at local dial offices or with an "A" operator in the local manual office at which the call originates. Instead of the usual trunk and cord circuits at the various toll offices, machine switching equipment of the crossbar type is provided under control of toll operators to enable them to readily and quickly supervise the toll connections. Except for small toll offices, some of the switchboard positions are fitted with what may be termed single-channel equipment while others are fitted with multi-channel equipment.

Single-channel switching equipment is provided for those positions handling calls which do not require further attention on the part of the same operator. Said calls include inward calls from terminal-only toll lines, inward and through toll calls from full-supervision toll lines, and calls incoming from local manual offices for extension over toll lines to tandem or through toll points. On all single channel positions the cordless operator is automatically released after she has finished setting up a connection. If said connection requires the attention of an operator, as it would in case the originating operator rerings on the connection, a link circuit automatically seizes the toll circuit and connects it to an idle cordless operator. Said operator may or may not be the same one who first set up the connection. This is not objectionable since whatever work needs to be done can be performed by one operator as well as another, as indicated to the operator by lamps.

Multi-channel position switching equipment is provided where the toll position is also required to receive calls from toll offices over ringdown toll lines subject to extension to other toll offices. Toll lines terminating at these positions are often costly and the time element valuable so that it is generally the practice to require these operators to go in on through connections and supervise from time to time. A call on any incoming toll line circuit, such as circuit 200 of Fig. 2, therefore remains under the supervision of some particular assigned operator throughout the duration of the connection. Said positions, however, may also receive and complete toll calls terminating in adjacent dial and manual offices.

Switching equipment also is provided at one or more switchboard positions, referred to hereinafter as circuit request or delayed through positions, which enables calls to be completed on a delayed basis. If, for example, a multi-channel position is unable to extend an incoming call because all toll lines to the next office are busy, the call may be routed to a delayed through position where the operator either obtains information on the call or receives said information in ticket form from the through toll operator. Later on when toll lines are available, said switching equipment enables the request operator to build up a new connection back to the calling subscriber's office, to extend the call forward to an operator at the next toll office, and to control all the supervisory features of said connection.

The schematic diagram of the toll system shown in Figs. 1 to 4, inclusive, illustrates the switching means at three typical toll offices. To facilitate a full disclosure, only that portion of the switching means at any one office is shown that is involved in tracing certain typical toll calls. Furthermore, where there are operators' key sets, decoder-markers, crossbar switches, tunks and ring-down toll lines having elements correspondingly drawn or similarly indicated, they are to be assumed as having the same adjustments and functions as those elsewhere described. In general the crossbar switches, the markers for controlling said switches, the marker connectors for connecting the markers to number registering mechanisms, such as keyboards or senders, and the frame connectors which serve to associate the markers with the crossbar switch frames, and the methods whereby these switches are controlled in their selective operations may be the same as those already known in the art. And for a more detailed disclosure of these marker-controlled crossbar switch systems reference is made to Williams Patent 1,553,347 of September 15, 1925; and to the application of Carpenter, Serial No. 27,305, filed June 19, 1935, granted as Patent No. 2,093,117, Sept. 14, 1937. In order to further simplify the disclosure of the present invention, many of the detailed circuits necessary for the various controlling and testing operations involved in the establishment of the connections through the crossbar switches under the control of the markers have been omitted either entirely or partially inasmuch as the structure and functions of this equipment is already known in the art. For a complete disclosure of the details of the equipment thus omitted from the present drawings reference is made to the prior art patents cited herein and particularly to the Carpenter Patent No. 2,093,117, above mentioned. To aid in identifying the various pieces of apparatus, contacts and wiring, reference numbers have been assigned corresponding to the figure number on which they appear.

Figure 1:
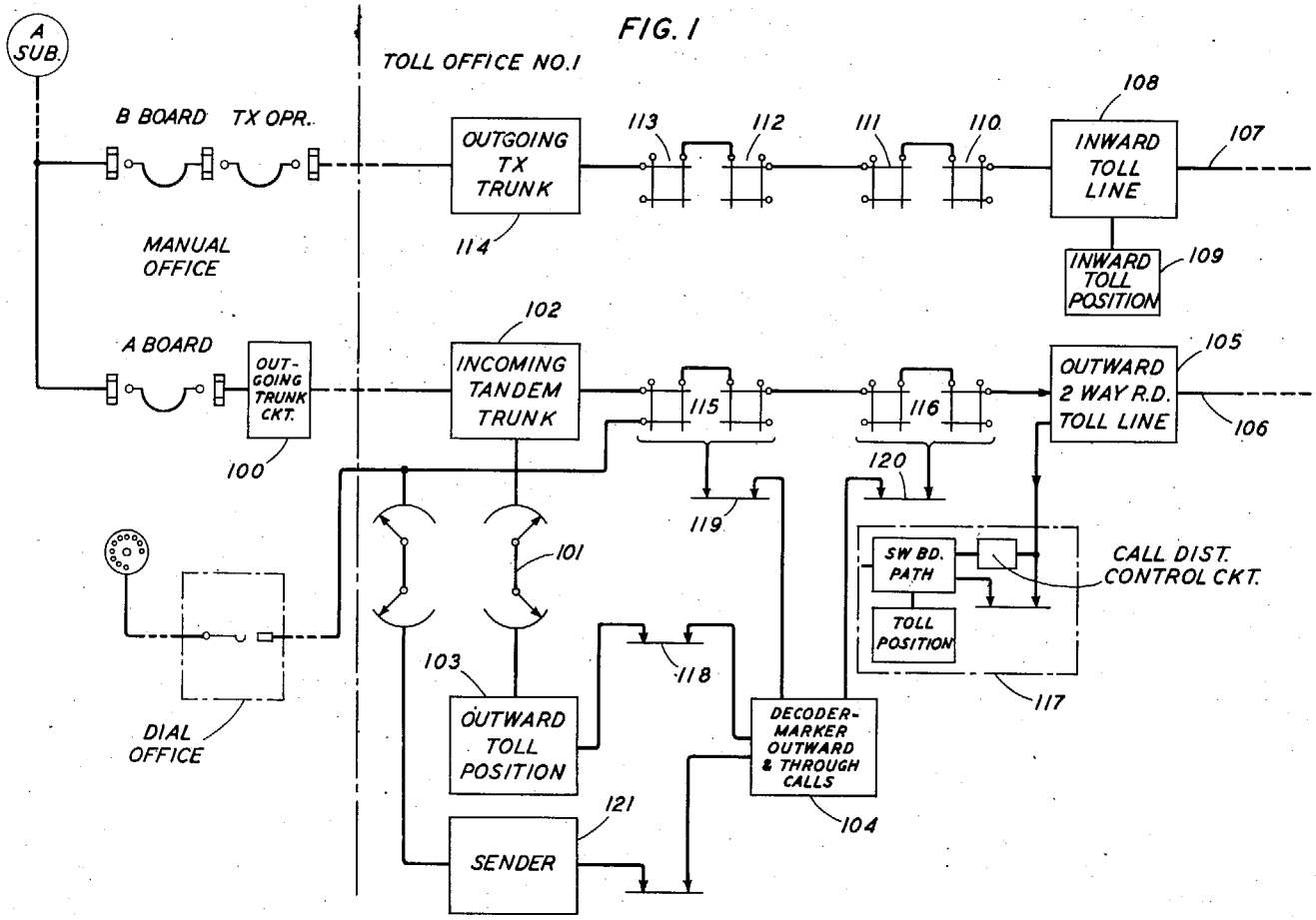

The tracing of terminating and through toll calls in these various toll offices as will presently be described, assumes a calling subscriber A in any well known type of local office, such as the manual office indicated at the left margin of Fig. 1. The "A" operator in said office completes long distance calls originated by A subscribers by inserting any standard manual cord circuit in an ordinary outgoing trunk circuit 100, thereby automatically bringing the cordless operator of the first toll office in on the connection. An indicated in the lower half of Fig. 1, these calls are received in said toll office at single-channel operator positions 103 to which connection is made through any common type of cordless board link circuit 101 which automatically finds a trunk 102 carrying the incoming call. This toll operator listens for the called toll office code number to be passed to her by the calling manual A operator and is then automatically disconnected after setting up the code on her key set. Thereafter the connection is automatically extended to a second toll office indicated in Figs. 2 and 4. The marker 104 in the well known manner controls the selection of an idle path through district switches 115 and office switches 116 for extending the call on trunk 102 to the outward end 105 of a two-way ring-down toll line 106 leading to toll office No. 2. Incoming calls from office No. 2 to toll office No. 1 over toll line 106 would be connected to a multichannel position indicated at 117.

If, as previously referred to, the call originates in a local dial office then the cordless operator 103 would be replaced directly by a sender circuit 121 which would register the code number of the desired toll line group as set up by the originating dial or key set operator and the call from then on through the second toll office would be handled in the same manner as calls from a manual operator.

Figure 2:
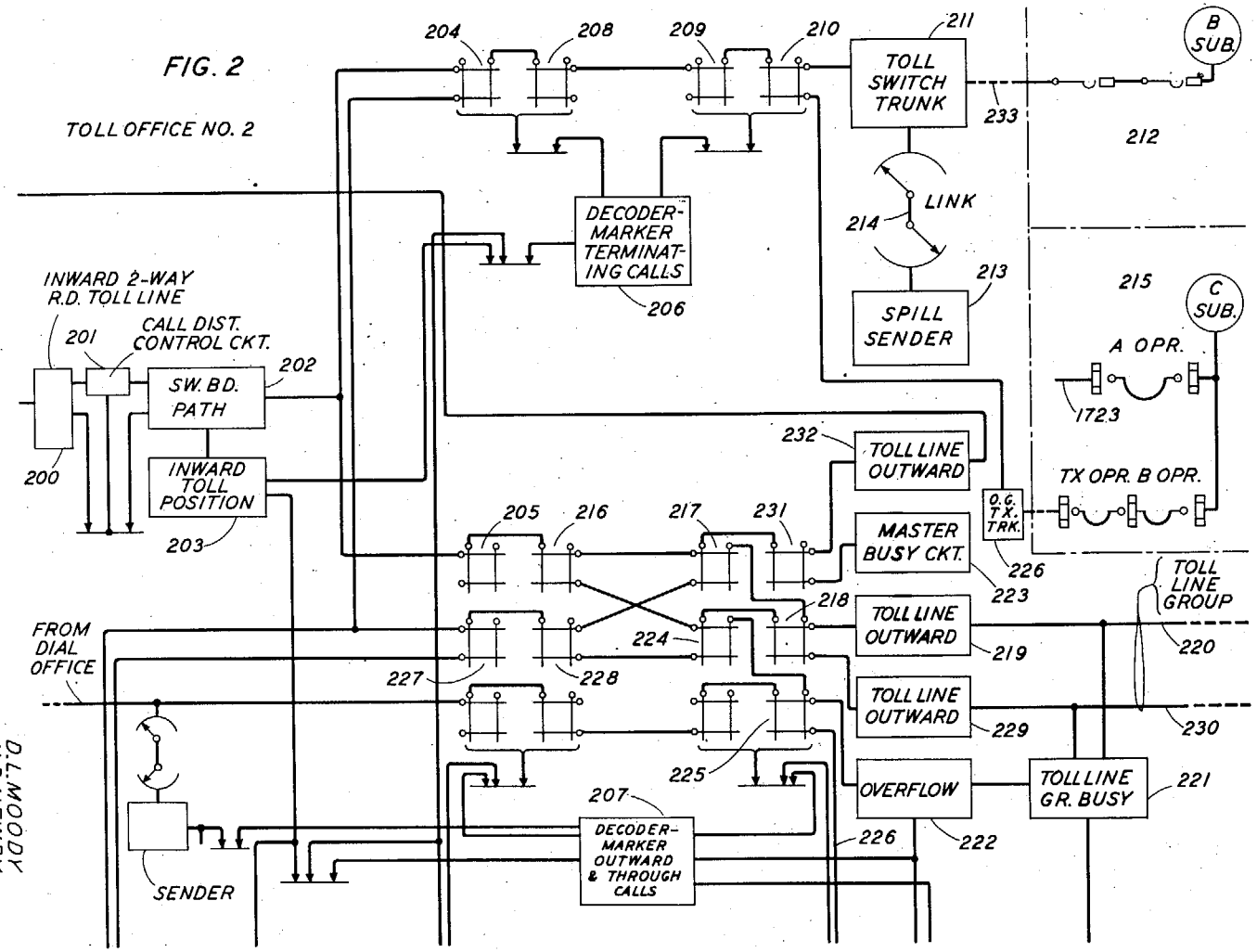

Fig. 2 represents schematically a multi-channel operator position in the second toll office wherein an incoming toll call over toll line 106 is received at the inward end by the toll line circuit 200. By means of well known crossbar call distributing switching equipment indicated at 201, this and other calls automatically select an idle switchboard path 202 appearing before an idle inward toll operator, whose equipment is indicated at 203. A distributing system of this type is shown in detail in Meszar Patent 2,059,596 of November 3, 1936. As will later be described the operator is connected to the switchboard path to which the incoming call has been connected, by means of multi-contact relays instead of by link circuits described for toll office No. 1. Said relays are operated automatically on incoming calls and by operation of a key whenever the operator wishes to supervise on the connection after same is established.

The operator extends connections on the switchboard paths over one of two groups of frames of crossbar switches depending on whether the call is a terminating call or one that requires being extended to a third toll office. The outgoing end of the switchboard path 202 therefore appears both on primary district frame 204 for terminating calls and on primary district frame 205 for through calls. Separate groups of decoder-markers are assigned to handle these calls, one of a group for terminating calls being indicated at 206 and one of another group for through calls at 207. The operator in toll office No. 2 upon receiving the wanted subscriber's cord number from the originating manual A operator sets up same on her position key set and thereby automatically causes one of the two groups of markers to be attached to the position for handling the call. A terminating toll call may thus be traced through district crossbar switches 204 and 208 and office switches 209 and 210 under control of decoder-marker 206 to the toll switching trunk 211 leading over trunk 233 to the called B subscriber in a local machine switching office indicated at 212. On connections of this kind, when the trunk is seized, an idle sender circuit indicated at 213 automatically attaches itself to the switching trunk 211 by means of link 214 and the numerical portion of the called subscriber's number is then transferred from the position storing circuit of the second toll operator to the sender which thereafter directs the switches in local machine switching office 212 to complete the connection. The operator in office No. 2 is automatically disconnected from the switchboard path as soon as she completes writing up the called number on her key set. If it were desired to complete a call to a subscriber C in a manual office such as indicated at 215, then the second toll operator would set up only the code of 3 digits on her key set and she would not be automatically disconnected thus enabling her to pass the order to the manual operator. In this case she would disconnect herself from the switchboard path by the operation of a position wipe out key. However if switching trunks to manual offices are equipped with call announcing senders the operator would write up the complete subscriber's number and be automatically released.

Figure 3:
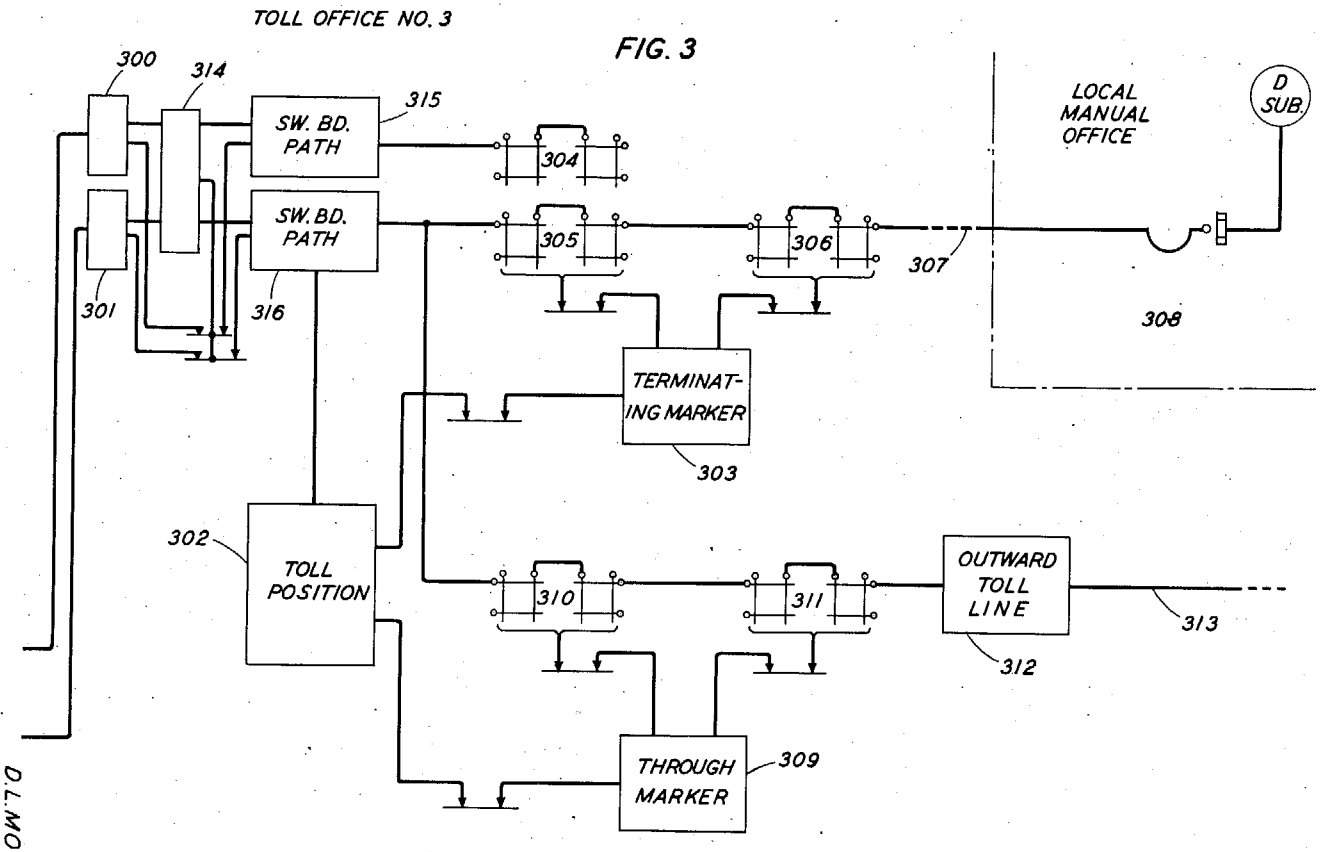
Figure 4:
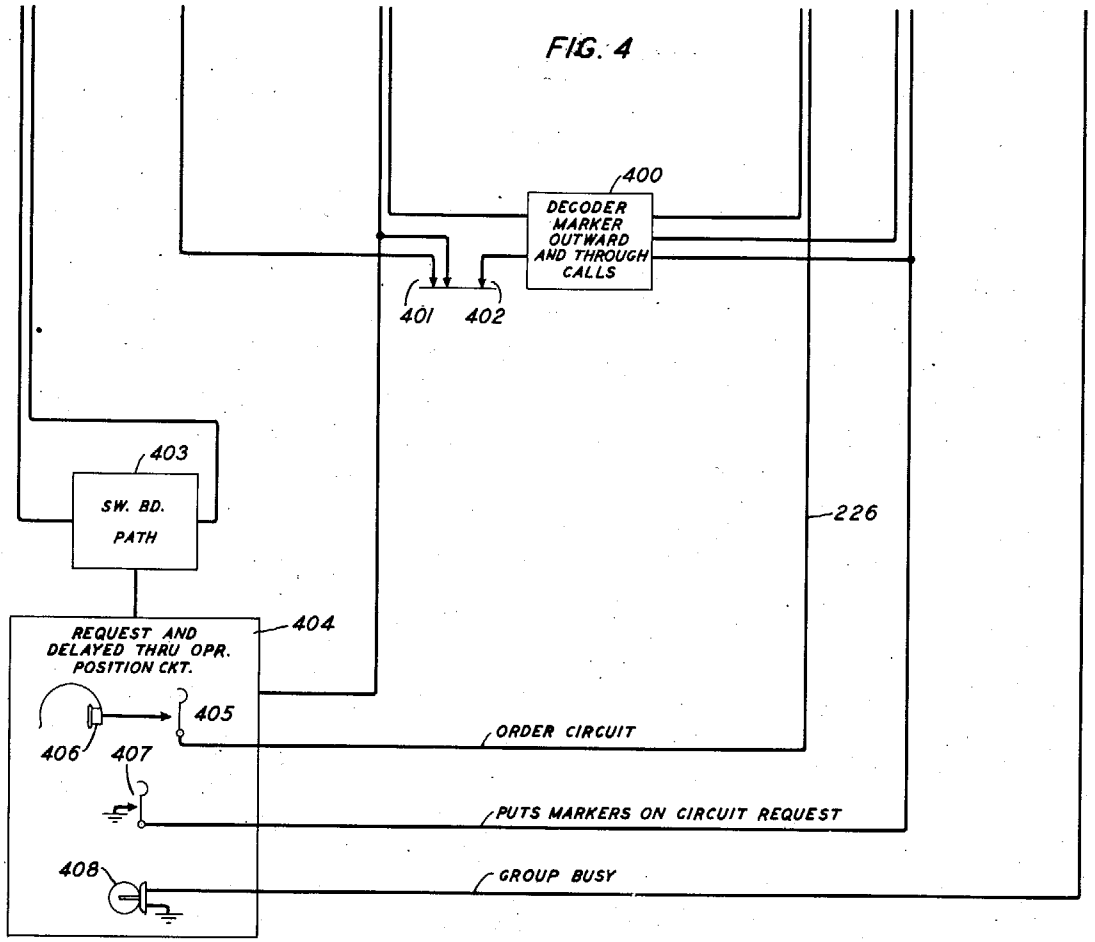

The completion of a through call from the switchboard path 202 may be traced through district switches 205 and 216 and office switches 217 and 218 under control of the decoder-marker 207, to an outward toll line circuit indicated at 219 or 229, thence over toll line 220 or 230 to the inward end 300 or 301 of the line in a third toll office indicated in Fig. 3. A terminating call on either one of these lines for a D subscriber in a local manual office such as 308 is handled at toll position 302 by means of a marker such as 303 and crossbar switches 304, 305 and 306 in the same manner as previously described when the call first reached operator position 203. Likewise the call on either line 220 or 230 may be extended to still another toll office by means of marker 309 and crossbar switches 310 and 311 to the outward end of another toll line circuit 312. The cordless operator's equipment of toll office No. 3 as indicated in Fig. 3, may be assumed to be identical to that shown in Fig. 2 and which is typical of all through offices in a system of this kind wherein on certain types of toll connections the operator may supervise at any time by operating a key in the individual switchboard path circuit and thereby bring her common control equipment into operating relationship with said path.

Arrangements are also made in these offices to facilitate the functioning of the decoder-markers by providing them at all times with information regarding the accessibility of a toll line group without the necessity of obtaining access to the office frame and making the usual test. Thus a toll line group busy circuit in the second toll office is indicated at 221 which together with the overflow circuit indicated at 222 provide the decoder-marker in this office with information; first as to whether all the outgoing toll lines in a given group are busy but with still an overflow path available; and second whether all toll lines and overflow paths are busy, in which case the call is routed to a master busy circuit indicated at 223 in the diagram.

During busy hour periods when calls for some groups of toll lines encounter considerable delay, indicated by lamps such as 408 individual to each group, it is desirable to route these calls to a special operator termed herein the "request operator." Said calls will be so routed as long as key 407, individual to each group of toll lines on which traffic is delayed, remains operated. The operation of this key sets up a request condition in all of the markers having access to said group of lines. Thereafter when the marker receives the record of a call for this group, it omits to test the lines and makes provision at once to extend the above toll call, for example, through the district frames 205 and 216 and the office frames 224 and 225 to an order circuit 226 that is answered by the request operator throwing key 405, thus bringing the call in on her telephone receiver 406.

The request operator in the system of this invention as illustrated in the second toll office is provided with a number of individual switchboard paths such for example as indicated at 403 with which she is enabled to build up connections back to originating subscribers and to extend such connections forward to called subscribers or to succeeding toll operators if the connection is required to be built up through other toll offices. The request operator is provided with a position circuit indicated at 404, that enables her to control any individual switchboard path at will by means of a terminating decoder-marker such as 206 for terminating calls, or markers such as 207 and 400 for through calls. The request operator upon answering a call coming in over the order circuit explains the nature of the delay and then the originating "A" operator asks the through toll operator to either connect the call over an alternate route or make out a delayed call ticket for passing to the request operator. Alternately the request operator may make out said ticket. Tickets of this kind are also received by the request operator from through toll operator positions on overflow and master busy circuit calls as previously explained. The request operator, therefore, in setting up delayed connections works from tickets which have been filed in the time order in which the calls originated.

As indicated in the schematic diagram the request operator may complete a delayed call for an originating "A" operator in a nearby local office such as indicated at 215, by first connecting one end of the switchboard path through crossbar switches 204, 208, 209 and 210 to a TX trunk indicated at 226 and connecting the other end through crossbar switches 227, 228, 224 and 218 to one of the outward toll line circuits such as 229 leading out over toll line 230 to a third toll office whose circuits are indicated in Fig. 3. She may also complete a delayed through call for an originating "A" operator in a distant manual office such as shown to the left in Fig. 1 by first connecting one end of her switchboard path through crossbar switches, 227, 228, 217, and 231, to the outward toll line circuit indicated at 232, thence over toll line 107 to the inward toll line circuit indicated at 108 in toll office No. 1, then through the crossbar switches 110, 111, 112, and 113 to the outgoing TX trunk indicated at 114. The other end of the switchboard path 403 is then connected through crossbar switches 227, 228, 224, and 218 to one of the outward toll line circuits 219 or 229. In either case the request operator usually first builds up the connection to the TX operator in the originating office in anticipation of obtaining an idle toll line although it would also be equally feasible for her to first build up the connection to the called subscriber before completing the connection back to the TX operator.

Detailed Description

Having given a general description of the apparatus involved in this toll system and in order to give a complete understanding of the invention, there will now be described how the A subscriber, whose line appears in jack 500, before a local operator in the manual office shown at the left of Fig. 5, obtains connection with subscriber B in a distant machine switching office shown in the right upper corner of Fig. 17. The operator in the local manual office answers the call with an ordinary type of common battery cord circuit by inserting plug 534 in jack 500. Upon learning that a distant subscriber station is wanted, the operator takes up plug 535 and inserts it in jack 501, thereby extending the call through the auxiliary trunk circuit 525 to the incoming trunk circuit in the first toll office shown in the lower half of Fig. 5. Relay 524 under this condition operates from battery (not shown) in the manual cord circuit and closes the circuit of polarized bridge relay 527 toward the toll office thereby causing both relay 527 and relay 511 to operate over a path traced from battery and ground through windings of relay 511, thence through reversing contacts on relay 512, left windings of repeating coil 515, back over conductors 530 and 531, and toll tandem trunk 529 to the auxiliary trunk circuit described above.

*Connection through first toll office*

The operation of relay 511 connects ground to lead 536, traced further through bottom outer armature and back contact of relay 522, to battery through winding of relay 516 which operates and thereby serves to start one end of an idle link to hunting for the incoming trunk with the incoming call thereon and the other end to hunting for an idle cordless operator position. Since the specific features of this invention are not involved, only a brief outline of the manner in which the cordless operator is attached via the link circuit shown in Fig. 6 is given. For a more detailed description of a system having switching links for extending incoming calling trunks to cordless operator's positions, reference may be had to Patent No. 1,619,250 to Dunham, dated March 1, 1927.

The operation of relay 516 at its top outer make contact closes a circuit for operating relay 512 over a path traced from ground through said relay, top outer contact 518, top outer armature and contact on relay 516, thence through resistance 517 to battery at bottom outer contact relay 520. The operation of relay 512 thus reverses the battery and ground supply through repeating coil 515 and traces back through the auxiliary trunk repeating coil 523 to the winding of polarized trunk relay 527. With this polarity the latter relay releases, thus removing the short circuit around the high resistance bottom winding of relay 524 and causing the supervisory relay in the manual operator's cord circuit to release and light the called supervisory cord lamp. At contact 532 relay 516 connects ground, that is supplied to it from the top outer contact on relay 522, to start lead 533 for operating relay 605. The latter relay represents the group relay of the trunk-finding end of the link circuit which serves to mark the communtator segment of the level in which the trunk appears and by operating other relays, not shown, serves to start the trunk finder switch arms 600 to 604 hunting for the first incoming trunk whose relay 516 has operated. Upon finding said trunk, arm 600 connects ground to lead 627 for stopping said switch. It will be seen that ground on lead 627 serves to operate relay 522 over a path traced through contact 538 on said relay, top inner contact on relay 516, thence through top winding of relay 522 to battery. Although the bottom outer contact on relay 522 opens the circuit of relay 516, the latter relay continues to remain operated over lead 627 through the bottom inner contact on relay 516. Thereafter ground at the bottom inner contact of relay 522 continues to hold relay 522 operated through its top winding to battery over a path traced through the top inner contact on relay 516. Relay 522 operated also locks through its lower winding and bottom outer make contact to lead 536, to which ground is connected by relay 511.

When the link has found the incoming trunk, relay 606 of Fig. 6 operates to close the circuit through to an idle operator position via arms 612, 614 and 616 on the position finder switch end of the link, said switch having previously been started when the trunk finder started to hunt. The circuit is arranged to send, in any well known manner, an order tone, back to the calling operator in the manual office who then passes the code for, or the name of, the toll office through which the desired subscriber can be reached. The talking circuit in this case, as extended over toll tandem trunk 529, is traced further over leads 530 and 531, windings of repeating coil 515, through make contacts on relay 516, thence over leads 539 and 540, terminal 1 of trunk switch arms 602 and 603 through contacts on cut through relay 606, contact on relay 610, position switch arms 612 and 616, to operator's telephone set repeating coil 625, through contacts of relays 618 and position keys 619 and 620.

Figure 7:
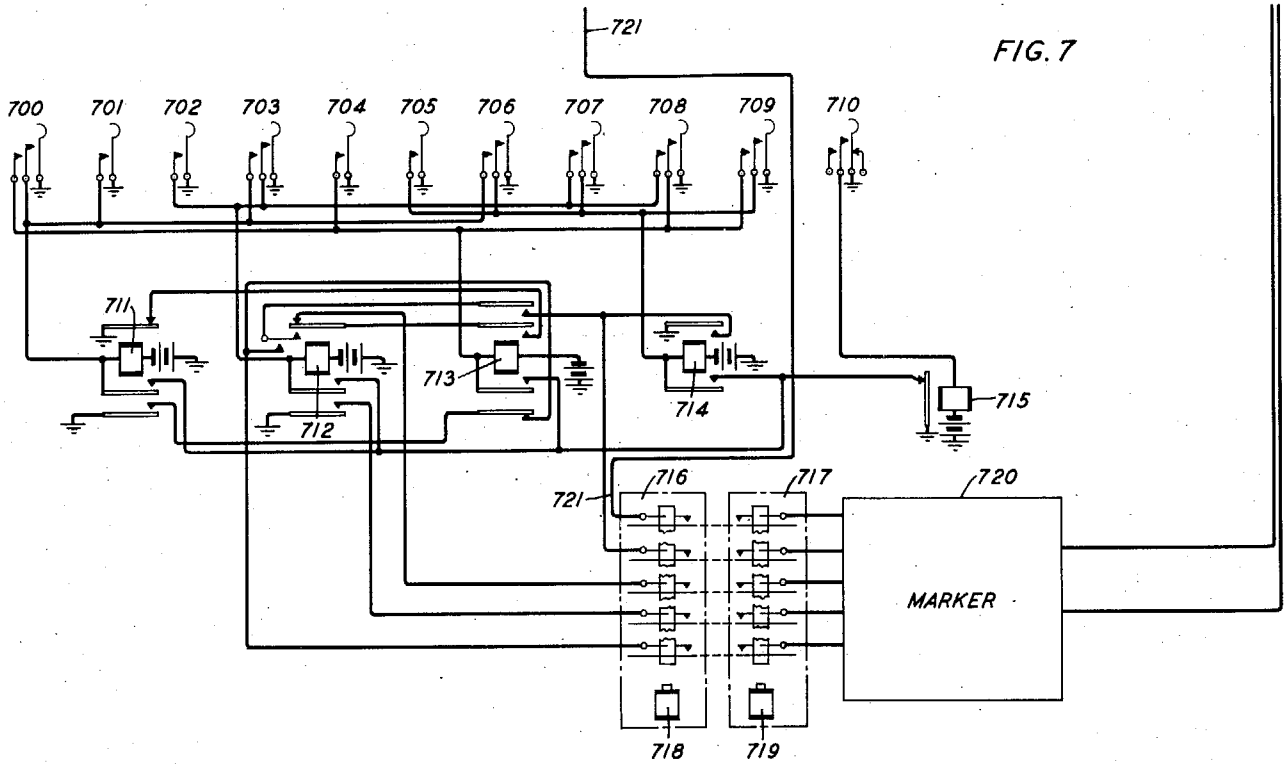
Fig. 7 a key set and marker for said toll operator.

The cordless operator proceeds to set up the code of the desired toll office on her key set, the apparatus for one digit of which is indicated at the top of Fig. 7. As soon as she has completed setting up the number, her telephone set and the office code storing circuit will be freed for another call. On calls to subscribers in adjacent local offices, not shown here, the cordless operator would set up the complete called subscriber's number and in this case the subscriber's number storing circuit would remain on the original connection until it had spilled the number into a sender on the outgoing toll switching trunk. When the operator has registered the first three digits, constituting the toll office code, a decoder-marker is connected to the operator's position. The manner in which the marker connector, such as connector 716—717, is operated to connect an idle marker, such as marker 720, to a digit registering mechanism, such as a register sender or a keyboard, in response to the registering of the office code designation is disclosed in detail in said Carpenter application Serial No. 27,305, filed June 19, 1935, granted as Patent No. 2,093,117, September 14, 1937. The district frame 800–801 to which the incoming trunk of Fig. 5 is permanently connected is indicated to the decoder by virtue of the fact that each district has associated with it a definite group of link circuits. As soon, therefore, as the decorder-marker 720 has access to the district frame through the frame connectors indicated at 822 and 823, the decoder causes ground to be placed on lead 721, which as traced through arm 614 of the operator position switch and top outer contact on relay 606, arm 601 to lead 629, top armature and break contact of relay 520, contact 542 also on relay 520, to battery through relay 519, causes the latter relay to operate. The operation of relay 519 at its top contact extends lead 721 as just traced to lead 543, to operate relay 827 for giving primary switch identification. Ground on lead 629 also may be traced through select magnet 802.

When the crossbar equipment of Fig. 8 has been selectively operated under the control of marker 720 and the connection is to be cut through, ground is removed from lead 721 by the marker, allowing relay 520 to operate. This is due to the fact that when relay 519 first operated ground at contact 544 was connected to winding of relay 520. The latter relay, however, did not operate because of the shunt connected over lead 545, bottom outer contact relay 519, to lead 543, to which the ground over lead 627 is also connected. Therefore, when ground is removed from lead 721, relay 520 operates and at contact 546 locks to ground at top armature on previously operated relay 522, thereby remaining operated during the remainder of the connection. At its bottom outer contact relay 520 removes battery from resistance 517, thereby making the holding of relay 512 depend on battery through coil 628, traced further through contact on relay 606, trunk switch arm 603, lead 539, contact 541 on operated relay 516, and through upper right winding of repeating coil 515 to junction point with resistance 517. At contact 547 relay 520 connects ground to lead 548 for locking the holding magnets 803, 804, 819 and 820 of the district and office switches when operated due to an idle outgoing toll line being found. At its top contact relay 520 opens the path over lead 629 to lead 543. Relay 520 also causes relay 519 to release, thus maintaining shunt lead 545 around relay winding 520 in an open condition.

As soon as the decoder marker has determined that there is an idle outgoing toll line circuit in the group and that the circuit is not arranged for toll line dialing, it will free the operator's telephone circuit for the receipt of another call. When a toll line such as shown in Fig. 9 is connected, battery on leads 630 and 549 through relay 607 from the link causes a pulse of ringing current to be sent out on the toll line. This is accomplished in the following manner: when connection is first made to the toll line, Fig. 9, relay 906 operates in a path traced from battery through winding of relay 906, left back contact of relay 907, lead 909 to ground at lower contact on crossbar switch 817. Relay 906 at its left outer contact opens the lead to the group busy circuit. Relay 906 at contact 910 opens the termination 905 from across the talking circuit in preparation for talking and at its left inner make contact extends the battery path over lead 549, thence over lead 826, to lead 911. Said path is further traced through armature and front contact on relay 908 to ground through winding of ringing relay 902. The latter relay thereupon breaks the talking circuit and connects a signaling source to the outgoing line 912. Said ringing continues to be sent out for a definite time interval dependent on the timing circuit 608 which is brought into action by the operation of relay 607 in series with the ringing relay 902 of the toll line. At the end of said interval ground is connected through the left contact on relay 607 to the release magnet 609, thereby causing the link of Fig. 6 to release. Ground is thus removed from lead 627 causing relay 516 of the incoming trunk to release and close the talking circuit through to the connected toll line. Relay 902 is likewise caused to release, leaving relay 512 connected through the top outer normal contact on relay 516 to leads 549, 826 and 911 as previously traced, so that any ringing signal received from the distant toll office will cause relay 908 to release and connect battery to said leads for operating relay 512 and sending a signal to the originating manual operator. If the toll line were of the straightforward type said battery would continue to hold relay 512 operated until a receiver off hook signal is received. The originating manual operator may ring on the toll line, thereby operating relay 513 which in turn operates relay 518 to place battery on lead 551 to the toll line and furnish ground for holding line relay 511 operated. Battery on lead 551 traced over lead 549 causes ringing to be sent over toll line 912. In this manner the call is extended to the incoming toll line circuit of Fig. 10 and thereafter requires no further attention from the cordless operator. In the case of ring-down toll lines, ground at contact 550 on relay 522 may be omitted, thus leaving the connection under the control of the originating operator, that is, ground from relay 511 to lead 536 through the bottom outer make contact of relay 522 alone holds the latter relay operated through the lower winding. On straightforward toll lines ground at contact 550 on relay 522 is connected, thus making it necessary for both the manual operator and cordless operator to disconnect in order to break down a partially built up connection.

If the originating manual operator wishes to recall the cordless operator at the first toll office, she may operate the flashing key in her cord circuit (not shown) thereby releasing and reoperating relay 511. Relay 511, in releasing, releases relay 522 and on reoperating recloses the circuit of relay 516, which operates, and again ground start conductor 533 to cause the link circuit of Fig. 6 to associate an idle operator with the previously established connection.

*Connection through second toll office*

It has been assumed in describing the call thus far that any idle operator in the first toll office may serve the incoming call by means of the link circuit of Fig. 6. Said inward call having been described as extended to the incoming toll line of Fig. 10, it will now be assumed in tracing the call through the second toll office that subsequent supervision is required by the same operator who originally handled the call. In this case the incoming line is permanently assigned to a cordless operator's position, each position having as many lines as the operator can handle. Among the circuits of these calls are via grade lines and combined via and terminating lines, the circuit of Fig. 10 representing one of the latter. In order to cut down the number of switchboard paths to which these lines connect, crossbar call distributing frames such as shown at the left in Fig. 11 are usually employed and for the purpose of description are only briefly indicated. For details of this equipment reference may be had to the above-noted Patent No. 2,059,596 dated November 3, 1936, to Meszar. For the purpose of this description one such switchboard path is shown in Figs. 11 and 12 arranged to connect with two groups of switch frames, one as shown in Fig. 17 for obtaining access to switching trunks and TX trunks and one as shown in Fig. 21 for reaching toll lines to a third toll office. The switchboard paths such as the one here shown are associated with the operator's equipment shown principally in Fig. 13 by means of connecting relays represented by relays 1114 and 1115 instead of by link circuits as described for the first toll office. Both of said groups of switch frames, which are of the crossbar type and which comprise district and office frames, are under the control of the cordless toll operator in the second toll office.

*Toll operator answers*

There will now be described the manner in which the call that has been extended to the toll line of Fig. 10 reaches the cordless operator in the second toll office. When a timed period of ringing current is sent out over toll line 912 by the toll line circuit Fig. 9 as previously described, said signal operates relay 1004 through condenser 1003, thereby removing ground from the winding of relay 1005. The release of the latter relay connects battery to lead 1009 which may further be traced through right inner armature and normal contact of relay 1007 to ground through left winding of relay 1006. The latter relay operates and through its right winding and two right inner contacts locks to ground through the left normal contact on relay 1007. Relay 1006 at its left armature transfers ground from the group busy circuit to lead 1010 for starting the call distributing control equipment 1100. The locking ground for relay 1006 at contact 1011 is also used to ground lead 1018 leading to the associated office frame for making this toll line test busy to calls from the second toll office.

When the call distributing control circuit 1100 together with the associated crossbar switch frames 1101 and 1102 has connected the incoming toll line to an idle switchboard path, said toll line talking conductors may be traced from toll line 912 over conductors 1012 and 1013, through armatures and back contacts on relay 1002, conductors 1014 and 1015, through pad circuit 1000, thence over conductors 1016 and 1017 and through call distributing switches 1101 and 1102 to conductors 1117 and 1118 of the switchboard circuit. A circuit from battery through relay 1007 over lead 1019 is also closed by the call distributing switches to lead 1119 for cutting the switchboard path through to the operator. This circuit is further traced over lead 1120, winding of relay 1221 to ground at back contact of relay 1218. The operation of relay 1221 at its left outer break contact removes ground from lead 1227 thereby making this switchboard path test busy to other incoming calls. Relay 1221 at its left outer make contact closes ground to lead 1228 for operating series relay 1225 over a path traced through top outer contact of relay 1115, left outer contact of relay 1107, leads 1121 and 1229, thence through top outer contact on relay 1225 and through its own winding and bottom inner contact, through the bottom inner contact on similar intermediate relays and then through bottom inner contact of relay 1224 to lead 1231 to battery at back contact of relay 1300 of the cordless operator's circuit. When relay 1225 operates at one of the bottom outer contacts, it closes battery to lead 1232 for operating relay 1300. Since relay 1225 is associated with one particular switchboard path it will be evident that only one such path may gain access to the operator at a time, relay 1300 being used to open the battery that would allow other series relays to operate. Also if any switchboard path is connected to the operator, making her busy, one of the relays 1224 to 1226 will be operated, thereby preventing ground that is on lead 1233 from being closed to lead 1235 leading to the call distributing circuit. This prevents this particular operator position from being selected on any other incoming call. Relay 1225 once operated, locks through its own top outer armature over lead 1256 and through resistance 1257 to ground at contact 1258 on relay 1218.

The operation of relay 1225 at its top inner contact closes a circuit for operating relay 1114, traced from battery through said relay winding, lead 1122, top inner make contact of relay 1225, thence through other similar relay contacts over lead 1233 to ground on lower contact of relay 1302. The latter relay is operated at this time due to the operator's plug being inserted in telephone jack 1301. The operation of relay 1114 in turn, at contact 1123, closes a circuit for operating relay 1115 over a path traced from battery through lower winding of relay 1115, lead 1152 and bottom outer contact of relay 1225, thence over lead 1250 and through contact 1123 on relay 1114, lead 1124 to ground at bottom contact relay 1426 unless the operator's sender circuits are all busy. In the latter case relay 1426 would be operated, thereby preventing the connecting leads controlled by relay 1115 from being closed through to the sender. In this way the two relays 1114 and 1115 connect a particular switchboard path through to the operator and associated sender. All the leads necessary for controlling the switchboard circuit obviously pass through contacts on these relays and will be further traced in connection with the various circuit features that will presently be described. The operator is informed that a call has come in on the switchboard circuit of Figs. 11 and 12 by the flashing of the individual guard lamp 1222 over a path traced from battery through lamp 1222, left inner contact operated relay 1221, lead 1234, contact 1125, on relay 1114 to ground at interrupter 1111. The talking conductors 1117 and 1118 of the switchboard path from the calling manual operator are transferred at contacts 1126 and 1127 on relay 1114, thence over leads 1128 and 1129 to the operator's telephone circuit. Order tone through coil 1311 at this time is sent back over the extended toll line to the manual "A" operator due to relay 1314 being operated over a path traced from battery through said relay, bottom inner contact of relay 1325, top contact on operated relay 1302, to ground at contact on relay 1114. The order tone is also transmitted to the operator's telephone set 1303 through condensers 1313 and 1315 as an aural signal that an order may be anticipated from the manual A operator. Relay 1314 at its top inner contact in turn operates a slow to operate relay 1325 which at its bottom inner contact opens the circuit to relay 1314, thereby cutting off the order tone.

Relay 1325 at its top contact also connects battery for lighting the common position lamp 1319 to indicate to the operator that a switchboard path is connected. Said battery through top armature and top contact on operated relay 1322 also lights position lamp 1321 to inform her that the call to which she is attached is a new call as distinguished from one previously connected. High resistance relay 1322 operates on new or incoming calls over a path traced from ground through its own winding, bottom normal contact, leads 1345 and 1132, contact 1134 on relay 1115, left inner armature and contact 1107, and contact 1135 on same relay, thence through winding of relay 1109 and lead 1236 to battery at right outer contact on operated relay 1221. Relay 1109 does not operate at this time because of relay 1322 being high resistance. When relay 1322 operates it locks through its bottom contacts through battery at top contact on relay 1325 for the remainder of the time the switchboard circuit is connected to the operator.

*Toll operator sets up connection*

The manual operator upon hearing the order tone gives the number of the wanted subscriber B which to the second toll office appears as a subscriber in the nearby machine switching office shown in upper right corner of Fig. 17, and is referred to as a terminating connection. The cordless toll operator of office No. 2 proceeds to write up the number on her key set, wherein two sets of code keys out of the usual three are shown in Fig. 15 and two of the usual four sets of subscriber number keys in Fig. 16. Since the connection assumed is a terminating one, the first of the code numbers as set up on the keys on Fig. 16 will be such that it fails to operate relay 1530 so that therefore relays 1116 and 1213 receive no ground on which to operate. In the case of through calls the first of the code numbers would cause relay 1530 to operate and therefore operate relays 1116 and 1213 as will later be described. Since the latter relays do not operate, identification leads 1130 and 1131 are therefore grounded by relay 1114 at its top outer make contacts, and in this way information is passed to the decoder as to which of the two district frames the switchboard path is to be further extended. The code numbers in the wanted subscriber's number thus cause the position to be associated with marker 1803 for controlling the terminating frames of switches 1700, 1705, 1710 and 1715 over groups of leads designated 1343, 1344 all in a manner similar to that described in the above-noted Carpenter application, Serial No. 27,305, filed June 19, 1935, granted as Patent No. 2,093,117, September 14, 1937.

*Key setting and digit storing of office code*

It is assumed that a three-digit code, the first digit of which is always zero or 1 will be used for each group of outgoing toll lines. If, as in the case of the call now being traced, a code with a first digit other than 0 or 1 is set up on the key set, the digit storing circuit recognizes it as a local office code due to the failure of relay 1530 to operate. When the third digit key of the code is operated a circuit is closed for causing the trunk decoder and marker 1803 to be connected to the operator position through the decoder connector switches 1800, 1801 and 1802. This path may be traced from ground through a make contact on any one of the operated relays 1511 to 1514, to the lead 1531, thence in series as indicated at 1532 through similar contacts on relays corresponding to the keys of the second digit storing circuit (not shown), lead 1533, through a contact on any one of the digit storing relays 1516 to 1519, corresponding to the third code digit, to lead 1534. Relay 1530 being normal, this path is further traced through the top armature and back contact of said relay over lead 1535 to decoder connector switch 1800.

Prior to the operation of the third code key the operator may correct a key setting by momentarily operating sender wipe out key 1510 which causes relay 1515 to operate and lock at its bottom winding and contact to any digit storing relay that may be operated. Relay 1515 at its bottom break contact then removes the ground used to hold a digit storing relay operated. After the third code digit key is operated the operator may not be able to wipe out the position sender before a decoder-marker is connected. On through calls where a line in the outgoing trunk group is available the posiiton may be released before the sender wipe out key can be operated. If the key is operated before the position is released, the release forward key 1316 must also be operated to insure that a connection, if started, will be broken down.

*Decoder connected*

The code is transferred to the decoder on three groups of four leads each, the first being indicated at 1536 and the third group at 1537. The frame identification is transferred in practice to the decoder-marker on a group of four or five leads depending on the total number of district frames used. In the present instance these leads are indicated at 1130, 1131, 1136 and 1137, and at 2116 on Figs. 18, 21, 22 and 23. When the decoder is finished with the code storing relays of Fig. 15 it places a ground on dismiss lead 1807 which may be traced through the upper winding of relay 1515 to battery. The operation of the latter relay then releases said code storing relays.

If the code set up is for another toll line group that is not arranged for toll line dialing or keying and in which there is an idle line, the decoder immediately releases the position from the switchboard path by placing ground on lead 1346 which operates the wipe out chain relays 1338, 1339 and 1340 as will later be described. Relay 1337 is operated on through calls due to relay 1530 of Fig. 15 being operated to connect ground to lead 1538. The decoder also places ground on lead 1441, thereby operating relay 1421 to free the rest of the position sender or digit storing relays.

If the desired toll line group is arranged for toll line dialing or keying, a pulse of ground on lead 1347 from the decoder serves to operate relay 1324 which locks to ground at contact on relay 1325 and lights toll line dialing pilot lamp 1323. Under this condition ground is not placed on lead 1346 and the operator is not released automatically.

If the desired toll line group contains no idle lines, the decoder places a momentary ground on lead 1348 for operating relay 1335 which locks to ground on relay 1339 and lights all lines busy lamp pilot 1336. The operator is not disconnected automatically under this condition, but remains on the connection to pass this information back to the operator in the originating office, and awaits instruction. In the meantime, the decoder causes the connection to be extended to an idle overflow terminal associated with the desired toll line group or causes the connection to be extended to either a master busy terminal or the circuit request operator, depending on what information has been previously recorded in the decoder as will later be described.

*Key setting and storing of subscriber number*

The operator writes up the wanted subscriber's number, assumed for the purposes of this description to consist of four digits on the four strips of keys, two of which are shown in Fig. 16. As in the case of the code digits, various combinations of relays associated therewith operate to record the subscriber number. In addition, as each digit is stored, a relay such as 1414 for the first digit and 1418 for the fourth digit, operates in an obvious manner. Pilot lamps 1415 and 1419, respectively, are associated with these relays and serve as a check to the operator on the digits set up. As long as one or more digits are stored or relay 1408 remains operated, relay 1425 is held operated. The latter relay at its top armatures serves to disconnect leads 1350 and 1430 from the operator's telephone set at the top of Fig. 13 and to connect them to leads 1433 and 1434, respectively, of Fig. 14, the former leads at contacts 1161 and 1150 respectively on relay 1115 at this time being extended to outgoing talking conductors 1138 and 1139. Relay 1425 at its bottom contact also operates sender busy relay 1426 over a path extending through the top winding of relay 1426, lead 1435 and top inner make contact on relay 1115 to battery through upper winding of said relay, thus holding relay 1115 operated. Operated relay 1426 at its bottom contact removes ground from lead 1124, which as previously traced served to operate relay 1115 when relay 1114 first operated, so that a relay 1115 in another switchboard path cannot be operated. The bottom winding of relay 1426 is high in resistance so that it will not be released until the locked up relay 1115 in the switchboard path restores to normal. The operation of each relay 1414 or 1418 corresponding to each digit of the subscriber's number at their two top outer contacts removes ground from the contacts of the keys for that digit so that the setting of the storing relays cannot be disturbed by the operation of another key. If the operator should by mistake operate a second key, or if that portion of the key set used for the subscriber number is used before the previous call is cleared, relay 1422 will operate and the stop pilot lamp 1423 will light to warn the operator accordingly. The operating path for relay 1422 may be traced to ground at key contacts of Fig. 16 from battery through winding of said relay, thence through resistances 1412 and 1413 to leads 1436 and 1437 respectively at relay 1414, or through resistances 1416 and 1417 to leads 1438 and 1439 respectively at relay 1418, or through similar resistances to similar leads for other digit keys as indicated. When the last digit is set up, the operation of relay 1418 connects ground at its top outer contact to lead 1440 traced thence through the bottom normal contact on relay 1337 and through winding of relay 1338 to battery. The latter relay then causes wipe-out chain of relays comprising fast-operate relay 1340 and slow-operate relay 1339 to operate. Relay 1340 connects battery through its upper winding and upper contacts to lead 1353, thence through the contact of relay 1114 to conductor 1147. The presence of battery potential on conductor 1147 shunts relay 1225. Relay 1225 releases and causes the release of relay 1114, thus disconnecting the operator from the line circuit switching paths which are now connected to the outgoing switches.

*Spilling subscriber number to trunk sender*

As previously explained, the code portion of the called subscriber's number set up on the key set being assumed to be for a terminating connection, relays 1213 and 1116 do not operate. Therefore relays 1107 and 1109 of the switchboard path are controlled through normal contacts on relay 1116 from the district and office frames over leads designated 1140, while identification leads 1130 and 1131 are connected through normal contacts also on relay 1116 to ground at contacts on an operated relay 1114. The marker indicated at 1803 when connected to the position circuit through connector switches 1800, 1801 and 1802 is thus chosen to handle the terminating call. District frame 1700—1705 provides access through office frames 1710—1715 to toll switching trunk indicated at 1720. If a complete 7-digit code is set up on the key set, as is assumed in the call being traced, access to the desired station is over toll switching trunk 1720 and through local machine switching equipment as indicated at 1724 to 1727 and the operator is therefore disconnected upon keying the last digit of the subscriber's number, due to ground through top outer contact on relay 1418 operating relay 1338 as previously explained. The operator under these conditions is only recalled under flashing or reringing conditions.

If the call had been intended for subscriber C in a manual office such as shown in lower right portion of Fig. 17 reached over straightforward trunks not shown, only three code digits would be set up on the key set and the operator would remain on the connection in order to pass the subscriber number to the manual operator. The operator at toll office No. 2 in this case is therefore not disconnected until the position release key 1341 is operated.

When the decoder-marker has obtained access to the district frame through connector switch 1734 over leads indicated at 1736, ground is placed on lead 1133 from the decoder, which is traced further over lead 1132, contact 1134 on relay 1115, and left inner armature and contact of relay 1107, thence through contact 1135 on relay 1107 and through winding of relay 1109 to battery on lead 1236 as previously traced. Relay 1109 thus operates and at its left contact passes the operating ground for relay 1109, traced above, to the district frame over lead 1141, normal contact 1157 on relay 1116 and lead 1158 to battery through a relay 1731 on the district frame 1700 in order to identify the primary switch to the decoder. The decoder returns ground over conductor 1732 back over the circuit just traced to hold relay 1731 and removes ground from lead 1133 as previously traced through the position. Relay 1107 remains shunted by the ground either on lead 1133 or 1158 through the resistance 1108 until the connection is cut through the district and office switches to the trunk 1720, at which time ground is removed from lead 1732 and therefore from lead 1158, permitting relay 1107 to operate and lock through its own contact 1142 to ground. Relay 1107 at contact 1135 opens the circuit of relay 1109, causing it to release and at its right outer contact opens the former shunt path on relay 1107. Relay 1109 at contact 1143 removes ground from winding of relay 1107, leaving it dependent on its own locking ground at contact 1142. When the district and office switches cut the switchboard path through to the toll switching trunk indicated at 1720, a link circuit indicated at 1721 is automatically caused to be started, one end of which finds the switching trunk, and the other end a spill sender 1722. The trunk 1720, the sender 1722, and the link 1721, which attaches the sender to the trunk, have been shown diagrammatically since their construction and operation are generally understood by those skilled in the art. The called numbers set up by the operator on her keys of Fig. 16 are transferred by the well known key pulsing method to the attached sender 1722. For a detailed description of a key pulsing system in which a sender is attached by a link to a trunk, and in which the number on the keyboard is sent by pulses over the trunk, through the link and into the sender much the same as in the present system reference is made to Carpenter Patent 1,780,906 of November 11, 1930.

When the sender is connected to the trunk, battery from the toll operator's sender causes the trunk sender to return battery to the toll sender, thereby causing the trunk sender leads to be connected through to the toll sender and start a pulsing relay to operating. That is, battery through protecting resistance 1401 at the bottom outer contact on relay 1400 may be traced over lead 1434, top inner contact on operated relay 1425, lead 1430, thence through contact 1150 on relay 1115, over talking conductor 1139 which at this time is extended through the district and office frames of Fig. 17 to trunk conductor 1729 and to ground through a relay in the trunk 1720. Said relay in operating, returns battery over conductor 1730, thence through the office and district frames to conductor 1138, through contact 1161 on relay 1115, lead 1429, contact on key 1318, lead 1350, contact 1442 on relay 1425, and lead 1433 to ground through contact and winding on relay 1424 in the toll operator's sender, indicating to it that the trunk sender is ready to receive the number for setting up the local connection to the subscriber.

Relay 1424 in operating locks at its top inner contact to battery through resistance 1420, at the top outer contact on relay 1421. At contact 1443, relay 1424 opens the path from the trunk sender traced above and connects said path at its top outer contact to lead 1444, preparatory to extending it to the subscriber number storing circuit of Fig. 16 as will presently be explained. At its bottom contact, relay 1424 closes a path for operating pulsing relay 1428 in accordance with the combination of number storing relays that are operated by the keys for each digit. Relay 1428 operates once for each digit and closes a circuit from ground at the bottom inner contact of relay 1418, traced through bottom contact of relay 1424, to lead 1445 for operating relays 1400 and 1402 one at a time. The latter relays thus extend the leads 1434 and 1444, coming from the trunk sender, to the storing relays at Fig. 16 in order that the stored number of each digit may be indicated to and registered by the trunk sender.

Relay 1428 is made sluggish both in operating and releasing, due to the presence of condenser 1446 connected to battery. The operation is delayed until the condenser is charged and its release is delayed by the condenser discharging. This time interval in combination with the slow release period of relays 1400, and 1402 provides sufficient time for the subscriber's number to be transmitted to the trunk sender by means of the usual key pulsing code. The first pulse of ground connected to lead 1445, due to relay 1428 operating may further be traced through the top break contacts of relay 1410 to battery through winding of relay 1400. The latter relay then extends leads 1434 and 1444 to leads 1447 and 1448 respectively for transmitting the numbers set up on the keys for the first digit of the number. Relay 1400 at its bottom inner contact also connects ground to winding of relay 1410 but the latter relay does not operate as long as ground is connected to lead 1445 by pulse relay 1428. Presently relay 1428 releases and removes ground from lead 1445 which has been acting to shunt out the winding of relay 1410 through the common resistance 1411. Relay 1410 thereupon operates from ground at contact on relay 1400 while the latter is preparing to release. Relay 1410 operated extends lead 1445 to the next relay corresponding to relay 1410 of the succeeding digit indicated at 1449 and so on until relay 1408 for the fourth and last digit finally operates. Relay 1410 at its bottom inner contact locks to ground at the top inner contact of relay 1421, as also would the other relays corresponding to the remaining digits. As each digit is spilled the operation of relay 1410 or similar relays at their bottom outer contacts release the storing relays and the relay 1414 corresponding to each digit.

Assuming only a portion of the digits have been transmitted to the trunk sender and the remaining digits have not as yet been set up on the key set, then a storing circuit is reached which contains no operated relays and, therefore, its corresponding relay, such as relay 1414, is in a normal position. The operated relays, such as relay 1414 having released as their digits were spilled, no ground will be supplied to the armature of relay 1428 or to sequence relays corresponding to relays 1400 and 1410. Relay 1428 therefore waits until the remaining digit or digits are set up on the key set.

After the last digit is spilled, all the relays corresponding to relay 1414 are normal but relay 1408 at contact 1450 now supplies ground to bottom contact on relay 1424 for the pulsing relay 1428. The next pulse of ground, therefore, causes the operation of relay 1404 which connects ground at its bottom inner contact through resistance 1405 to lead 1434 for causing the trunk circuit to automatically start the connector switch to ringing the subscriber. If manual start of ringing from the position is desired, then ground would instead be connected to the top contact of relay 1404 and serve to ground lead 1444 through resistance 1403. Normally, however, automatic start of the ringing will be used. On its next release of relay 1428, relay 1406 will operate in the same manner as described above for relay 1410. Relay 1406 further extends the lead 1445 to the winding of relay 1421 so that the next pulse of ground from relay 1428 will operate relay 1421 which then removes the locking ground for relays 1410, 1408 and 1406 and also opens the locking battery for relay 1424. The release of relay 1408 also opens the locking ground for relay 1425, which in turn removes holding ground, through the upper winding of relay 1426, over lead 1435 to relay 1115 in the switchboard circuit. Relay 1426 remains operated until relay 1115 releases, due to its lower high resistance winding being connected to ground which permits relay 1115 to release and open the high resistance path through winding of relay 1426.

*Delay interval for completing connection*

The release of relay 1115 permits ground to be connected to lead 1237 for starting the timing circuit shown in the upper left-hand part of Fig. 12, said circuit being used to provide a delay to give the spill sender time to set up the switches in the machine switching office indicated at 1724 to 1727, to permit the connector switch indicated at 1726 to ring the subscriber, and to give the subscriber time to answer. Relay 1115 in releasing closes a circuit traced from ground at right outer contact on operated relay 1107, contact 1144 on relay 1115, lead 1145 through contact 1238 on relay 1213, lead 1237, thence over two paths. One path through resistance 1206 does not function at this time because battery through the winding of relay 1205 is shunted out by battery traced through the back contact on supervisory relay 1214, contact 1240 on relay 1213, lead 1241 and the right inner armature and contact on relay 1205. The other path is traced through the left outer contact and armature of relay 1208, through the timing switch magnet 1202, and through the left outer contact and armature of relay 1205, to battery through slow stepping interrupter 1207. By regulating the time period of said interrupter, the switch arms 1200 and 1201 may be made to rotate as slowly as desired. If the subscriber does not answer before arm 1200 of the timing switch reaches terminal 1239 then the operator in office No. 2 will be reconnected to the switchboard path. Assuming first that the subscriber does answer, however, relay 1214 will be found to operate due to battery being placed on one end of the talking conductor 1729 by the switching trunk 1720. Said battery is traced on the corresponding conductor back through the office and district frames of Fig. 17, thence over conductor 1139 and bottom inner normal contact of relay 1115, through bottom outer contact of relay 1114 and lower winding impedance coil 1113, lead 1146, and through winding of relay 1214 to ground.

The operation of relay 1214 removes the battery shunt previously traced, from around the winding of relay 1205, thereby permitting it to operate. Relay 1214 operating also connects battery to a circuit traced through contact 1242 on relay 1213 and lead 1243 to the left inner armature of the timing relay 1210, traced further through said armature and back contact through winding of relay 1209, right winding of relay 1210 and over lead 1244 to ground previously traced on lead 1237. Relay 1208 operates in the circuit thus traced but relay 1210 being marginal does not operate on one winding alone. Relay 1208 at its left armature and break contact opens the interrupter stepping circuit through switch magnet 1202, preparatory to release. The timing switch now restores to normal due to the closure of battery at contact 1245 on relay 1208 to a circuit through the switch release magnet 1203 traced from ground through off-normal switch 1204, winding release magnet 1203, left outer contact of relay 1210 to contact on relay 1208. When said switch has reached its normal position, off-normal contact 1204 opens the release magnet circuit as above traced. Relays 1205, 1208, 1214 and 1221 then remain operated as long as the called subscriber's receiver is off the hook.

*Subscriber does not answer*

If the subscriber does not answer within the above time interval so that battery on arm 1200 contacts with terminal 1239, then said battery serves to operate relay 1219 over a path traced through right back contact and armature of relay 1210, armature 1246 and back contact of relay 1213, thence over lead 1247 and through left winding of relay 1219 to ground. The latter relay locks through its right winding and right inner contact, lead 1249, to ground through common resistance 1257. The operation of relay 1219 connects ground to the sequence relay 1225 over a path traced from left outer make contact of relay 1219, lead 1230, top outer normal contact of relay 1225 and through winding of said relay to battery on lead 1231, when the operator is idle as previously described. The operation of relay 1225 then causes relays 1114 and 1115 to operate as described for a new call, thus connecting the position to this circuit. In this case, however, the position pilot lamp 1220 is lighted over a circuit traced through the right outer contact of relay 1219, lead 1251 and contact 1148 on relay 1114 to ground, thus indicating to the operator that the recall is from the called end of the connection. Furthermore the talking conductors at this time are switched at contacts 1126 and 1127 on relay 1114 and at contacts 1161 and 1150 on relay 1115 to include the operator's telephone circuit of Fig. 13 wherein position supervisory relay 1334 remains normal and the called supervisory lamp 13333 lights as long as the called party does not answer. The position through guard lamp being dark indicates that it is a terminating connection and position pilot lamp 1110 is lighted to indicate that the connection is the result of a don't answer condition. The lighting of said pilot lamp is traced over a path from ground at right outer contact relay 1205, through left inner armature and contact of relay 1219, left outer armature and contact of relay 1213, lead 1252 and contact 1149 on relay 1114 to battery through pilot lamp 1110.

*Flashing and line busy condition*

Assuming that subscriber B has answered the incoming call and has been connected through to the originating or A subscriber as previously described, it will be observed with regard to the pad circuits 900 and 1000 that they are in circuit due to relays 901 and 1001 respectively being normal. Said relays only operate when the connection is extended to another toll line as will presently be described. If subscriber B wishes at any time to bring in the toll operator at office No. 2, he will hang up his receiver and immediately remove it again from the switchhook, thereby setting up a flashing condition. When the receiver is placed on the switchhook, by the subscriber, supervisory relays in the toll switching trunk 1720 function in the usual manner to remove the battery placed on one end of the talking conductor 1729, thereby causing relay 1214 to release and remove battery from its front contact. Relay 1210 therefore operates due to the previously traced battery path from front contact of relay 1214 to winding of relay 1208 being replaced by battery traced from the right outer make contact on operated relay 1208, left winding relay of 1210 to winding of relay 1208. The right winding of relay 1210 also being energized at this time causes said relay to operate and at its right inner contact close ground that is on lead 1244 to the stepping switch magnet 1202. Said circuit is traced further through the latter magnet to the left armature and front contact of relay 1208 to the fast interrupter 1209 to battery, relay 1205 being held operated at this time.

If the receiver of subscriber B is again removed from the switchhook, before the stepping switch magnet 1202 drives arm 1201 to terminal 1253, a flashing condition is established in the switchboard path circuit. The reoperation of supervisory relay 1214 causes relay 1208 to be shunted down by connecting battery to the left inner armature and front contact of operated relay 1210. The release of relay 1208 at its right outer contact then closes battery to a circuit for operating relay 1219. Said circuit is further traced through right outer make contact of relay 1210, lead 1254, armature 1246 and back contact on relay 1213, thence over lead 1247 and ground through left winding of relay 1219. Thus the switchboard path is again automatically connected to the toll operator as previously described where the subscriber does not answer. However, in this case a three-way talking circuit exists between the cordless operator's telephone of Fig. 13, subscriber A and subscriber B. Additional flashing of the switchhook on the part of the subscriber before the operator is connected has no effect on this part of the circuit other than to operate and release relays 1208 and 1210. The switchboard lamp 1222 is thus made to flash in accordance with interrupter 1111. Relay 1205 is operated at this time so that its right outer contact removes ground for lighting don't answer lamp 1110. Since the switchboard path is now connected to the position circuit, the called supervisory lamp 1333 will register the condition of the subscriber switchhook, that is, with the receiver off the hook and battery thereby being connected to the ring conductor 1139 by the toll switching trunk, said battery may further be traced through contact 1150 on relay 1115 and over lead 1430, through top inner armature and back contact on relay 1425, lead 1432, to ground through left winding of impedance coil 1332 and winding of relay 1334 to ground. Said relay thereupon operates to open the circuit to the called party supervisory lamp 1333. On the other hand if the receiver is replaced on the switchhook the battery is removed and lamp 1133 lights. The position through guard lamp 1211 is also dark at this time, and with lamp 1220 lighted and no tone being present, the operator knows that it is the called party recalling. The toll operator in office No. 2 receives supervision from the toll switching trunk over one side of the trunk to the switchboard path so that if an all-trunks busy or subscriber's line bus condition is encountered when the spill sender 1722 is setting up the connection, a tone will be present in addition to the flashing lamp and thus the operator will be informed that all trunks or paths are busy.

*Called subscriber automatic disconnect*

When the called subscriber B hangs up on a disconnect, the timing switch arms 1200 and 1201 are started rotating as previously described. If said receiver is still on the hook when the arm 1201 makes contact with terminal 1253, then a circuit is closed for operating relay 1218 traced from battery at right outer contact of relay 1213, right winding of relay 1218, contact 1255 on relay 1210 and terminal 1253 to ground on switch arm 1201. Relay 1218 operating at contact 1258 opens the ground circuit to resistance 1257 so that series relay 1225 will release and disconnect the toll operator's position circuit in the event said position is connected to the switchboard path. Relay 1218 at its outer break contact also opens ground that has held relay 1221 operated ever since the call came in. Thus relay 1221 releases and removes battery from lead 1236 causing relay 1107 to likewise release. Relay 1107 in turn causes relays 1205, 1208 and 1210 to release and the timing switch to restore to normal over a path traced from ground through off-normal springs 1204, winding of switch release magnet 1230, thence through right outer contact on relay 1221 to battery. Removal of ground from the winding of relay 1221 at the same time starts relays 1006 and 1007 to release since up to now they have been held operated in series with relay 1221. Relay 1006 releases immediately, but relay 1007 being slightly slow in releasing makes sure that the right locking winding of relay 1006 is not closed until said relay is normal. Release of relay 1006 removes ground from lead 1010 and allows the call distributing equipment to release. Relay 1107 also removes ground from conductors 1167 and 1168, and the district and office switches 1700, 1705, 1710 and 1715, which have been held over these conductors, now release. The operator at office No. 2 receives no indication and the connection through toll office No. 1 still remains dependent on the calling subscriber hanging up his receiver. The manual "A" operator noting a steady calling supervisory signal when the calling subscriber hangs up, removes cord plug 535 from trunk jack 501, thereby breaking the circuit of relay 534. The latter relay releasing opens the circuit of bridge relay 527, thus causing line relay 511 of the tandem trunk at toll office No. 1 to release. This removes ground connected over lead 536, used to hold relay 522 operated through its lower winding. Relay 522 releasing, at its top make contact, removes the ground that has held relay 520 operated and the ground that has been holding the crossbar switches of Fig. 8 on the connection via lead 548 and contact 547 on relay 520. Release of holding magnet 820 removes ground at its top inner contact which has been holding relay 906 of the toll line of Fig. 9, thus restoring the connection to normal.

*Toll operator release forward*

The operator at toll office No. 2 in establishing the connection previously described may find it necessary to release the connection extending from the switchboard path toward the called subscriber for any one of several reasons such, for example, as having set up the wrong number, verification of a "don't answer", or busy condition. In this case she depresses release forward key 1316 which thereupon connects ground to lead 1352, traced further through the bottom outer contact on operated relay 1114 thence over lead 1153 to its junction with leads 1119 and 1120. Since ground through winding of relay 1221 is connected to lead 1120 it will be evident that the latter relay will be shunted out, while at the same time said ground passing over lead 1119 and through the call distributing switches will continue to hold relays 1006 and 1007 of the incoming toll line operated. Relay 1221 upon releasing breaks down the connection through the office and district switches of Fig. 17 and releases relay 1107 as previously described. Upon the release of key 1316, however, the shunt circuit around relay 1221 to ground is removed and relay 1221 reoperates to again connect the switchboard path to the operator as on an incoming call.

*Toll operator position wipe out and circuit release*

If during the setting up of a connection or subsequent supervision the operator at No. 2 toll office wishes to remove the position circuit from connection with a particular switchboard path, she will depress position wipe out key 1341 which thus operates relay 1338 in an obvious circuit to battery. Relay 1338 in turn operates relays 1339 and 1340 in parallel to ground. Relay 1339 being slow to operate permits relay 1340 to operate and lock before relay 1339 opens the lower winding of relay 1340. The effect of said circuit arrangement is to cause one release no matter how long key 1341 is held operated. The operation of relay 1340 closes a low resistance battery path through its upper winding to lead 1353, traced thence through contact 1154 on relay 1114, over leads 1147 and 1256 to ground through resistance 1257, thereby shunting out the battery path previously traced through series relay 1225 to resistance 1257 over lead 1256, also the battery path through locking windings on relays 1215 or 1219 if operated. Relay 1225 releasing thereupon releases relays 1114 and 1115 to disconnect the operator position from the switchboard path. The operator at other times may desire to not only dismiss herself from the switchboard path but she may also wish to break down the connection from the incoming toll line through the switchboard path. In this case she depresses circuit release key 1329 which operates relay 1328 in an obvious circuit to battery. Relay 1328 in turn operates slow relay 1327 and fast relay 1326 in parallel to ground, said circuit arrangement being for the same purpose as described above for the position wipe out key 1341. The operation of relay 1326 closes a low resistance ground path through its own upper winding to lead 1354 traced further through contact 1155 on relay 1114 and lead 1156 to battery through left-hand winding relay 1218. Relay 1326 then remains operated until the path through its upper winding is opened at contact 1155 due to relay 1114 releasing, said relay being released due to the operation of relay 1218 that in turn releases relays 1221 and 1225, subsequently releasing relays 1107, 1114, 1115 and 1326. It will be observed that contact 1258 on relay 1218 breaks last thus insuring that relay 1221 has released as well as relay 1225, the latter relay being the one that ultimately results in the release of relay 1326.

*Calling manual operator rerings*

Assuming the called subscriber B has hung up and thereby has caused the switchboard path and incoming toll line at toll office No. 2 to break down as previously described and the operator in the originating manual office wishes to recall the toll operator in office No. 2, she operates her ringing key and rings into the special trunk 525. The ringing signal passing through repeating coil 523 and over line 529 operates relay 513 connected in series with condenser 514 across the inside of repeating coil 515. Relay 513 operates connecting ground to winding of relay 518 to battery, operating same and connecting ground at its bottom contact for holding line relay 511 operated. Relay 518 at its top break contact prevents relay 512 from operating at this time and its front contact connects battery to lead 551 which is further traced over lead 549 and through the district and office frames of toll office No. 1, lead 826 and left front contact on operated relay 906, lead 911, armature and front contact of relay 908, to ground through winding of relay 902. The latter relay in operating thus connects a signaling source to the toll line 912 which is received in toll office No. 2 by the relay 1004 in series with condenser 1003. Relay 1004 operating removes holding ground from relay 1005, thereby connecting battery to lead 1009, traced further through right inner break contact on normal relay 1007, thence through left winding of relay 1006 to ground. The latter relay operating connects the incoming trunk through the call distributing crossbar switches to an idle operator and idle switchboard path the same as if it were a new incoming call. An operator in toll office No. 2 is thus brought in on the connection in the same manner as previously described.

The operator in the originating manual office may under other conditions find it necessary to bring in the toll operator at the terminating end of the connection while the called subscriber B is still connected. In this case she operates her ringing key and rings in the special trunk the same as described above. At the incoming toll line circuit of Fig. 10 however, the operation of ring-up relay 1004 will find relays 1006 and 1007 operated so that battery connected to lead 1009 will now be connected through the right inner make contact on operated relay 1007, thence over lead 1020 and through the call distributing cross-bar switches, lead 1150, left armature and back contact of relay 1112, bottom inner armature and back contact of relay 1114, lead 1151 and left winding of relay 1215 to ground. The operation of the latter relay at its right inner contact locks through its right winding and over lead 1249, through resistance 1257 to ground. At its left contact it connects ground to lead 1230 for operating relay 1225 as previously described, thereby connecting the operator to the switchboard path when relays 1114 and 1115 operate and establishing a three-way talking connection between the operator in the originating manual office, called subscriber B and the cordless toll operator. The operation of relay 1114 at contact 1148 then connects ground to lead 1251 and lights lamp 1216 through the right outer contact on relay 1215. Said guard lamp thus indicates to the toll operator that the incoming call is from the originating end of the connection. As previously described for a new call, a contact on relay 1114 connects ground to lead 1342 which operates relay 1314 and in turn relay 1325. Since relay 1322 is not operated at this time on the connection previously established, battery at the top contact on relay 1325 lights pilot lamp 1319 indicating a connected circuit and established connection position pilot lamp 1320.

Assuming the originating operator requests the operator at toll office No. 2 to rering a called subscriber station which may be P. B. X board. If the toll switching trunk 1720 is arranged for rering, then the toll operator presses ring forward key 1318 which connects battery to lead 1429 and is traced thence through contact 1161 to leads 1138 and 1730 to the toll switching trunk 1720. In the latter circuit, said battery causes the operation of a relay to ground in a manner usual with said trunk circuits, thereby causing ringing current to be sent out to the called station. If the toll switching trunk 1720 is not arranged for rering then it will be necessary for the toll operator to press her release forward key 1316 to release the connection to subscriber B. She will then proceed to set up the subscriber's number on her key set as on the originating call previously described.

*Through connection at second toll office*

Thus far the description of this invention has assumed that the code number of the called subscriber, as given to the operator in the second toll office by the originating manual operator, was such as to direct the call to the terminating subscriber B. There will now be described the action that takes place when the code number of the called subscriber requires passing the call through the second toll office via district primary switch 2100 and district secondary switch 2101, through office primary switch 2102 and office secondary switch 2500 and the outward toll line circuit shown in the upper portion of Fig. 25, thence over the toll line indicated at 2533 to a third toll office. For the purpose of this description the equipment in the latter office is the same in all respects as that in the second toll office and previously described generally in connection with Fig. 3. The call in this case is then extended to subscriber D of the adjacent manual office.

The description previously given may be followed up to the point where the second toll operator receives the name of the city where the called subscriber is located. She recognizes from the city name that the call must be handled through a third toll office. She therefore writes up the number of the desired toll line group on her key set shown in Fig. 15 and since the first digit for through toll calls will always be 0 or 1, it may be assumed for example that key 1501 is operated, thereby operating relay 1511 and in turn at its bottom outer contact operating relay 1530 to battery. The bottom outer contact on said relay thus connects ground to lead 1538 for operating relay 1337 to battery. The latter relay then locks to ground at the top outer normal contact of relay 1339 and at its own bottom inner contact connects the winding of relay 1338 to lead 1346 leading to the decoder marker, so that the latter may cause the associated switchboard path to be removed from the operator position as soon as the marker has determined that there is an idle toll line in the desired group to which the switchboard path may be connected. Relay 1530 at its bottom inner contact also grounds lead 1539 traced through contact 1159 on operated relay 1114, thence over lead 1160 to battery through contact and winding of relay 1213. Relay 1213 upon operating locks to ground at right inner make contact of relay 1221 through resistance 1259. Relay 1116 also operates since its winding is connected in parallel with the winding of relay 1213 over lead 1260. Relays 1213 and 1116 thus remain operated for the duration of the connection. Relay 1213 operated causes the through guard lamp 1211 to light from battery at the back contact of supervisory relay 1214. Since the latter relay does not operate on through toll calls guard lamp 1211 remains lighted during the remainder of the call. The position through pilot lamp 1212 also lights whenever the through call is connected to the operator's position, the circuit being traced from battery through said lamp, right inner contact relay 1213, leads 1261 and 1251 to ground at contact 1148 on relay 1114. Relay 1213 at contact 1262 connects ground to lead 1237 for operating relay 1205 of the timing circut in upper left corner of Fig. 12. Said ground may also be traced through right winding of relay 1210, thence through winding of relay 1208, left inner normal contact of relay 1210 and over lead 1243, contact 1263 on relay 1213, to battery at left contact relay 1217. Relay 1208 operates in the circuit thus traced but relay 1210 does not because both windings are required for operation as previously described. The operation of relay 1208 at its left contact prepares a circuit for fast interrupter 1209 in operating timing switch magnet 1202. Relay 1208 at its right inner contact connects battery to a circuit traced through winding of relay 1217, thence over lead 1264 to the signal lead of both incoming and outgoing toll lines as will presently be described. Relay 1116 at its three top armatures transfers the control leads, affecting relays 1107 and 1109 and identification relays 1731 and 2119 and the switch magnets from the local district frame 1700—1705 to the toll district frame 2100—2101. Relay 1116 at its two lower armatures also transfers ground to the identification leads 1136 and 1137 for indicating to the marker the toll district and the trunk district frame on which the switchboard path terminates.

The second toll operator by thus setting up the number of the desired toll line group causes the position through connecting relays 2306 and 2308 to be associated with a marker such as that on Fig. 26 controlling the toll group of district switches indicated at 2100 and 2101 and the office switches indicated at 2102 and 2500. The marker in the well known manner, through control leads indicated at 2317 to the district frames and leads 2318 to the office frames tests the lines and links and operates the switches on these frames to extend the switchboard path to the outgoing toll line in the desired group leading to the distant toll office. Said leads are extended to the marker, portions of which are shown in Figs. 26, 27 and 28, by operating multi-contact relays indicated at 2300 2302, 2304 and 2305. If this marker is busy the marker indicated at 2314 may be used in which case multi-contact relays 2301 and 2303 serve to extend the control leads to said marker. As soon as the marker has determined that there is an idle circuit in the toll line group and that the circuits are not arranged for toll line dialing, it disconnects the operator's telephone circuit from the operating path as will presently be described. As mentioned hereinbefore, those details of the marker and its associated equipment which have been omitted in the present drawing to secure simplicity of disclosure may be similar to those fully shown and described in the said application of Carpenter Serial No. 27,305, filed June 19, 1935, granted as Patent No. 2,093,117, Sept. 14, 1937.

The second toll operator setting up the office code on her key set shown in Fig. 15 causes code receiving A, B and C relays in the marker indicated at 2820 to operate. After the marker checks the receiving leads such as those designated 1536 between the sender and the marker for continuity and for false grounds, the code receiving B relays over leads 2826 operate one of the ten levels of four selecting magnets on the hundreds and tens crossbar switches indicated by way of example at 2807, 2819 and 2812. These magnets have contacts which close a series circuit from ground to code receiving A relay contacts over lead 2821. This ground through the code receiving relays operates, over leads 2827, one of the ten sets of four hold magnets on the hundreds and tens crossbar switches, depending on the code number set up by the operator. Said set of switches are indicated at 2809, 2810, 2815 and 2816 with another set indicated at 2822, and 2823. The code receiving C relays close a path from ground to one of the code points 2824, said path being traced from ground at right inner contact of relay 2608 over lead 2619, right armature and back contact of relay 2618, lead 2620, thence through the left-hand armature and back contacts of all relays similar to relay 2703, said contacts on relay 2703 and over lead 2713, through checking relays and code receiving C relay contacts, thence over leads 2828 and 2829 and through hundreds and tens switch 2808 to code points 2824. Said code points are permanently cross-connected to selecting magnet terminals such as 2714, 2715, etc. on the route switch 2712 shown at the bottom of Fig. 27, so that when one of the latter magnets operates, ground is connected to a second path traced over lead 2723, right inner armature and back contact on relay 2704 and lead 2720, through the code receiving C relays, thence over leads indicated at 2830 and 2831, through hundreds and tens switch 2814 to one of the code terminals 2825. Each of said terminals is permanently cross-connected to one of ten holding magnet terminals such as 2716 and 2717 on the same route crossbar switch so that one pair of hold magnets such as 2709 and 2710 on said switch will thus be operated. Twelve route contacts are therefore closed on switch 2721 to terminals 2724 and 2725.

*Marker features*

A further description of the above-mentioned marker will now be given only in so far as it is necessary to describe certain features that have been added to said marker to provide for the through toll traffic relating to this invention. The principal feature is the provision that full information at all times is made available to the marker regarding the accessibility of a toll line group without the necessity of obtaining access to the office frame and making the usual test. This information relates to the case where the working circuits are all busy and there is an idle overflow circuit. It relates to the condition where both working circuits and overflow circuits are busy, and to the condition where the circuit group is operating either on a delayed or circuit request basis.

The code switch terminal 2738 is connected to key 1927 located at the circuit request operator's switch-board over lead 2726, said key being individual to a circuit group. The terminal 2736 gives access to a group busy circuit for both regular and overflow toll lines and terminal 2711 gives access to a group busy circuit for regular toll lines only. The terminal 2732 is used to indicate that the call is for a toll line group rather than a trunk group and also whether said toll line group is arranged for toll line dialing.

*Idle toll lines*

Assuming that at least one toll line in the desired outgoing group of toll lines is idle and that the group is not operating on a circuit request basis, the marker tests the toll lines and the district and office links and operates in other respects similar to the markers described in the cited application of Carpenter, Serial No. 27,305, filed June 19, 1935, granted as Patent No. 2,093,117, Sept. 14, 1937. In the present system all regular toll line routes have service groups, one of which is that for terminals on the office frame assigned for master busy circuits and another is for the circuit request board. Ground 2727 is therefore connected to corresponding terminals of all toll line routes, and, when the route contacts close, it is cut through to the top terminal of group 2725 terminals. This ground may then be traced over lead 2728 to left armature and back contact on relay 2614, thence over lead 2621 to one of the six left-hand contacts on thirteen class of service relays such as indicated at 2800 and 2801. Assuming that service relay 2801 represents the class for which the code is routed as set up on the key set, the ground on lead 2621 may further be traced through left inner contact relay 2801 and over lead 2833 through winding of relay 2804 to battery. Corresponding left inner contacts on other service relays such as relay 2800 are connected over lead 2834 to a service group route relay such as 2835. Service group relay 2802 over lead 2836 connects with leads such as 2728 to the route crossbar switch, whenever relays 2614 and 2622 are operated there being sufficient of the latter relays to furnish one set of transfer springs for each toll line code. Said relays operate only when the toll line group is operated on a circuit request basis as will later be described.

Assuming that the code as set up by the operator in the second toll office is of such class of service that the incoming toll line may be connected with the outgoing toll line, relay 2804 will operate from ground over the path traced in the preceding paragraph and thereby at its left contact extend said ground over lead 2837, through left normal contact on district frame identification relay 2616, through armature and back contact of relay 2610 and lead 2624 to battery through winding block relay 2700. The latter relay thus operates and thereby extends ground from the break contacts on relay 2730 to the leads designated 2729 which in turn are connected to the terminals 2725 through the route crossbar switch contacts 2721, the latter contacts being operated at this time as previously described. The relay indicated at 2730 is part of the usual marker, being used to prevent operation of the marker transmitting relays if the marker is seized by a second sender before the release of the start relay. Wiring to five of the terminals 2725 (not shown) is used to set up talking selection and zone information in the district, through the district frame connector, over leads indicated at 2317 to determine the pair of office frames on which the particular trunk group is located; to determine the level on the office switches; and to determine the location of a particular trunk group in the group of 40 trunks on the level indicated.

Referring again to the class of service relays 2800 and 2801 which are representative of thirteen such relays, it is stated that the winding of relay 2804 is connected to the left inner contact of service relay 2801 and that the left inner contacts of all other service relays such as on relay 2800 are multipled together and connected over lead 2834 through the winding of relay 2835, which is one of the route relays for service groups. Said relays operate for example, when the calling toll line at office No. 2 is a terminating line only and the code set up by the operator is for a through toll line. In this case said lines are not capable of being connected together and it is then necessary to route the call either to re-order terminals or to an intercepting operator.

Referring again to the operation of block relay 2700 said relay at its left contact serves to automatically disconnect the operator from the switchboard path by closing a circuit traced from ground on relay 2608, through contact on relay 2609, lead 2625, left contact of relay 2700, lead 2731, right outer contact relay 2614, left outer contact of relay 2611, thence over lead 2626 through marker connector relay contacts to 2308 and 2306 and portion of lead 1346 to bottom front contact of position relay 1337. The latter relay being operated at this time extends the ground through the winding of relay 1338 to battery, thereby disconnecting the operator from the line switching path in the same manner as described after the operation of relay 1338 under "Key setting and storing of subscriber number." If the toll line group were arranged for dialing on the outgoing toll line, then terminal 2732 would be cross-connected to terminal 2627 and ground through route switch contacts 2721 would operate relay 2609 and open the path just traced for disconnecting the operator from the switchboard path. Also said ground could be further traced over lead 2728 and portion of lead 1347 through winding of relay 1324 to battery for operating said relay to light signal lamp 1323, indicating to the operator that she is connected to a dialing toll line and would be required to set up more digits on the keyset. The toll line group in the case of the call here being traced however is assumed to be one that is not equipped for toll line dialing. The terminal 2732 in this case is connected to terminal 2629 and this ground path is thus traced over lead 2630, through the marker connector relay contacts 2308 and 2306, thence over a portion of lead 1441 and through winding of relay 1421 to battery. Said relay then releases that portion of the sender which is not required. When the contacts on routing switch 2712 first closed due to the operation of holding magnets 2709 and 2710 ground at the contact on magnet 2710 is connected with the winding of relay 2703, there being one of said relays for each crossbar routing switch. At the right outer contact of said relay, ground is connected over lead 2733, through the marker connector relays 2308 and 2306, portion of lead 1807, through upper winding of relay 1515 to battery. Relay 1515 then releases the code storing relays of the sender.

Thus through the operation of routing switch contacts 2721 the call on the switchboard path of Fig. 11 is extended over leads 1165, through district crossbar switch contacts 2103 and 2104, through primary office switch contacts 2105, and secondary office switch contacts 2501 to outgoing end of toll line shown in upper portion of Fig. 25. The operation of secondary office switch contacts 2501 connects ground to lead 2536 which is further traced through left outer armature and break contact of relay 2521, thence through the winding of relay 2520 to battery. The latter relay operates and at its left outer break contact opens a ground circuit to lead 2537 controlling the toll line overflow circuit 2600, shown at the top of Fig. 26, as will later be explained. Relay 2520 at contact 2538 opens the path of termination circuit 2519, preparing the toll line circuit for talking, and at its left inner make contact prepares a circuit over lead 2539 for controlling the ring forward relay 2516 presently to be described. The operation of office switch contact 2540 also completes a circuit for operating the toll line pad relays 1001 in the incoming toll line and 2515 in the outgoing toll line. Said circuit may be traced from ground through left winding relay 2515, lead 2541, contacts 2540 on secondary office switch 2500, primary office switch 2105, secondary district switch 2104, primary district switch 2103, lead 2118, through bottom outer armature and contact relay 1115 and lead 1162, thence through call distributing switches 1102 and 1101 and lead 1163 through left winding relay 1001 to battery. Both pad relays operate and remove the transmission pads 1000 and 2514, respectively, from the toll lines. Whenever the operator in the second toll office is connected to the line, relay 1115 of the switchboard path will be operated as previously described, so that the circuit just traced will be opened at the bottom outer contact on relay 1115 and the two pads again connected in the circuit. On all connections to trunks the pad lead is open so that pad relay 1001 remains normal, thereby leaving the pad 1000 connected in the circuit.

If as assumed the toll line to which connection is being made is a ringdown line, only three digits would have been registered in the position and relays 1225, 1114 and 1115 would by this time have been released as described on the previous call. If, however, the line is a dialing toll line, additional digits stored in the position key set would cause the second part of the position register circuit to hold relay 1115 until these digits had been transferred, by key pulsing code to a sender on the toll line. The closure of ground through the left winding of relay 2515 over lead 2541 and through the office and district switches to lead 2118 as previously described may also be traced over lead 1264, through winding of relay 1217 to battery at right inner contact of relay 1208, thus causing relay 1217 to operate and connect battery at its right inner contact to lead 1265 which is further traced through a contact on relay 1115, when it releases, to lead 1164, thence through the district and office switches to lead 2539, left inner make contact on operated relay 2520, armature and front contact of relay 2522 to ground through winding of relay 2516. The latter relay is thus caused to operate and connect alternating signal current indicated at 2517 to the outgoing toll line 2533. Relay 1217 in operating at its left-hand contacts removes battery from lead 1243 as traced through contact 1263 on relay 1213, causing relay 1210 to operate and start the timing switch arm 1200 to rotating under control of fast interrupter 1209. After a time interval of approximately two seconds the switch arm 1200 places battery on lead 1266 which may further be traced through left contact and armature on relay 1217, contact 1263 on relay 1213, lead 1243 to left inner armature and contact on relay 1210. Said battery as just traced thus shunts out the path from battery through the left winding of relay 1210 and winding relay 1208, causing relay 1210 to hold operated and relay 1208 to release. The latter relay thus restores the timing switch to normal by operating release magnet 1203 over a path traced from ground through off-normal spring 1204, winding release magnet 1203, through front contact to armature 1246 on relay 1213, lead 1254, right outer armature and make contact relay 1210 to battery at right outer armature relay 1208. Relay 1208 at its right inner contact removes batttery from the winding of relay 1217, causing same to release and thereby terminate ringing on the toll line. This period of ringing current over the toll line 2533 then is registered in the incoming toll line circuit at a third toll office which for the purposes of this description may be assumed to be identical with the toll line circuit of Fig. 10. Said toll circuit indicated at 300 in Fig. 3 may therefore be considered to operate call distributing equipment 314 and connect the incoming toll line to an idle switchboard path 316 and toll position 302 in toll office No. 3, the same as previously described for toll office No. 2. Said operator is informed of the call by an individual flashing guard lamp in the switchboard path and the calling manual "A" operator receives an order tone indicating that she should again pass the called subscriber's number. The cordless toll operator upon receiving said number proceeds to write it up on her key set and by means of marker 303 then makes connection over switching trunk 307 with the called subscriber D in what is assumed to be a nearby local manual office 308.

It will be evident that the above call may be extended through still other toll centers. The code portion of the number in this case would cause one of a group of through decoder-markers such as 309 to be selected for extending the connection to another outward toll line circuit such as 312 leading toward a fourth toll office. The operation of the equipment at each office would in this event be the same as previously described for the second toll office of Fig. 2.

*Disconnect on through toll connection*

Toll connections that have been built up through multi-channel position circuits in a number of toll offices such as just described for the call from subscriber A to subscriber D are broken down and the apparatus restored to normal as follows. The hang-up of D subscriber automatically releases the connection in toll office No. 3 same as previously described for the disconnect of the B subscriber. The restoration of the A subscriber's receiver gives the calling manual "A" operator a disconnect signal. Said operator then recalls the operator in toll office No. 2 as previously described and requests her to disconnect. The manual operator then withdraws plug 535 from jack 501 to automatically release the connection in the calling manual office and in toll office No. 1, also previously described. In the event the manual operator for some reason does not rering, the connection at toll office No. 2 will remain off normal as indicated by guard lamp 1211 until the operator at said office noting same releases it.

*Reconnection of toll operator*

The operator in toll office No. 2 may be reconnected to the switchboard path by a ring from either the incoming or outgoing toll line. If ringing is received over the incoming line at Fig. 10, relay 1004 will operate to release relay 1005 thereby connecting battery to the ground winding of relay 1215 as previously described under rering by manual operator. Guard lamp 1216 thus indicates to the operator that the recall is from the calling end. The position lamps 1319 and 1320 also light as well as the through guard lamp 1211 because relay 1213 is held operated on through toll calls. If ringing is received over the outgoing line at the top of Fig. 25, relay 2518 being operated by the incoming signaling circuit causes relay 2522 to release and connect battery through the left inner armature and front contact of relay 2520 to lead 2539. The latter lead may then be traced through the secondary and primary office switches, the secondary and primary district switches to lead 1164 and through the armature and normal contact on relay 1115 to lead 1265 that may be further traced through right outer break contact on relay 1217, leads 1248 and 1247 to ground through left winding of relay 1219. The latter relay thus operates and causes the operation of relay 1225 to connect the operator as previously described for a new incoming call. Lamp 1220 informs the operator that the call is from the called end of the connection and because relay 1213 remains operated on through toll calls, the guard lamp 1211 lights to indicate to the operator that it is a through toll connection. Position lamps 1319 and 1320 also light as previously described.

*Manual ringing and splitting*

If the operator desires to initiate a connection to the switchboard path, the talk key 1223 is operated momentarily which causes relay 1225 to operate and connect the operator to the circuit as previously described. It should be noted that this apparatus in the position is individual to the lines only after they have been connected thereto by the operation of the call distributing system. The apparatus of the position is selected by the call distributing system and connected to a line for this purpose. While connected to a switchboard path the operator may ring in either direction by operating ring back key 1317 or ring forward key 1318. Operating key 1317 connects battery to lead 1355, traced further through bottom inner make contact relay 1114 and left outer contact of relay 1112, lead 1150, thence through call distributing switches 1102 and 1101, lead 1020 to right inner contact on operated relay 1007, lead 1009 and through armature and front contact of relay 1005 to ground through winding ringing relay 1002. Relay 1002 is thus directly under control of key 1317 and when operated connects signaling current to the line. In a similar manner key 1318 connects battery to lead 1349 for operating relay 2516 to connect signaling current toward the called end of the line. Battery with some additional apparatus on said keys may also be made to split the connection if this is required.

*Toll line busy, line and overflow busy, and master busy conditions*

Calls from one subscriber to another may involve setting up a connection through a number of toll offices, such as toll office No. 2 just described, so that it is important to keep the originating "A" operator informed on the status of any busy toll line group that may be encountered. That is, when an all lines busy condition is encountered she should also be informed that the line either is soon likely to become idle or that both lines and overflow circuits are busy indicating more of a delay. In the first instance she may remain in touch with the distant toll operator until a line is free and the connection can be completed or if delayed too long she may request the ticket at the toll office be passed to a delayed through operator. An all busy toll line signal and overflow signal is therefore given to the toll operator to enable her to pass this information along to the originating "A" operator. Where the toll lines are arranged for through supervision said operator may receive said signals direct. For example, let it be assumed in the previous description that no toll line in the outgoing group of toll lines is available but with one or more overflow circuits available. That is, relay 2605 has released due to ground in each busy toll line circuit being removed from lead 2537. Said relay at its left outer contact thus connects ground to lead 2734, thence to terminal 2711 on the route crossbar switch or the marker, and when said switch closes contacts 2721, as previously described for a through call, this ground may further be traced over lead 2724, through winding of relay 2611 to battery. The latter relay operating in said path at its left outer contact opens a path over leads 2626 and 1346 to the winding of relay 1338 in the operator's telephone circuit and thereby prevents the position from being disassociated with the switchboard path. Relay 2611 at its left inner contact also connects ground to lead 2319 which may further be traced over lead 1348 and through the winding of relay 1335 to battery thereby lighting the operator's pilot 1336 indicating to her that all outgoing toll lines are busy. This recording of her busy condition of the toll line group in the marker causes the latter to proceed, without the necessity of testing the individual toll lines, with the establishment of the necessary route circuits for testing and completing the incoming connection to an idle one of the overflow circuits. This connection is made to the idle overflow circuit via switch contacts 2508 on office switch 2507. Relay 2542 then operates and at its right outer contact connects battery through the winding of relay 2602, thence through right armature on relay 2605 to interrupter 2606 or 2607. Since all toll lines are busy and relay 2605 is released as previously described, interrupter 2606 therefore causes relay 2602 to follow said interrupter and thereby connect battery intermittently through resistance 2544 to the talking conductor and associated termination 2543. Also, the switchboard path is prevented from starting ringing due to not finding a ground circuit connected to terminal 2548 which corresponds to terminal 2540 of a regular toll line. As previously described battery connected to one side of the line causes supervisory relay 1214 of the switchboard path to operate and lamp 1211 to go out. Thus the toll operator knows by the characteristic flash from interrupter 2606 that the toll lines are busy but that they have not been busy long enough to cause all overflow circuits to be busy. She, therefore, passes this information to the originating "A" operator. Usually soon thereafter the toll operator's supervisory lamp 1211 follows the interrupter 2607 due to relay 2605 reoperating, caused by a line or lines being available. She then informs the "A" operator she will try again, proceeds to release connection with the overflow circuit, and again sets up the code of the desired toll line group on her key set. If busy condition still prevails the "A" operator may request either the toll operator or the request operator to make out a ticket for delayed completion of the call. The "A" operator then passes the original ticket, made out by her, to a special operator in the manual office referred to hereinafter as the TX operator who handles all calls delayed more than a specified length of time.

Under the second condition where all outgoing lines at the distant toll office are busy and all overflow circuits are also busy, the originating "A" operator will at once be informed that more or less delay is likely to be encountered and will then request the toll operator to make out and pass a ticket to the delayed through position. All toll lines in the group being busy causes relay 2605 to release and relay 2611 to operate as previously described. Since all overflow circuits are busy relay 2601 releases due to relays such as 2542 all being operated, thereby removes ground from winding of relay 2601. The latter relay thus closes the circuit extending from ground at left inner contact of relay 2605, through contact on relay 2601, lead 2632 to terminal 2736 on the route crossbar switch of the marker. Said path is further traced through contacts 2721, lead 2737, through relay 2610 to battery. The latter relay operating transfers control from relay 2700 to the route relay 2702 for the master busy terminals on the office frame. The call being set up by the operator is thus routed to the terminals of a master busy circuit such as shown in the lower portion of Fig. 24. Relay 2409 operating in this circuit from ground on the lower portion of office switch 2402 causes relay 2408 to follow the interrupter 2410, thereby intermittently connecting battery through retard coil 2407 to the lower one of the talking conductors with the busy tone connected at 2411. Since relay 2611 operates the same as just described for the toll line busy and overflow idle condition, ground on lead 2731 will not operate relay 1338 and the through operator in toll office No. 2 will remain on the connection either to pass the information that all lines and all overflow circuits are busy or to complete the call over an alternate group of toll lines.

*Circuit request calls*

When delay to outgoing calls over any given group of toll lines becomes excessive, the supervisory force may operate a key which is individual to each group of lines, in order to route calls to such groups over special circuits to a special operator termed the circuit request or delayed through operator. One such key 1927 is shown in right lower portion of Fig. 19. When operated, ground is placed on lead 2726, to terminal 2738 of the marker shown in Fig. 27 and since said lead is multipled to all markers a request condition is set up in all markers having access to this group of lines. When therefore the through toll operator at office No. 2 sets up a call involving this group of toll lines, the marker omits to test the line and automatically routes the call via the office switch terminals shown in lower section of switch 2507 over leads 2545 to a circuit request operator whose position circuit is shown in Fig. 30. The marker will function as previously described except that when route crossbar switch contacts 2721 close, the ground connected to terminal 2738 will be connected over lead 2739, through the windings of relays 2614 and 2622, lead 2633 to battery at the right outer contact on service relay 2801. Relays 2614 and 2622 operate in the above circuit and cause each set of contacts corresponding to each group of toll lines, arranged as previously described, to operate. Assuming the left inner set of springs on relay 2614 to be assigned to the outgoing group of busy toll lines involved in this call, it will be evident that the ground connected to lead 2728 via route switch contacts 2721 may further be traced through the left inner front contact on relay 2614, over lead 2836 through winding service group relay 2802 and winding common relay 2803 to battery. Since there is one relay 2802 assigned for each group of operators at the circuit request board handling calls from particular groups of toll lines, it follows that the call will thus be routed to a circuit request operator who is responsible for this group of lines. The operation of relay 2614 at its right inner contact also operates relay 2611 if it is not already operated. This is necessary because the connection will not be immediately handled at the circuit request board even though a line may be momentarily idle, but must take its turn with calls already filed for the circuit group in question as will later be explained. The operation of relay 2611 operates relay 1335, which locks over an obvious circuit to ground on the upper contact of relay 1339 and also lights pilot lamp 1336 in front of the through operator and prevents her from being disconnected as previously described. If the call to a busy line group is originated by one of the circuit request operators then relay 2801 will be operated and battery removed from the windings of the relays 2614 and 2622, thus giving the call the routing as setup by the circuit request operator. The circuit request operator observing the busy lamp 1928 does not originate a call to a busy group of toll lines until some line in the group is idle and one or more overflow circuits are free thereby allowing relay 2610 to remain normal and give the call its regular routing.

The through operator in toll office No. 2 knows from her switchboard path and position signals that the call has been extended to a circuit request operator. The latter operator receives the lamp signal 3001 lighted by the operation of relay 3000 over one of the leads 2545 to ground on office switch 2507. The circuit request operator being on an order wire basis to permit overlapping of talking and pulsing out, operates key 3004 to connect her telephone to the particular circuit indicated by lamp 3001 and passes the necessary information to the originating "A" operator and to the through toll operator who also remains on the connection. The originating "A" operator then decides whether to ask that the call be extended over some alternate route or to ask that it be handled on a delayed through basis. In the latter case either the through or request operator makes out the required ticket.

The switchboard path shown in Figs. 19 and 20 is used by the circuit request operator for setting delayed through connections originating through distant toll offices and delayed connections originating from nearby manual or dial switchboards. The switchboard path, therefore, has three terminations on district frames. One end of the circuit such, for example, as leads 1930 terminate on the lower portion of through district frame 2200. This will be referred to as the front end of the circuit. The other end, referred to as the rear end over leads 1931 and 1932 also terminate on the through district frame 2200 and over leads 1932 and 1933 terminate on the terminating district frame 1700 for reaching TX trunks such as 1754. The switchboard path of Figs. 19 and 20 appears before the circuit request operator in the form of a non-locking talking key 1913, a combined guard lamp and busy pilot 1918 and a supervisory lamp 2015. Let it be assumed that the request operator has just taken the next ticket from a number of tickets, filed in accordance with their time of origin, and that said ticket has resulted from an attempt on the part of the "A" operator in a nearby manual office such as shown in Fig. 17 to complete a call from subscriber C over an outgoing trunk indicated at 1723 and through a switchboard circuit such as shown in Figs. 11 and 12 to a group of busy toll lines such as shown in Fig. 25. This ticket shows the number of the special or TX operator in the manual office who will connect the call to subscriber C and the group of toll lines that were busy on the previous attempt. The request operator watches the multiple group busy pilot 1928 to determine when a line in the group is available. She may then either connect a switchboard path, such as shown in Figs. 19 and 20, to the idle toll line or she may first call the TX operator in the manual office and then complete the call to the toll line. The latter being the normal method will now be described.

The request operator calls the TX operator by operating key 1913 associated with one of her idle switchboard paths. This operates relay 1914 which locks over lead 1934 to ground at left back contact on wipe-out relay 2014. Guard and busy lamp 1918 thus lights over a circuit traced from battery either at back contact and armature 1979 on relay 1904 or from contact 1978 on relay 1914 in the event that relay 1904 is operated. Said circuit is further traced through lamp 1918 and contact 1935 on relay 1914 to ground at interrupter 1915, indicating the switchboard path to which the operator is connected. A circuit is also closed for operating relay 1907 over a path traced from ground at top contact relay 3035, lead 3042, contact 1936 on relay 1914, top inner contact of relay 1907, and through top winding of said relay to battery. Relay 1907 operating locks through its lower winding to ground at contact 1937 on relay 1914 and through its upper winding and inner contact over lead 1938 and through lower winding of relay 3035 to ground at top contact of relay 3036 when it operates. Relays 1907 and 1914 now being operated, close through the various control leads to the position circuit that enable the request operator to complete the call. The operator now throws key 2020 shown in lower right corner of Fig. 20 which is a part of her position circuit, preparatory to setting up the number of the TX operator on her key set, wherein only the code portion of the key set in Fig. 29 is shown.

A circuit is thus closed at contact 2022 on key 2020 for operating relay 3031 in the position circuit, thereby lighting "new call" lamp 3032 and "circuit connected" lamp 3034. The operating path for relay 3031 may be traced from ground through said relay over lead 3043, contact 2022 on key 2020, leads 2023 and contact on relay 1914 to lead 1944, thence through right outer break contact and left inner contact on relay 1903, through winding of relay 1902 to battery at left back contact of relay 1900. The high resistance of relay 3031 prevents the operation of relay 1902 in the circuit traced through its winding. Relay 3031 operates and locks to battery through top inner contact of operated relay 3030. It will be remembered that the operation of relay 1907 connected ground to lead 1945, which may be further traced through contact of operated relay 3022, bottom inner normal contact of relay 3030, through the winding of relay 3012 to battery, and that relay 3012 at its top inner contact operates relay 3030 which then locks through contact on relay 3022 to ground on lead 1945. This being a call through the terminating frame of switches, the first digit of the code number for the TX operator will be something other than zero or one and relay 2916 will, therefore remain normal, which means relay 1904 will also remain normal permitting frame identification leads 1939 and 1940 to pass information to the terminating marker that the rear end of the switchboard path is to be extended to the terminating district frame 1700. This is accomplished from relay 1907 operating and at contacts 1941 and 1942 closing ground, that is on lead 1943, to the identification leads 1939 and 1940. When the terminating marker is connected and the decoder has received all dialed information, ground is placed on lead 1133 which may further be traced through a contact on connecting switch 1801, to lead 1808, thence through contact 2024 on key 2020 and through top winding of relay 2019 to battery for lighting pilot lamp 2018. The direct ground from lead 1808 is also extended through contact 2022 of key 2020 to operate relay 1902, which circuit may be traced over lead 2023 to lead 1944, through contact of operated relay 1914, left inner contact of relay 1903, winding of relay 1902 to battery through left contact of relay 1900. The operation of relay 1902 extends said ground at its left contact through armature 1946 and back contact of relay 1904 over lead 1947 to a relay which is similar to relay 1731, for identifying the district frame and circuit to the marker. In the manner described the identifying relay returns this ground to the marker over a lead similar to lead 1732. Ground on lead 1944 may also be traced over armature 1948 and back contact on relay 1904, lead 1949 to battery through selecting magnet 1702, thus identifying the level on that switch. It will further be observed that the ground on lead 1944 coming over lead 1808 also serves in conjunction with resistance 1901 as a shunt on relay 1903. When, therefore, the district and office switches are cut through to the TX trunk 1754 and ground is removed from lead 1808 by the marker 1803, relay 1903 is caused to operate thereby releasing relay 1902. Relay 1903 locks operated to ground through its own contact 1950. The foregoing operations are simultaneous and the lighting of lamp 2018 indicates to the request operator that she may restore the key 2020 to normal. Thereafter the decoder marker is automatically dismissed as the switchboard path is extended to the TX trunk. Relay 1903 places holding ground on one of the top outer armatures of relay 1904, traced further over lead 1951, thence through bottom contact on lower portion of primary district switch 1704 and switch holding magnet 1703 to battery. Said path is also multipled through the secondary district switch 1705 and its holding magnet 1708, the primary office switch contacts and holding magnet 1713, secondary office switch contacts and holding magnet 1718, until finally this holding ground is traced over lead 1747 and through winding of relay 1739 in the TX trunk. Relay 1903 at its right inner contact also connects ground through contact 1952 for lighting position pilot lamp 1921 indicating to the operator that the connection is cut through. Relay 1739 in the TX trunk also operates at this time and bridges the bottom winding of trunk supervisory relay 1740 across the inside ends of repeating coil 1737 toward the trunk 1748 to the office of the TX operator, thereby bringing in a lamp signal, not shown, at said office. When the TX operator answers by inserting her cord plug in jack 1742 relay 1740 is assumed to operate over trunk 1748 thereby closing battery to inner end of lower left winding of repeating coil 1737 which may be further traced through the office and district crossbar switches 1715, 1710 and 1705, 1700 respectively, thence over lead 1749 contact 1953 on relay 1907, lead 1954 and bottom outer contact relay 3036 when the sender is released, through lower winding retard coil 3039 to ground through winding relay 3038. The latter relay thus darkens position supervisory lamp 3037 as a receiver-off-hook signal, said lamp having previously been lighted in same manner as described for lamp 1333 of the regular toll operator.

The request operator explains to the TX operator that the particular call involved is the next one in order to be completed. As soon thereafter as an idle line appears in the desired toll line group, indicated by lamp 1928 going out, the request operator sets up the designation of this group. Key 2020 having sometime previously been restored to normal releasing relay 2019 and putting out lamp 2018, she now operates key 2021, thereby preparing a path for reoperating relay 3035 as shown as she depresses one of the numerical code keys Fig. 29. This being a call to toll, the connection will be made via the through district and office frames over leads 1930. The operation of key 2021 thus closes a circuit from ground at the top contact to lead 2025, traced further through contacts 1936 to identification leads 1957 and 1958, thereby passing information to the through marker of Fig. 26 that the front end of the switchboard path is to be connected to the through district frame 2200. When the through marker is connected, ground is placed on lead 2634 in any suitable manner, and a circuit may be traced through contacts on connecting relays 2308 and 2307 to lead 2320 and then to lead 1808, through contact 2026 on key 2021, and winding of relay 2019 to battery. The ground placed on lead 2634 may further be traced through contact 2027 on key 2021, lead 2028, contact 1959 on relay 1914, right outer armature and back contact on relay 1923, left inner contact of relay 1923 through winding of relay 1924 to battery at back contact of relay 1926. Relay 1924 operates and locks to ground on its right inner contact over a circuit which may be traced through the winding of relay 1923. The latter relay does not operate until ground is removed from lead 2028. Relay 1924 also extends ground at its left contact over lead 1961 to the through district frame 2200 to identify the switch on which the switchboard path is terminated. Ground on lead 1960 may also be traced over lead 1962 to battery through selecting magnet 2208, thus identifying the level on switch 2200. It will further be observed that the ground on lead 1960 also serves along with resistance 1925 to act as a shunt on winding of relay 1923. The foregoing circuits are simultaneously extended over the paths traced, one of which operated relay 2019 for lighting lamp 2018 over an obvious circuit. This lamp indicates to the operator that key 2021 may now be restored to normal. When, therefore, the district and office switches are cut through to the toll line, here assumed to be shown, in the lower portion of Fig. 25, and ground is removed from lead 2634 by the marker of Fig. 26, the ground on lead 1960 is removed thereby operating relay 1923 and causing relay 1924 to release. Relay 1923 locks operated to ground, through its own contact 1963 and at its right inner contact places holding ground on lead 1964 for holding the district and office crossbar switch holding magnets such, for example, as primary district holding magnet 2209. Ground at the contact 1965 on relay 1923 is connected through a contact on relay 1914 for lighting lamp 1922 indicating that the connection is cut through. Relay 2529 of the toll line operates at this time from ground on the secondary office switch 2500, thereby preparing said line for the call by removing termination 2528 and at its left inner front contact preparing a path for ringing on the toll line as will presently be described.

*Disconnect of request operator from switchboard path*

The request operator having now completed a path which enables the TX operator to set up the call via an idle toll line out of toll office 2, disconnects her position from the switchboard path by depressing position wipeout key 3010. This results in the operation of relays 3009, 3008 and 3007 as described for corresponding relays in the position circuit of the toll operator of Fig. 13. The operation of relay 3007 closes a path through its own upper winding to lead 3044 traced through contact 1967 on relay 1914 to lead 1968 thence through contacts and winding on wipeout relay 2014. The latter relay in operating removes direct ground from the operating circuit of relay 1914 and at its inner contacts closes a path through resistance 2013 for locking itself over lead 1934 to battery through winding relay 1914. Said path, however, due to resistance 2013 causes relay 1914 to release, thereby releasing relay 1907 and disconnecting the operator from the switchboard path. An exception to this action would be where the operator's sender is still connected as evidenced by relay 3036 being operated. In this event ground through lower winding relay 3035 over lead 1938, through inner contact and upper winding relay 1907 to battery continues to hold relay 1907 operated until the sender is dismissed. Under this condition termination 1906 remains connected across the talking conductors to protect the toll line. The release of relay 1907 through its normal contacts, then extends the talking conductors 1932 from the TX operator to the conductors 1969 leading to the idle toll line. At this time supervisory lamps 3032 and 3034 go out due to release of relays 1907 and 3030 and lamps 1921 and 1922 go out due to release of relay 1914. The release of relay 1914 at contact 1935 opens the interrupter ground circuit to lamp 1918 that has been causing it to flash and at contact 1970 supplies said lamp with direct ground from a contact on either relay 1903 or 1923. Since one or both the latter relays are operated whenever a switchboard path is busy and battery to the lamp continues to be supplied at armature 1979 on relay 1904, lamp 1918 continues to remain lighted as a switchboard path busy indication. The operation of relay 1910 at its bottom outer contact also removes battery from a circuit traced over lead 1971, through circuit request operator's lamp 2015, lead 2029, normal contact and armature 1929 on relay 1904 to ground at right inner contact on relay 1903. Lamp 2015 thus remains out during the remainder of the connection.

*TX operator completes call*

The TX operator now proceeds to complete the connection through to the called subscriber by ringing out over trunk line 1748 which causes relay 1738 to operate and connect battery to the left upper winding repeater coil 1737. Said battery may then be traced over talking conductor 1750, contact on office switches 1751 and 1714, conductor 1730, contact on secondary district switches 1709 and 1752, lead 1753, contact 1977 on relay 1907, thence over lead 1972 and through the left winding of retard coil 1908 and winding of relay 1909 to ground. The latter relay thus operates and connects ground to lead 1973 traced further through upper winding of relay 2003 to battery. Relay 2003 locks through its lower winding and contact through resistance 2005 to high voltage battery 2030 and at its top inner make contact connects battery through resistance 2004 to lead 2031 traced further through district and office switches 2200, 2201, 2202 and 2500 to lead 2546, left inner contact of relay 2529, armature and front contact of relay 2531, through winding of relay 2525 to ground. The latter relay thus operates and sends a ringing signal connected at 2526 out over toll line 2532 into the next toll office.

The above ringing signal is sent out over the toll line under the control of a timing arrangement consisting of an ionic tube 2010, resistances 2005 and 2011, condenser 2012, and high voltage positive battery 2030. Relay 2003 operating closes a path for connecting positive battery 2030 through resistance 2005 to the plate of the tube 2010 which does not break down and become conducting, due to the negative battery on the grid. Current from the negative battery flows through resistance 2004 and winding of the ringing relay 2525 in the toll line to ground, and makes the junction 2032 considerably less negative. The circuit, in fact, may be adjusted so that junction 2032 is positive with respect to the cathode of the tube 2010. However, due to the large resistance 2011 and condenser 2012, the grid of the tube does not reach this voltage until after a delay required to charge condenser 2012. The length of this delay is controlled by the voltage difference between the cathode and point 2032, the value of resistance 2011, and the size of condenser 2012. When the voltage of the grid has been made sufficiently less negative, the tube becomes conducting and current flows from the cathode circuit to the plate and then through resistance 2005 to battery. The tube thereby shunts lower winding of relay 2003, which releases unless the request operator still has the ringing key in the position operated. Under this condition the relay releases when the ringing key is restored.

The TX operator meanwhile inserts the other end of her cord circuit indicated at 1743 into the usual switching trunk jack 1744. The "B" operator then learns from the TX operator the number of the calling subscriber and inserts the cord plug of the switching trunk into the subscriber's multiple jack 1746. The TX operator then proceeds to pass the called subscriber's number to the operator in the next toll office and in turn to as many other through toll operators as may be necessary to reach the called subscriber station. When connection is made with the called party the TX operator then rings over the switching trunk to call the calling subscriber to the telephone in accordance with the usual standard practice.

*Pad circuit control.*

Toll lines are reached over the office frame, consequently the pad lead is connected to a grounded winding of the pad control relay 2524. Said path may be traced from ground through left winding relay 2524, lead 2547, thence through office switches 2500 and 2202, district switches 2201 and 2200, lead 2226, top outer armature and back contact relay 1914 and through right-hand winding relay 1916 to battery through contact on said relay. The left-hand winding of said relay is open at the time because the rear ends of the request operator's switchboard path is not connected to toll but to the TX operator. Therefore, said relay operates and cuts resistance 1917 into the above traced circuit, thereby causing pad relay 2524 to remain normal during the connection, with the pad circuit 2523 connected in the circuit. The windings of relay 1916 are connected differentially so that when both ends of the switchboard path are connected to toll lines as on delayed through calls, the windings neutralize each other and relay 1916 remains normal thus supply direct battery for operating pad relays in each of the pad circuits to remove such pads.

*Disconnect condition.*

The calling subscriber at the end of conversation hangs up his receiver thereby signaling the TX operator in the usual way. The TX operator then removes her cord plug from trunk jack 1742 thereby releasing relay 1740 which removes battery from the lower one of the two talking conductors. This causes relay 1910 to release and connect battery for lighting lamp 2015 over a path previously described. The request operator by operating key 1913 may then connect her position circuit to the switchboard path as previously described. If she desires to set up a connection to another TX operator that requires a toll line in this same group, she will then operate disconnect key 2006 which connects ground to lead 2033 and may be traced through contact 1975 on relay 1907, thence through right winding relay 1900 to battery. The latter relay operating removes battery that has been holding relay 1903 operated, thus breaking down the connection to the first TX operator. She may then operate key 2020 and set up a connection with another TX operator. In this event she would rering the operator in the toll office 3 and request a connection to another subscriber by depressing ringing key 1966 thereby connecting ground through a contact on relay 1914 to lead 1973 causing a timed ringing signal to be sent out over toll line 2532 in the same manner as described above where the supervisory relay 1909 connected ground to lead 1973. The request operator on the other hand may release both ends of the switchboard path by first depressing key 2006 and then release key 3029 of her position circuit. The rear end of the switchboard path is thus released by the first key and the second key operates relays 3028, 3027 and 3026 to connect ground through upper high resistance winding relay 3026 to lead 3045, traced thence through contact 1976 on relay 1914 and right winding relay 1926 to battery. The operation of the latter relay removes battery supply from relay 1923, thereby releasing the front end of the switchboard path. The request operator by the use of these keys may obviously release either end of said switchboard path at any time during the setting up of, or end of, a connection.

*Delayed through calls*

The request operator in setting up a delayed through connection proceeds in the same manner as described above for circuit request calls. However, the extension of a call to a TX operator through a distant toll office over the rear end of the request operator's switchboard path involves setting up a code on the key set with 0 or 1 as the first digit. Thus relay 2916 is caused to operate and connect ground to lead 2932 that may be traced through the top outer contact on key 2020, over lead 2034, through contact 1955 on relay 1907 to battery through bottom inner contact and winding relay 1904. The latter relay operates and locks to ground at right contact on relay 1900 thereby opening the circuit to frame identification leads 1939 and 1940 and closing identification leads 1957 and 1958 so that the through district frame 2200 will be identified. Relay 1904 also closes an obvious circuit for lighting the position through pilot lamp 1905. Referring to the earlier description where a call is being extended by the calling "A" operator for subscriber A in the manual office shown in Fig. 5 which is adjacent to the first toll office also shown in Fig. 5, let it be assumed that the operator in the second toll office was unable to complete the call due to the outgoing group of toll lines all being busy and that the call is ticketed for the request operator to complete as previously described. When a toll line in the group becomes idle said operator may first set up a connection to the TX operator in the originating office or she may complete the call to the called subscriber and then complete the connection back to the TX operator. The latter case will here be assumed, with the request operator first depressing talking key 1913 and then key 2021 and setting up the code for the city of the called subscriber on the key set of Fig. 29. The associated marker shown in Figs. 26, 27 and 28 will then cause the leads 1930 of the front end of the request operator's switchboard path to be connected via district switches 2200 and 2201 and office switches 2102 and 2500 to the toll line shown in upper portion of the Fig. 25. Ground placed on lead 2536 of this line causes relay 2520 to operate and prepare the circuit for ringing out on the line 2533. The request operator by operating ringing key 1966 places ground on lead 1973 and causes a timed interval or signaling current to be sent out as previously described. Said signal will then be received in the third toll office, not shown, which for the purpose of this description, may be assumed to be the same as shown for toll office No. 2. When the operator in the third toll office answers, the request operator passes the subscriber number which is further assumed to involve a terminating connection in toll office No. 3.

Figure 5:
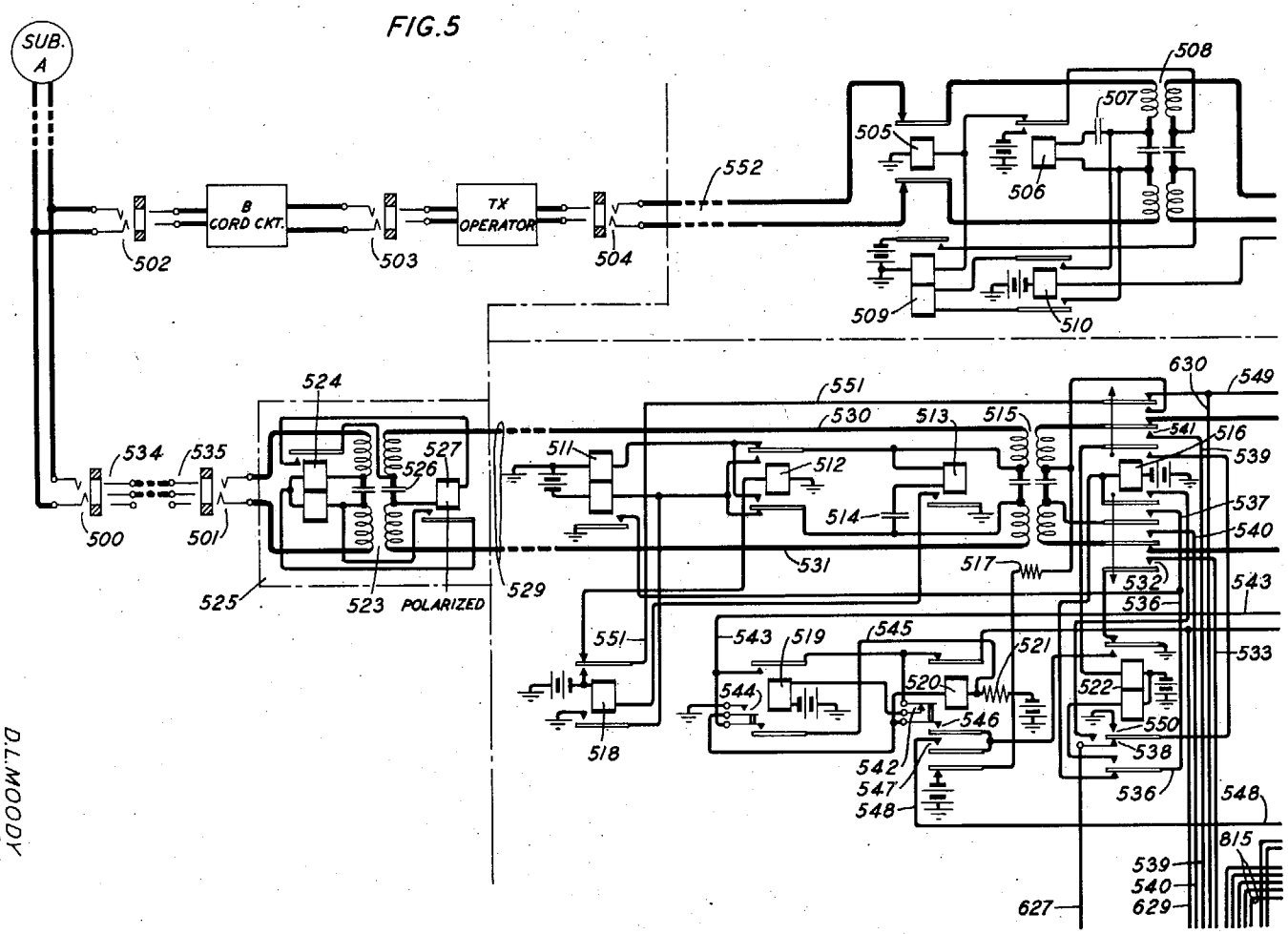
Fig. 5 represents a calling "A" subscriber in a local manual telephone office. In the lower right-hand portion there is represented an incoming tandem trunk of an adjacent toll office, and in the upper right-hand portion an outgoing trunk, known as a TX trunk, from said toll office to said manual office.

The request operator now proceeds to establish the connection back to the calling subscriber A by depression key 2020 and on her key set writes up the number of the TX operator in the manual office of Fig. 5. This operates relay 1904 of the switchboard circuit, closing a path to identification leads 1957 and 1958 for identifying district frame 2200 to the marker as above described. The rear end of the switchboard path is thus extended over leads designated 1931 and 1932, through district switches 2200 and 2201, office switches 2102 and 2400 to the toll line circuit shown in upper portion of Fig. 24. Ground placed on lead 2422 of this line causes relay 2419 to operate and to prepare the circuit for ringing on the toll line 2423. The request operator by operating ringing key 1920, connects ground through a contact on relay 1914 to lead 1974 which is further traced through top winding of relay 2000. The operation of the latter relay in conjunction with the ionic tube 2009, resistances 2001, 2002 and 2007, and condenser 2008 serves to cause ringing relay 2414 in the outgoing toll line circuit to operate for a minimum time interval and send a signaling current connected at 2415 over line 2423. A detailed description of this action is unnecessary since the operation is the same as previously described when ringing on the front end of the request operator's switchboard path. Signaling current sent over line 2423 is received by the inward line of toll office 1 indicated at 814. When the inward cordless operator, whose position is indicated at 815, answers the signal she is notified by the request operator that a connection is desired to the TX operator's position in the local office of Fig. 5. The inward cordless operator completes this connection over the district switches 812—811 and office switches 808—806, through the TX trunks in the first toll office of Fig. 5. The functioning of said TX trunk need not here be described since reference may be had to the previous description of a similar trunk 1754. The request operator now informs the TX operator that she has completed the delayed call to the called subscriber whereupon the TX operator takes up the ticket that has been passed to her by the originating "A" operator, giving the number of the calling subscriber, etc., and proceeds to complete the connection through jack 503 via the "B" operator's switching trunk to the subscribers trunk 502 to the calling subscriber A.

The circuit request operator during setting up of the above connection may be recalled from either end of the connection through the switchboard path by the operator from said end ringing on the line or trunk. If for example while the request operator is setting up a connection via toll line 2533 to the toll operator in the toll office 3 the latter operator wishes to recall the request operator she may do so by connecting a ringing signal to line 2533 which will obviously operate relay 2518 and remove ground from winding of relay 2522. Its release thus connects battery through the left inner armature and front contact relay 2520 to lead 2539 traced thence through contacts on secondary office switch 2500, primary office switch 2102, secondary district switch 2201 and primary district switch 2200, over lead 2031 and through the top armature and back contact relay 2003 to ground through the right winding relay 2017. The latter relay then locks through its left winding to ground at normal contact on relay 2014 and at its two right outer make contacts supplies ground and battery for lighting lamp 2015 as a recall signal. Also at its right inner contact relay 2017 connects ground to lead 2035 which is further traced through a contact on operated relay 1914 to battery through another position lamp 1912 which lights to indicate that the recall is from the front end of the switchboard path.

If on the other hand the operator in toll office No. 1 has occasion to recall the request operator, she may do so by ringing on the toll line 2423 which obviously operates relay 2416, thereby connecting battery to a path traced through the left inner armature and front contact relay 2419 to lead 2424 thence through contacts on secondary office switch 2400, primary office switch 2102, secondary district switch 2201 and primary district switch 2200, over lead 2227 and through the top armature and back contact relay 2000 to ground through right winding relay 2016. The latter relay then locks through its left winding to ground at relay 2014 and at its two right outer contacts supplies ground and battery for lighting position lamp 2015. Also at its right inner contact it connects ground to lead 2036, traced further through a contact on operated relay 1914 to battery through lamps 1911, which lights to indicate that the recall is from the rear end of the switchboard path.

*Line, overflow, and master busy conditions*

The request operator in setting up connections over the rear end of her switchboard path to the TX operator in the adjacent manual office of Fig. 17 and then to a toll line over the front end of the path may encounter a busy tone or flashing signals the same as encountered by the regular toll operator. As long as the request operator is connected to the switchboard path said busy indications will manifest themselves to her by clicks or tones received in her telephone. Should she disconnect her telephone from said path while a flashing condition continues, said flashing signal by virtue of interrupted battery on the line will operate relay 1910 accordingly and lamp 2015 will flash whatever busy signal is being encountered. On delayed through connections however where relay 1904 is operated, ground and busy lamp 1918 is the one that indicates the busy condition to the request operator.

What is claimed is:

1. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, and means controlled by the operator for selectively operating said switches to establish a toll connection between the calling incoming line and a desired outgoing line.

2. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, means controlled by the operator for selectively operating said switches to establish a toll connection between the calling incoming line and a desired outgoing line, and means for automatically releasing said position from the calling incoming toll line.

3. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, means controlled by the operator for selectively operating said switches to establish a toll connection between the calling incoming line and a desired outgoing line, means for automatically releasing said position from the calling incoming toll line, and means responsive to a calling signal sent over said established connection for reconnecting said position to said calling toll line.

4. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, means controlled by the operator for selectively operating said switches to establish a toll connection between the calling incoming line and a desired outgoing line, means for automatically releasing said position from the calling incoming toll line, and means responsive to a calling signal sent over said established connection from either end thereof for reconnecting said position to said calling incoming toll line.

5. In combination a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said positions to said line, a marker common to said switches, means controlled from said position for registering the designation of the call in said marker, and means controlled by said marker for selectively operating said switches to connect the calling incoming line to a desired outgoing line.

6. In a telephone system, a toll office, automatic switches therein, an operator's position therein, a two-way ring-down toll line terminating in one of said switches, means for sending calling signals of alternating current over said line in either direction, means responsive to a calling signal incoming over said line for automatically connecting the line to the operator's position, toll circuits outgoing from said office, and means controlled by the operator for causing the selective operation of said switches to extend said toll line to a desired one of said outgoing circuits.

7. In a telephone system, originating, intermediate, and terminating toll offices, a first two-way ring-down toll line interconnecting the originating and intermediate offices, a second two-way ring-down toll line interconnecting said intermediate and terminating offices, automatic switches in said intermediate office, an operator's position in each office, means for sending alternating current signals over said lines in either direction, means responsive to a signal sent from the originating office to said intermediate office for automatically connecting said first toll line to the intermediate operator's telephone to establish a talking path between said originating and intermediate operators, and means controlled by said intermediate operator for operating said switches to extend a connection from said first toll line over said second toll line to the terminating office.

8. In combination, a toll office, toll lines incoming to said office, toll lines outgoing from said office, automatic switches for connecting said incoming lines to said outgoing lines, means at both ends of said lines for sending calling signals over said lines in either direction, an operator's position in said office, means responsive to a calling signal sent over a calling one of said incoming lines to connect said operator's position automatically to the inward end thereof, a key set at said position and means for registering a called designation set up on said key set, and means controlled by said registering means for selectively operating said switches to connect said calling incoming line to a desired one of said outgoing toll lines.

9. In a telephone system, a toll office, outgoing circuits to local offices for completing terminating toll calls, a switch having access to said circuits, outgoing toll lines to distant points for extending through calls, a second switch having access to said outgoing lines, a toll line incoming to said toll office and terminating in both of said switches, an operator's position in said toll office, means for sending a calling signal over said incoming line to said toll office, means responsive to said signal for connecting said position to said incoming line, and means at said position for causing the selective operation of either one of said switches to extend the incoming toll line either to one of said local outgoing circuits or to one of said outgoing toll lines.

10. In a telephone system, a toll office, outgoing circuits to local offices for completing terminating toll calls, a switch having access to said circuits, outgoing toll lines to distant points for extending through calls, a second switch having access to said outgoing lines, a toll line incoming to said toll office and terminating in both of said switches, an operator's position in said toll office, means for sending a calling signal over said incoming line to said toll office, means responsive to said signal for connecting said position to said incoming line, means at said position for registering the designation of the call, a first register mechanism for controlling the switch having access to said local circuits, a second register mechanism for controlling said second switch, means dependent on the designation registered at said position for selecting the corresponding one of said register mechanisms, means for transferring said designation to the said selected mechanism, and means controlled by said mechanism for operating the corresponding switch to extend said incoming line either to a local office or to an outgoing toll line according to which one of said switches is operated.

11. In a telephone system, a toll office, outgoing circuits to local offices for completing terminating toll calls, a switch having access to said circuits, outgoing toll lines to distant points for extending through calls, a second switch having access to said outgoing lines, a toll line incoming to said toll office and terminating in both of said switches, an operator's position in said toll office, means for sending a calling signal over said incoming line to said toll office, means responsive to said signal for connecting said position to said incoming line, a key set at said position for registering the called designation, two markers, means controlled by said key set for selecting one or the other of said markers according to whether the call on said incoming line is a terminating or a through call, means for transferring the designation to the selected marker, means controlled by one of said markers when a designation is transferred thereto for operating said first switch to connect the incoming line to one of said local circuits, and means controlled by the other marker when a designation is recorded therein for controlling said second switch to connect the incoming line to one of said outgoing toll lines.

12. In a telephone system, a toll office, a switching trunk outgoing therefrom to a local office, a registering mechanism associated with said trunk, a selector switch in the toll office having access to said trunk, a toll line outgoing from said toll office, a second selector switch having access to said outgoing toll line, markers for controlling said switches, a toll line incoming to said toll office and terminating in both of said switches, an operator's position in said toll office, means responsive to a calling signal sent over said incoming line for connecting said incoming line to said position, means at said position for registering the office code and line number of the wanted designation, means for transferring the office code registration to one of said markers to cause the operation of one of said switches to connect the incoming line either to said trunk or to an outgoing line according to the character of the office designation, and means effective if a line number has been registered at said position for transferring such registration over the extended connection to said registering mechanism.

13. In combination, an incoming toll line, outgoing toll circuits, automatic switches for connecting the incoming line to said outgoing circuits, markers for controlling said switches, an operator's position and means for connecting it to said incoming line, means at said position for registering called designations, means for connecting the position to one of said markers and for transferring the registered designation from the position to said marker, means controlled by the marker for operating one of said switches to extend the incoming line to the desired one of said outgoing circuits, means in the marker effective when certain designations are received from the position to cause the automatic release of said position from the incoming line and for releasing itself from the position, and means in the marker effective when other designations are received for releasing itself from the position without causing the release of the position from said incoming line.

14. In combination, an incoming toll line, outgoing toll circuits, automatic switches for connecting the incoming line to said outgoing circuits, markers for controlling said switches, an operator's position and means for connecting it to said incoming line, means at said position for registering called designations, means for connecting the position to one of said markers and for transferring thereto all or a part of the designation registered at said position, means controlled by the marker for operating one of said switches to extend the incoming line to a desired one of said outgoing circuits, means in the marker effective if it receives all of said designation from the position to release itself from the position and to cause the automatic release of the position from said incoming line, means in the marker effective if it receives only a part of the designation for releasing itself from the position without causing the release of the position from the line, means at the position for transferring the remaining part of said designation from the position to the established connection, and means for releasing the position from said incoming line.

15. In a telephone system, a toll office, outgoing local circuits, outgoing toll lines to distant points, an incoming toll line, automatic switches and an operator's position in said toll office, means for automatically connecting said incoming line to said position, means controlled from said position for operating said switches to connect the incoming line either to a local circuit or an outgoing toll line according to the destination of the call, means for releasing the position from said incoming line, and means controlled over a local outgoing circuit for automatically releasing said switches to disconnect the incoming toll line from said local circuit.

16. In a telephone system, a toll office, an outgoing trunk to a local office, outgoing toll lines to distant points, an incoming toll line, automatic switches in said toll office, means for sending signals in either direction over any of said toll lines, an operator's position at said toll office, means responsive to a signal incoming over said incoming line for connecting said line automatically to said position, means controlled from said position for operating said switches to extend the incoming line either to said trunk or to one of said outgoing lines according to the destination of the call, means for releasing said position from said incoming line, and means effective after a connection has been extended over said switches to said trunk for causing the automatic release of said switches under control of said local office.

17. In a telephone system, a toll office, an outgoing trunk to a local office, outgoing toll lines to distant points, an incoming toll line, automatic switches in said toll office, means for sending signals in either direction over any of said toll lines, an operator's position at said toll office, means responsive to a signal incoming over said incoming line for connecting said line automatically to said position, means controlled from said position for operating said switches to extend the incoming line either to said trunk or to one of said outgoing lines according to the destination of the call, means for releasing said position from said incoming line, means controlled by a called party in said local office to release said switches to disconnect the incoming toll line from said trunk, means responsive to a signal sent to said toll office either over said incoming line or over an outgoing line to which said incoming line has been connected for reconnecting said position to the established connection, and means under the control of said position for releasing said switches.

18. In a telephone system, an incoming circuit, a group of outgoing circuits, automatic switches, a marker for testing said outgoing circuits and for operating said switches to connect the incoming circuit to an idle one of said outgoing circuits, an auxiliary circuit, means effective if all said outgoing circuits are busy for causing the marker to omit the test of the outgoing circuits and to operate said switches to extend the incoming circuit to said auxiliary circuit, and a busy signal rendered effective under control of said auxiliary circuit.

19. In a telephone system, an incoming circuit, a group of outgoing circuits, automatic switches, a marker for testing said outgoing circuits and for operating said switches to connect the incoming circuit to an idle one of said outgoing circuits, an auxiliary circuit, means effective if all said outgoing circuits are busy for causing the marker to omit the test of the outgoing circuits and to operate said switches to extend the incoming circuit to said auxiliary circuit, a busy signal rendered effective under control of said auxiliary circuit, and means for controlling said auxiliary circuit to cause the effacement of said signal when one of said outgoing circuits becomes idle.

20. In a telephone system, an incoming line, groups of outgoing lines, automatic switches, a marker for testing said groups of lines and operating said switches to connect the incoming line to an idle line in the desired outgoing group, a group of overflow circuits, a master busy circuit, means effective if all lines in a called group are busy for causing the marker to omit the test of such group and to test the overflow group and cause the switches to connect the incoming line to an idle overflow circuit, and means effective if all lines in the called group are busy and all overflow circuits are busy for causing the marker to omit both tests and to extend the incoming line over said switches to said master busy circuit.

21. In a telephone system, an incoming toll line, a group of outgoing toll lines, automatic switches, a toll operator's position, a marker, means controlled from said position for taking said marker in use to test the lines of said group and to operate said switches to connect the incoming line to an idle line in said outgoing group, a special operator's position, means for establishing a special condition for said group of lines, means in said marker responsive to said special condition when the marker is taken in use by said toll operator for causing it to omit the test of said group and to extend the incoming line to said special position, and means controlled from the special position for taking said marker in use to test the lines of said group and to operate said switches to extend a connection to an idle one of the outgoing lines of said group.

22. In a telephone system, an incoming toll line, a group of outgoing toll lines, automatic switches, a toll operator's position, a marker, means controlled from said position for taking said marker in use to test the lines of said group and to operate said switches to connect the incoming line to an idle line in said outgoing group, a special operator's position, means for establishing a special condition for said group of lines, means in said marker responsive to said special condition when the marker is taken in use by said toll operator for causing it to omit the test of said group and to extend the incoming line to said special position, means controlled by the special operator for taking said marker in use, means effective when the marker is taken in use by the special operator for causing it to test the lines of said outgoing group regardless of said special condition, and means controlled by the marker on finding an idle line in said group for operating said switches to establish a connection to such idle line.

23. In a telephone system, an originating toll office, an intermediate toll office, toll lines interconnecting said offices, a group of toll lines outgoing from said intermediate office, automatic switches and a toll operator's position in the intermediate office, a marker, means controlled by said operator for taking said marker in use to test the lines of said outgoing group and to operate said switches to connect a calling toll line incoming from said originating office to an idle one of said outgoing lines, a request operator's position in said intermediate office, means controlled by the request operator for conditioning said outgoing group for request operation, means in said marker effective when it is taken in use by said toll operator for omitting to test said group if it is on a request basis when called and for extending the calling incoming line to said request position, means at the request position for indicating the busy condition of said group, means controlled by the request operator for taking said marker in use, means in said marker effective when taken in use by the request operator to disregard the request condition of said group and to test said group for an idle line, and means controlled from the request position for causing the marker to establish a connection over said switches between a toll line extending to the originating office and the outgoing line in said group found idle by the marker test.

24. In a telephone system, an incoming line and an outgoing line, each having an impedance element connected in the transmission circuit thereof, normally deenergized relays, one for each line, circuit connections controlled by the contacts of each relay when operated for rendering ineffective the corresponding impedance element, means for connecting said incoming line to said outgoing line, and a circuit including in series a winding of each relay for operating both of said relays.

25. In a telephone system, an office, a plurality of two-way lines having terminating ends in said office, transmission impedances one in the terminating end of each line, relays individual respectively to said lines said relays serving when operated to render ineffective the corresponding impedances, means for connecting any one of said lines to any other line, and an operating circuit for the two relays of any two connected lines including a winding of each relay and extending through said connecting means.

26. In a telephone system, an office, a plurality of two-way lines having terminating ends in said office, transmission impedances associated respectively with the terminal ends of said lines, relays individual respectively to said lines and serving when operated to render ineffective the corresponding impedance, trunks outgoing from said office, means for connecting any particular one of said lines either to any one of said other lines or to one of said trunks, and an operating circuit for the relay of said particular line extending through a winding of said relay and through a winding of the corresponding relay of the line to which said particular line is connected.

27. In a telephone system, an office, switching means, two lines each having inward and outward appearances in said switching means, transmission elements one for each of said lines, relays individual respectively to said lines and serving when operated to render ineffective the corresponding transmission element, each relay having two windings one winding associated with the inward appearance of the line in the switching means and the other winding associated with the outward appearance of such line in the switching means, and an operating circuit for said relays completed when either line is connected to the other line, said circuit extending through that winding of one of the relays which corresponds to the inward appearance of the associated line and through that winding of the other relay which corresponds to the outward appearance of the associated line.

28. In combination, a toll office, incoming and outgoing toll lines, automatic switches for connecting said incoming line to said outgoing line, means for sending calling signals in either direction over any of said lines, a plurality of operators' positions in said office, means responsive to a calling signal sent to said office over a calling incoming line for connecting said line to an idle one of said positions, and means controlled by said position operator for selectively operating said switches to establish a toll connection between the calling incoming line and a desired outgoing line.

29. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, a visible signal in said position indicating that the position has been connected to a line by said latter means, a visible signal indicating that the connection is for a new call, and means controlled by the operator for selectively operating said switches to establish a toll connection between the calling incoming line and a desired outgoing line.

30. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, a visible signal in said position indicating that the position has been connected to a line by said latter means, a visible signal indicating that the connection is for a new call, means controlled by the operator for selectively operating said switches to establish a toll connection between the calling incoming line and a desired outgoing line, and a visible signal that the lines have been connected.

31. In combination, a toll office, incoming and outgoing toll lines, automatic switches for connecting said incoming lines to said outgoing lines, means for sending calling signals in either direction over any of said lines, an operator's position in said office, means responsive to a calling signal sent to said office over a calling incoming line for connecting said position to said line, a visible signal indicating that the incoming call is for a new telephone connection, means controlled by the operator for selectively operating said switches to establish a toll connection between the calling incoming line and a desired outgoing line, and visible recall signals in said position operable in response to signals over either of said connected lines.

32. In a telephone system, a calling line, a called line, means for establishing a connection between said lines, a plurality of operator positions, and means controllable over said established connection for positively selecting an idle one of said operator positions to supervise said established connection.

33. In a telephone system, a plurality of lines, means for establishing a connection between two of said lines, thereby to extend a call from one of said lines to the other of said lines, a plurality of operator positions, and means responsive to a recall upon said established connection for positively selecting an idle one of said operator positions to answer the recall upon said established connection.

34. In a telephone system, a calling line, a called line, an operator position, telephone apparatus including a receiver at said operator position, automatic means responsive to the presence of a call on said calling line for completing a connection between said calling line and said telephone apparatus, means for completing a connection between said called line and said telephone apparatus, means for establishing a connection between said calling line and said called line independent of said telephone apparatus, and automatic means responsive to the presence of a recall upon said established connection for completing a connection between said established connection and said telephone apparatus, thereby to complete a three-way communication connection including said calling line and said called line and said telephone apparatus.

35. In a telephone system, a calling line, a called line, an operator position, telephone apparatus including a receiver at said operator position, means for establishing a connection between said calling line and said called line, and automatic means responsive to the presence of a recall upon said established connection for completing a connection between said established connection and said telephone apparatus, thereby to complete a three-way communication connection including said calling line and said called line and said telephone apparatus.

DWIGHT L. MOODY.
NEAL D. NEWBY.
FRANK F. SHIPLEY.